United States Patent [19]

Idleman et al.

[11] Patent Number: 5,274,645
[45] Date of Patent: * Dec. 28, 1993

[54] DISK ARRAY SYSTEM

[75] Inventors: Thomas E. Idleman, Santa Clara; Robert S. Koontz, Atherton; David T. Powers, Morgan Hill; David H. Jaffe, Belmont; Larry P. Henson, Santa Clara; Joseph S. Glider, Palo Alto; Kumar Gajjar, San Jose, all of Calif.

[73] Assignee: Micro Technology, Inc., Sunnyvale, Calif.

[ * ] Notice: The portion of the term of this patent subsequent to Aug. 18, 2009 has been disclaimed.

[21] Appl. No.: 872,560

[22] Filed: Apr. 23, 1992

Related U.S. Application Data

[63] Continuation of Ser. No. 601,482, Oct. 22, 1990, which is a continuation-in-part of Ser. No. 505,622, Apr. 6, 1990, and a continuation-in-part of Ser. No. 506,703, Apr. 6, 1990, and a continuation-in-part of Ser. No. 488,749, Mar. 2, 1990.

[51] Int. Cl.5 .............................................. G06F 11/20
[52] U.S. Cl. .................................. 371/10.1; 371/11.1; 371/40.1; 395/575
[58] Field of Search .................... 371/10.1, 10.2, 11.1, 371/40.1; 395/575

[56] References Cited

U.S. PATENT DOCUMENTS

| | | | |
|---|---|---|---|
| 4,817,035 | 3/1989 | Timsit | 371/10.1 |
| 4,914,656 | 4/1990 | Dunphy, Jr. et al. | 371/10.2 |
| 4,958,351 | 9/1990 | Flora et al. | 371/40.1 |
| 4,989,205 | 1/1991 | Dunphy, Jr. et al. | 371/10.1 |
| 5,088,081 | 2/1992 | Farr | 371/10.1 |

Primary Examiner—Charles E. Atkinson
Attorney, Agent, or Firm—Townsend and Townsend Khourie and Crew

[57] ABSTRACT

A method and apparatus for controlling data flow between a computer and a group of memory devices arranged in a particular logical configuration. The system includes a group of first level controllers and a group of second level controllers. The first level controllers and the second level controllers work together such that if one of the second level controllers fails, the routing between the first level controllers and the memory devices is switched to a properly functioning second level controller without the need to involve the computer in the rerouting process. The logical configuration of the memory devices remains constant. The invention also includes switching circuitry which permits a functioning second level controller to assume control of a group of memory devices formerly primarily controlled by the failed second level controller. In addition, the invention provides error check and correction as well as mass storage device configuration circuitry.

29 Claims, 31 Drawing Sheets

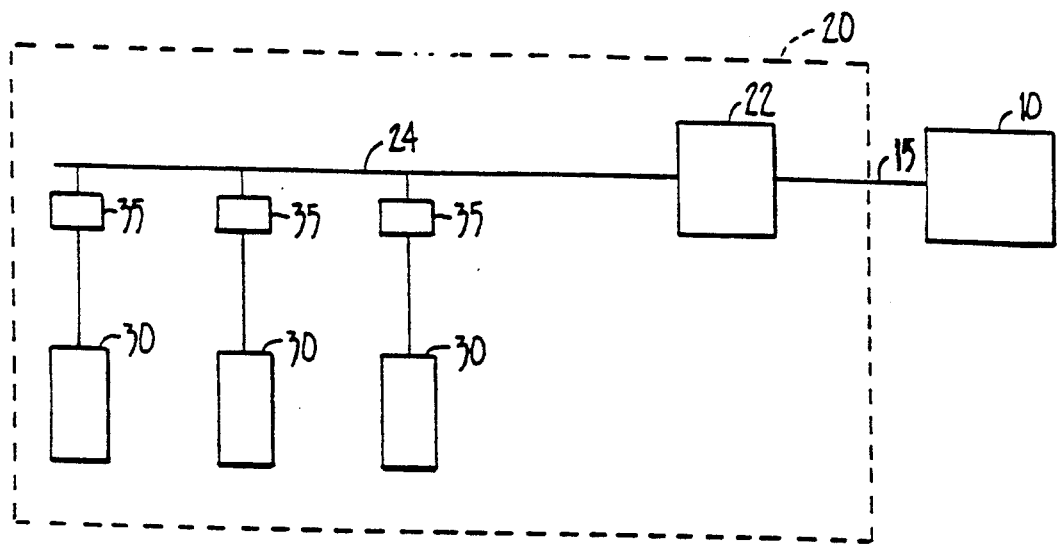
FIG._1. (PRIOR ART)
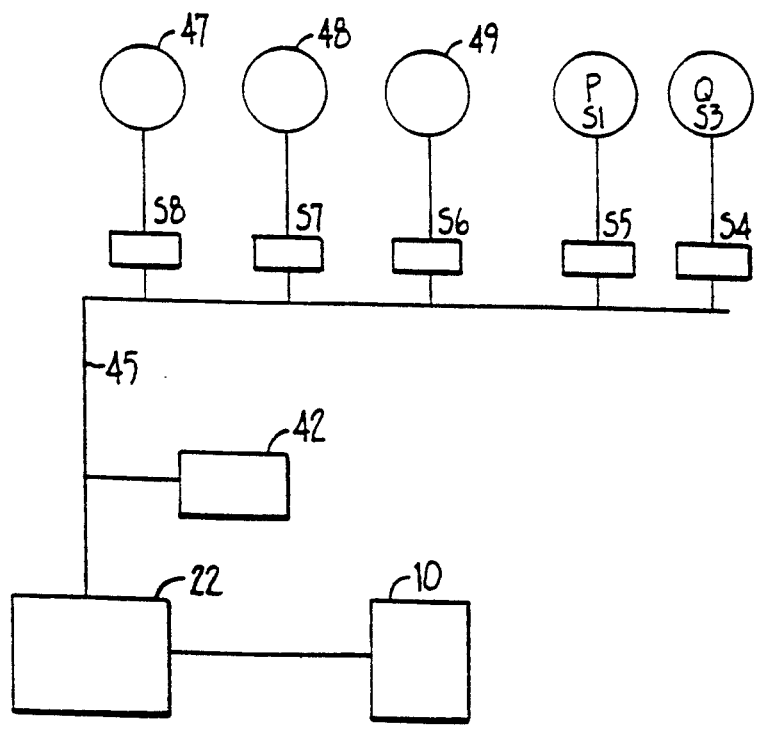
FIG._2. (PRIOR ART)

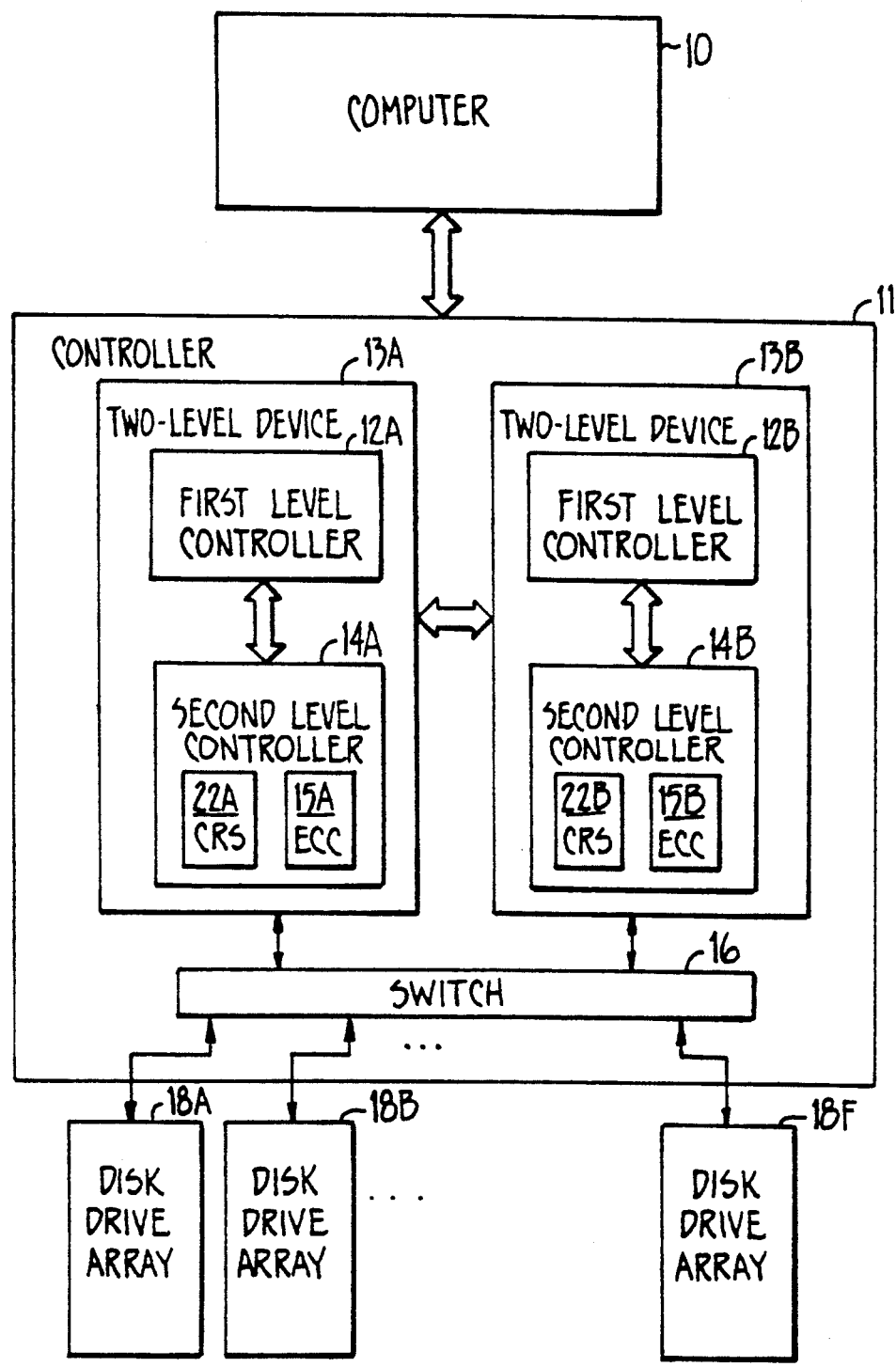
FIG._3.

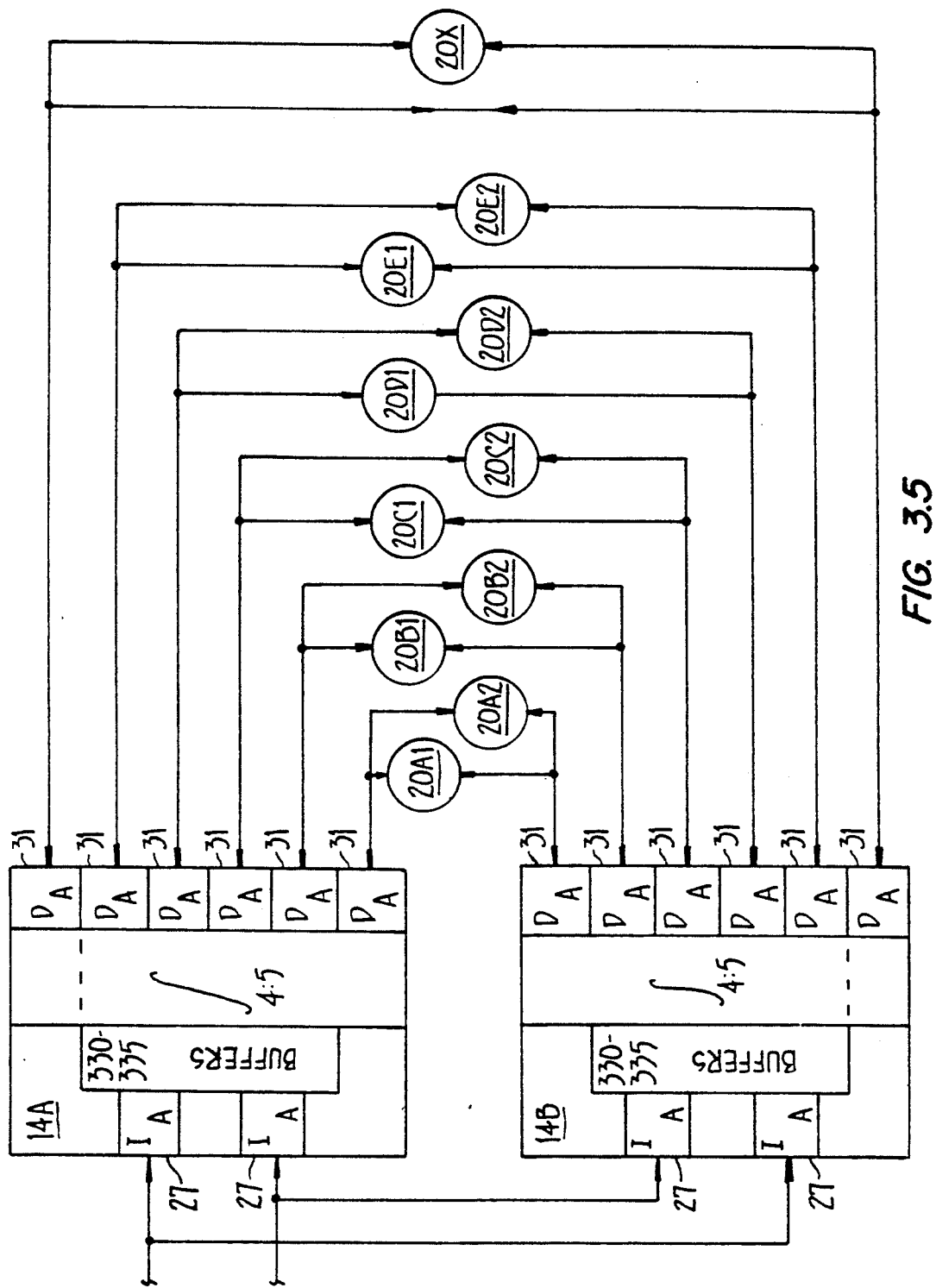
FIG. 3.5

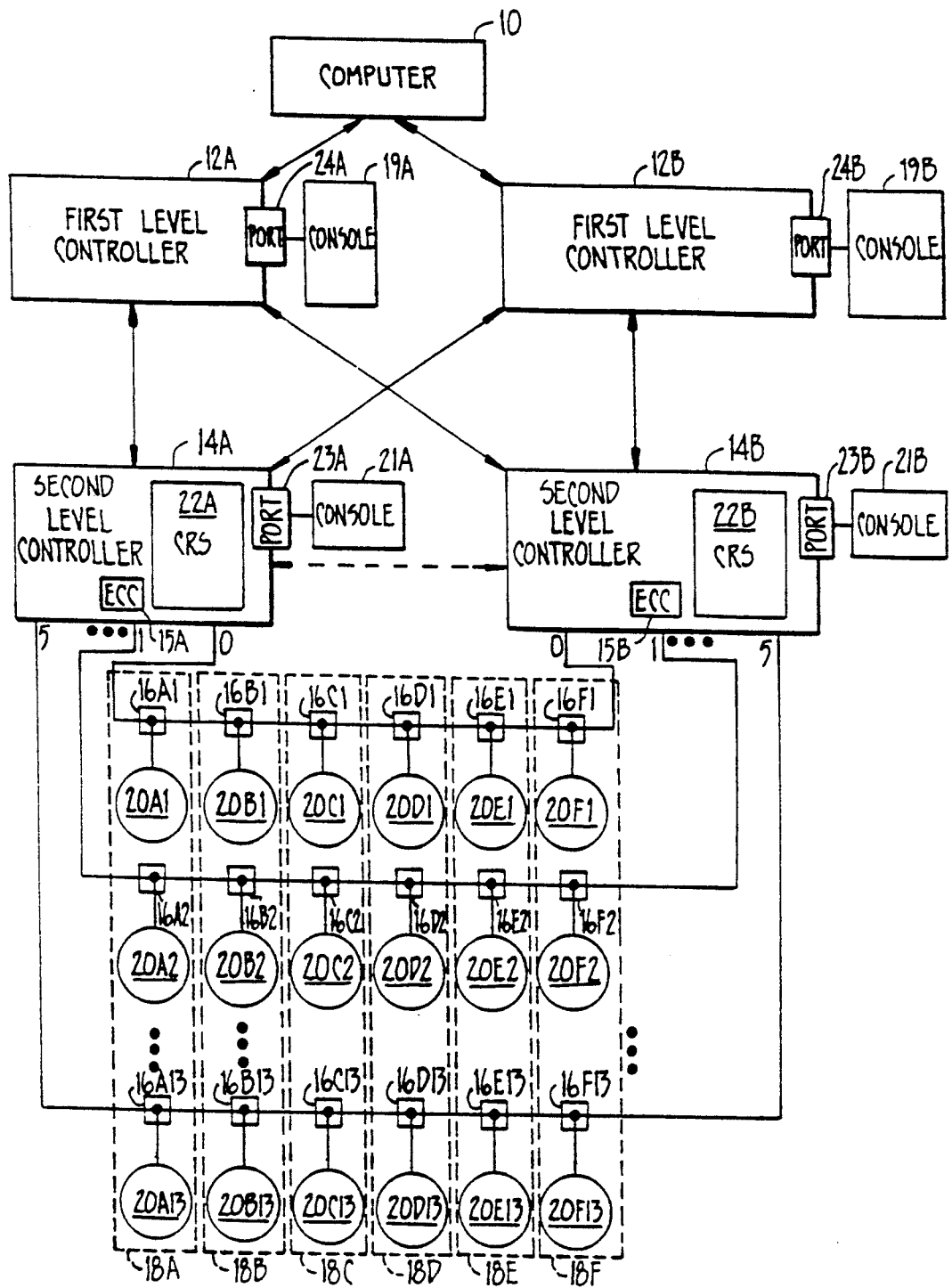
FIG._4.

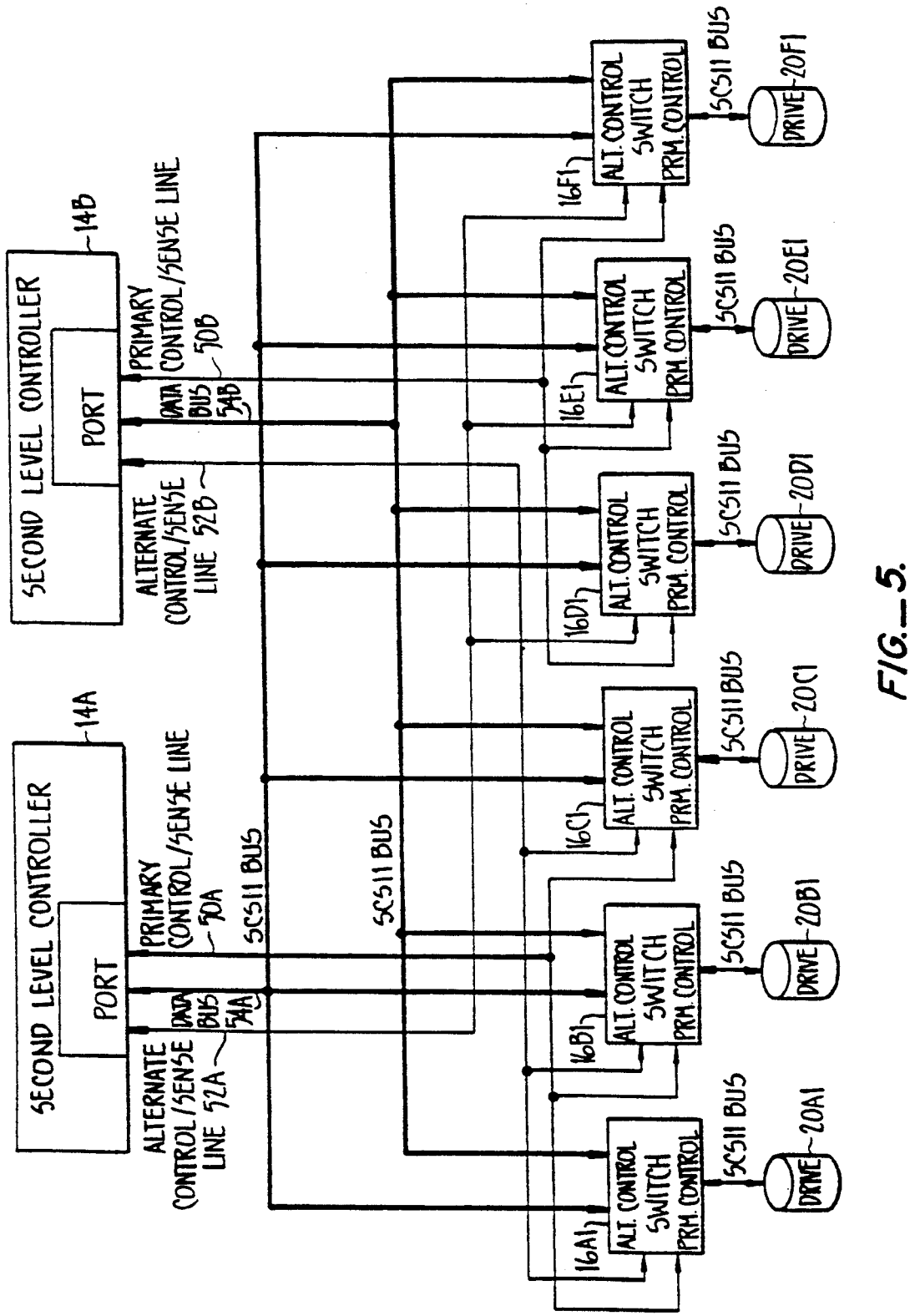
FIG._5.

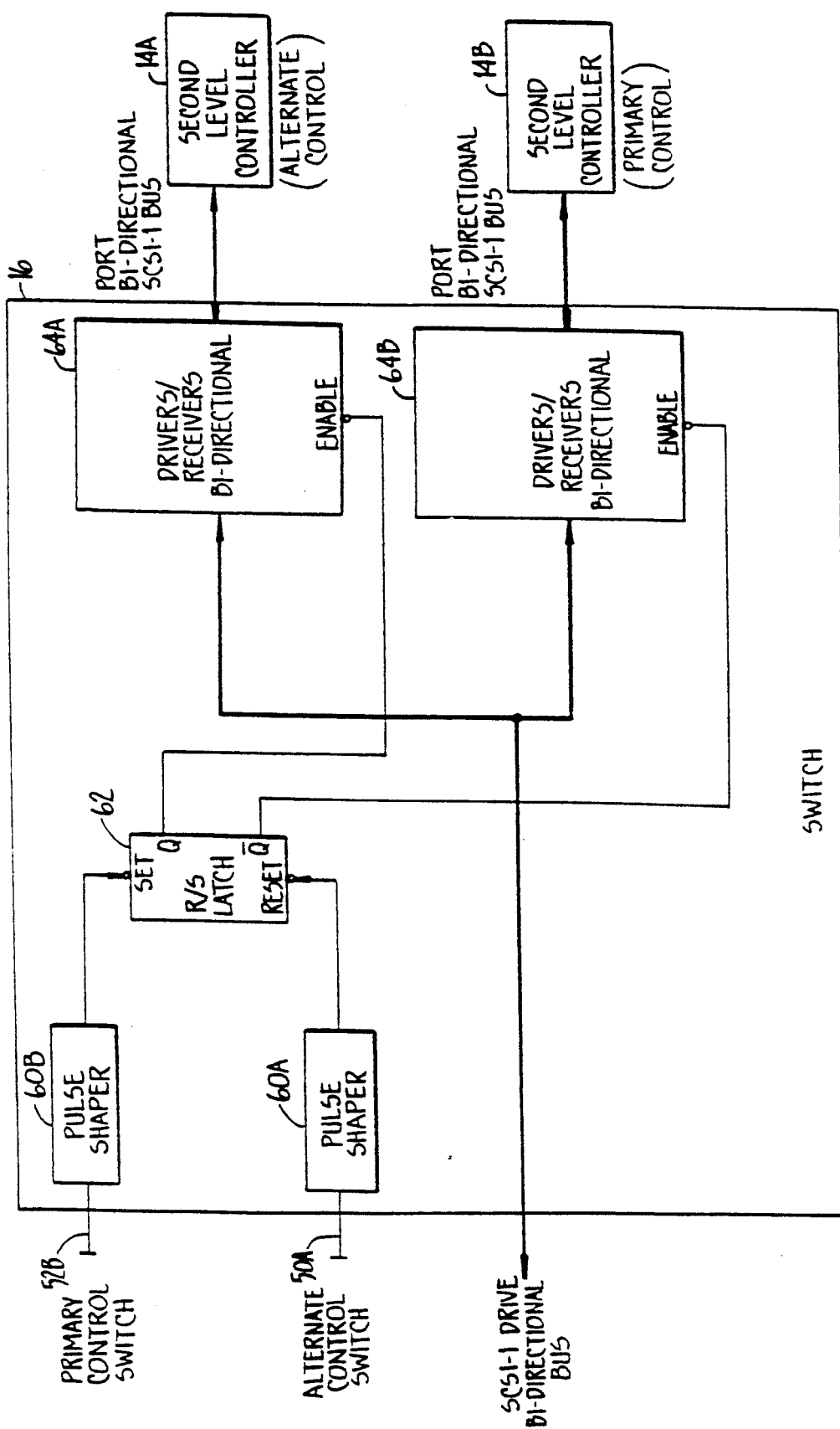
FIG._6.

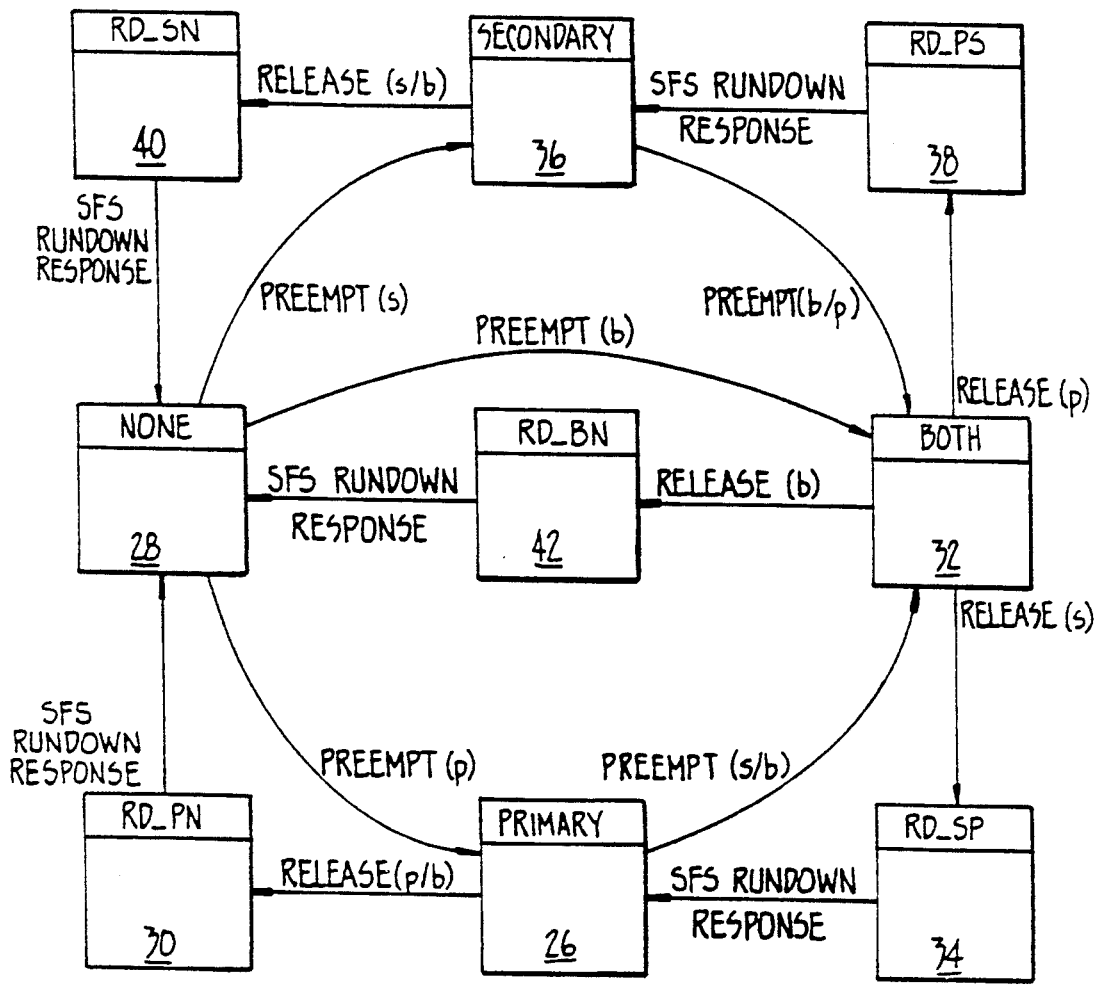
FIG._7

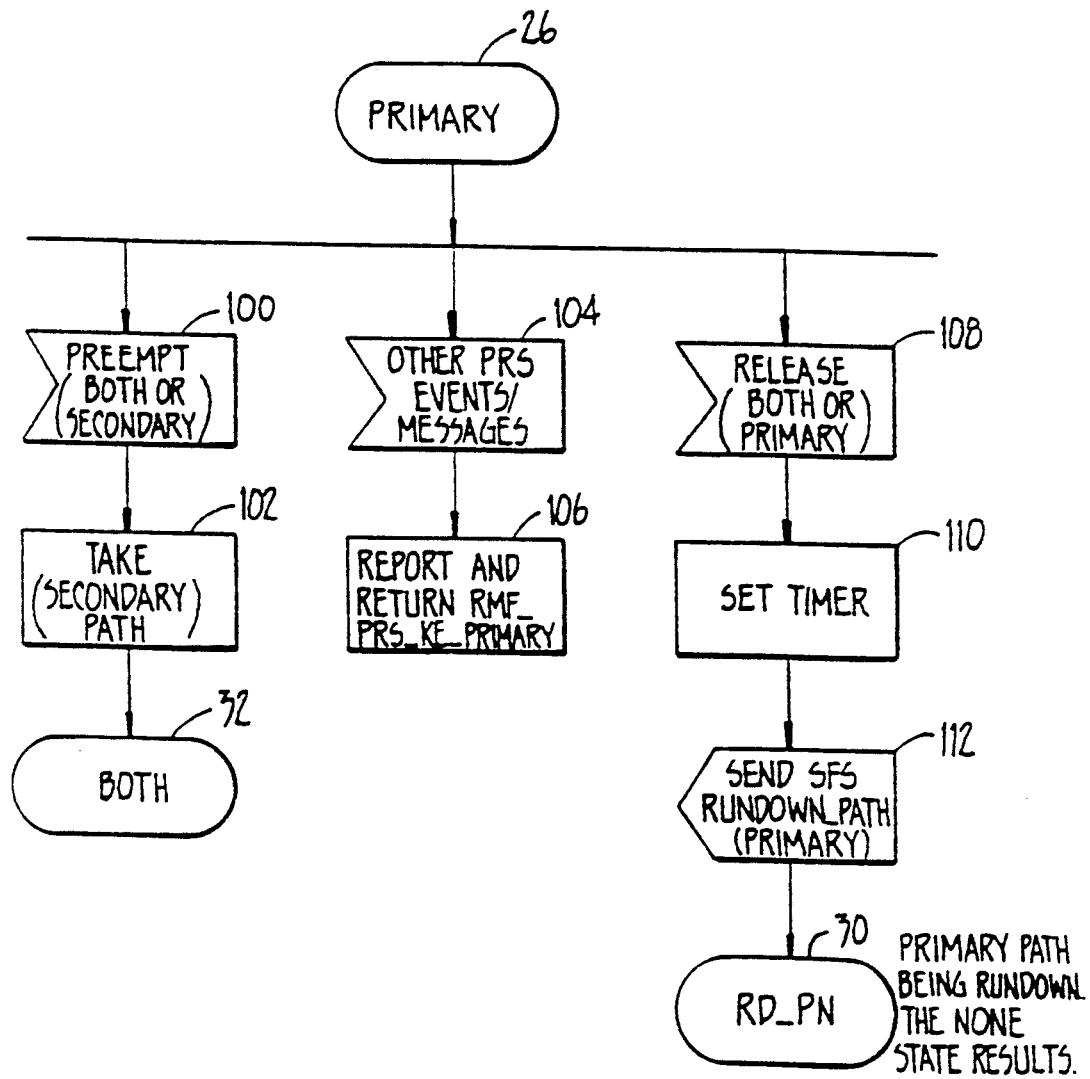
FIG._8A.

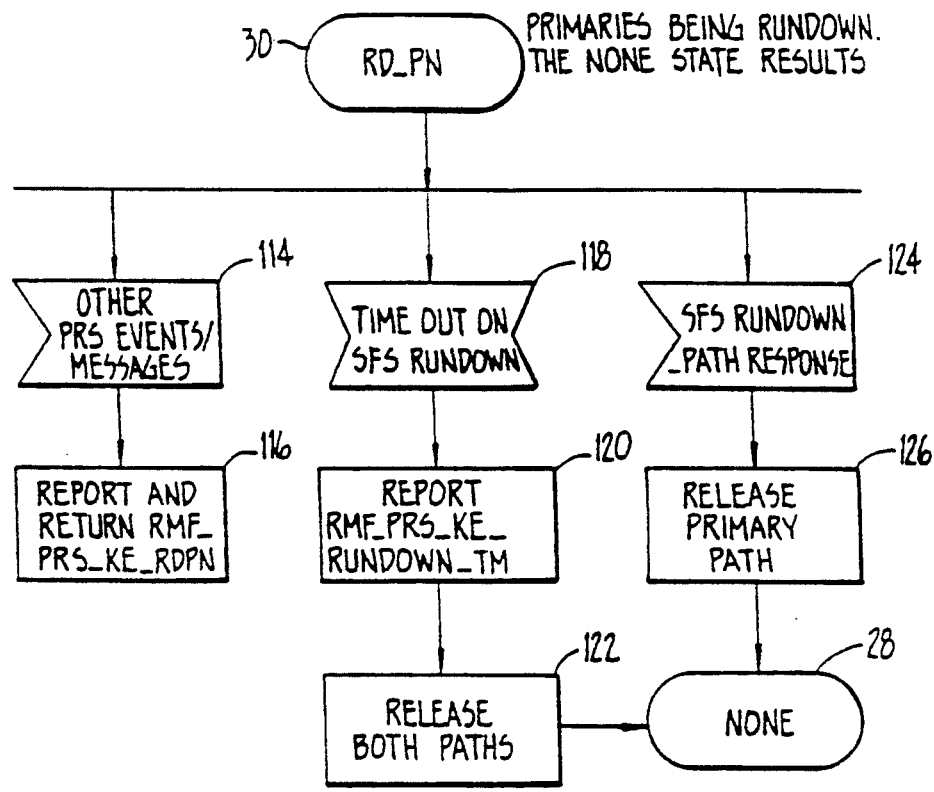
FIG._8B.
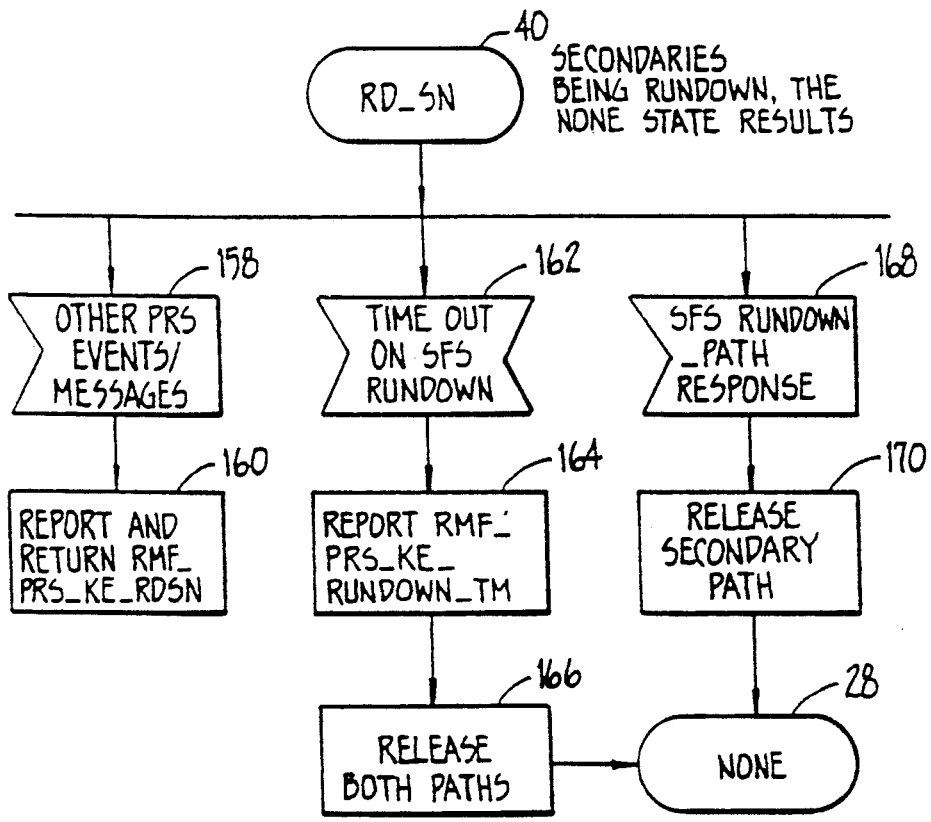
FIG._8E.

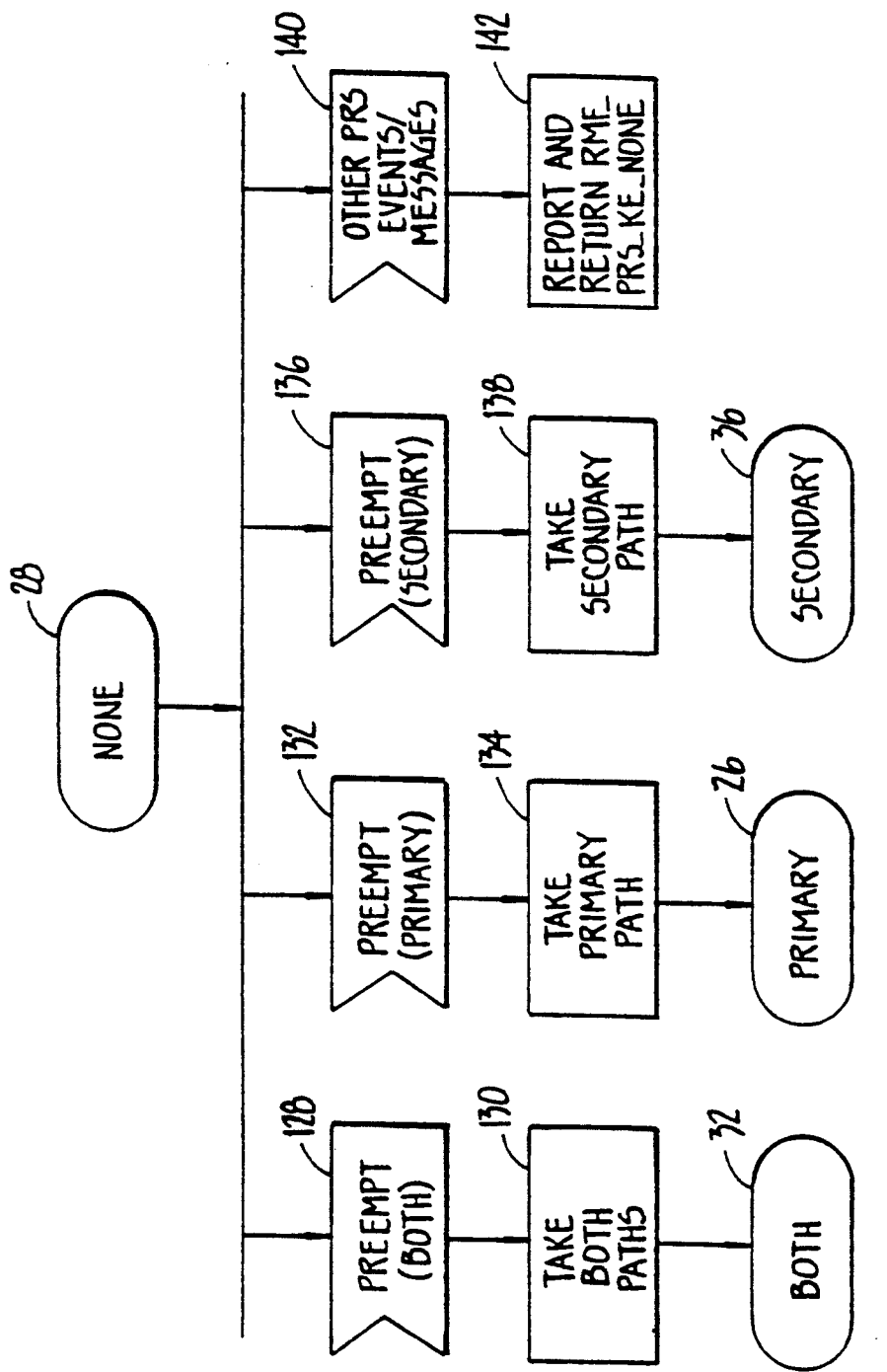
FIG._8C.

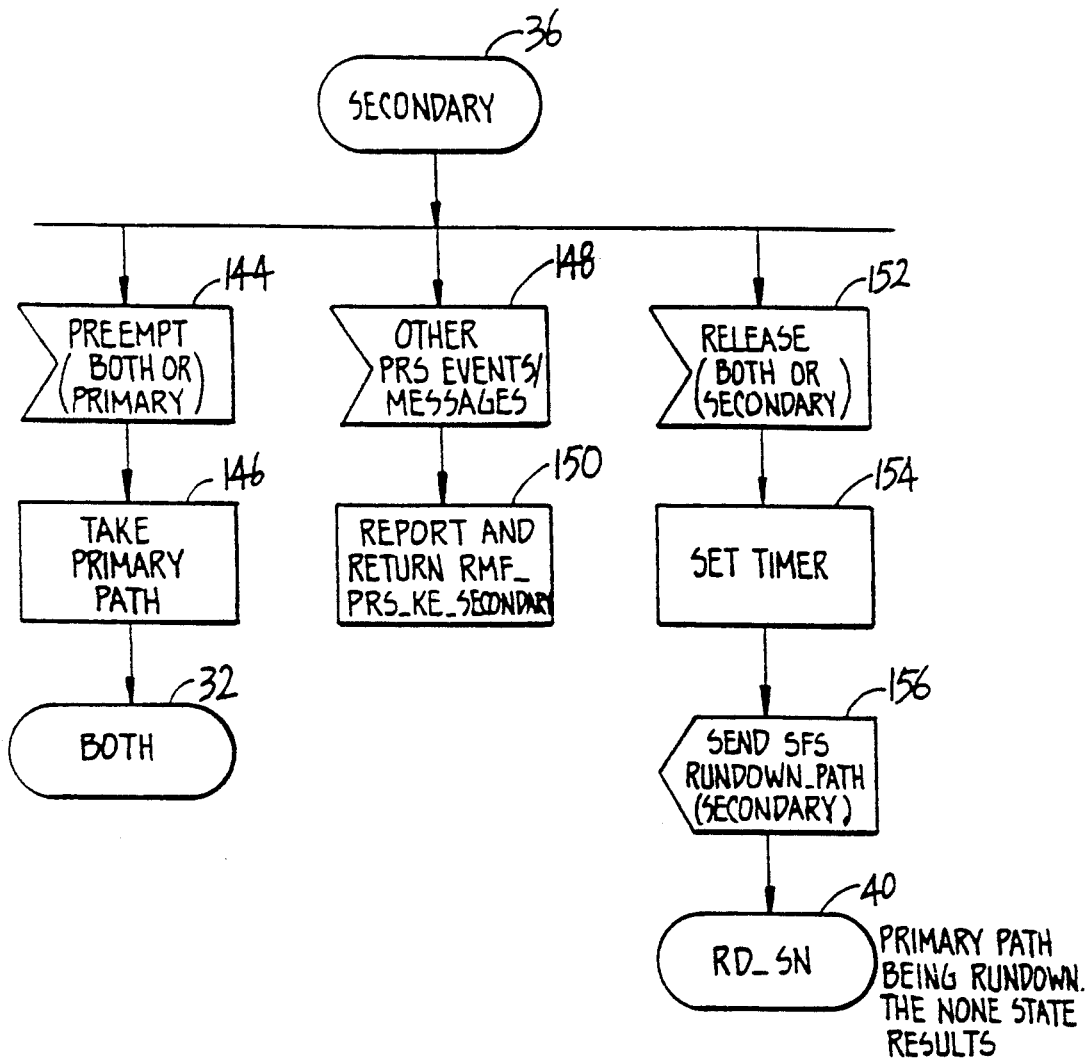
FIG._8D.

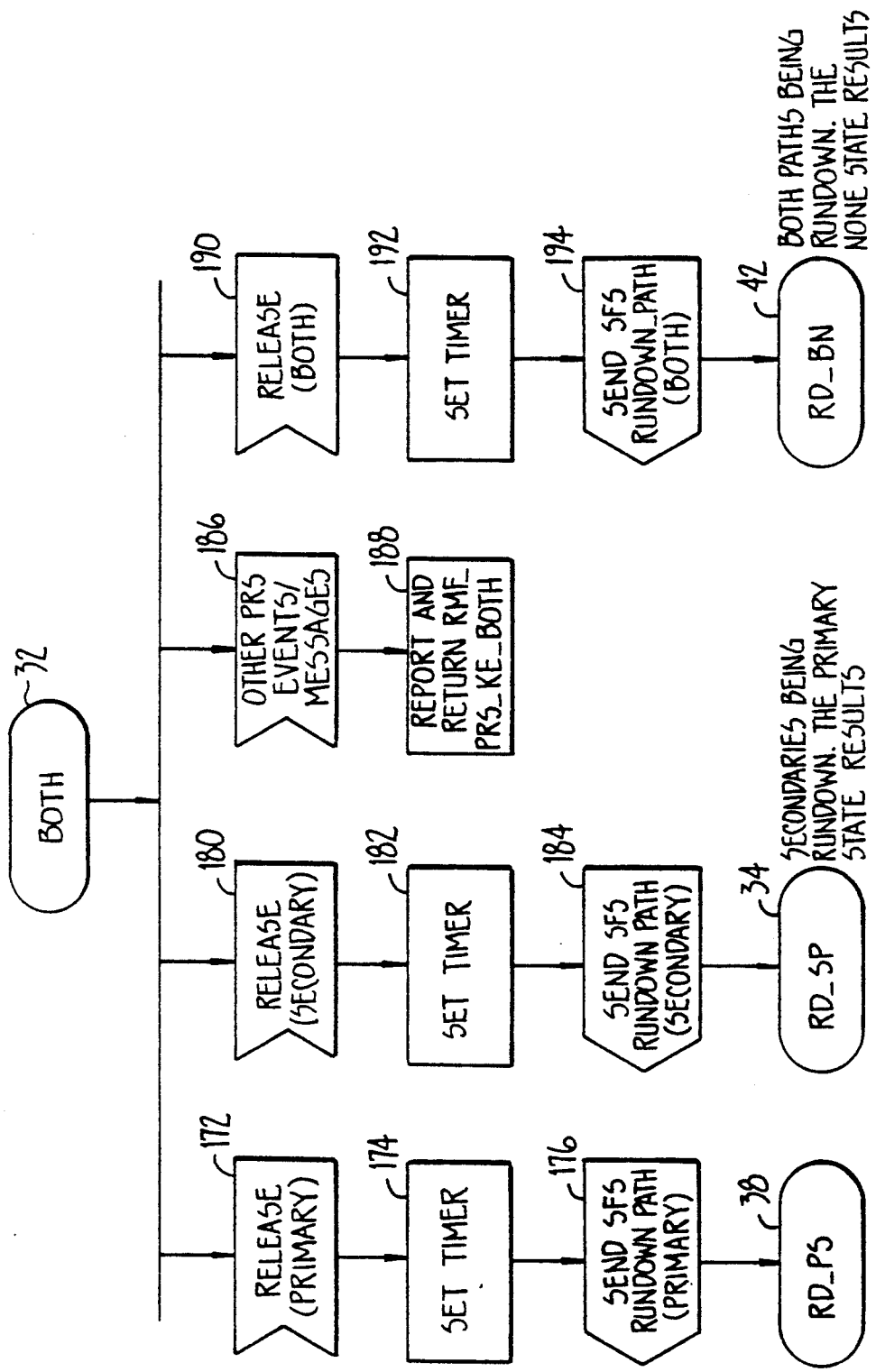

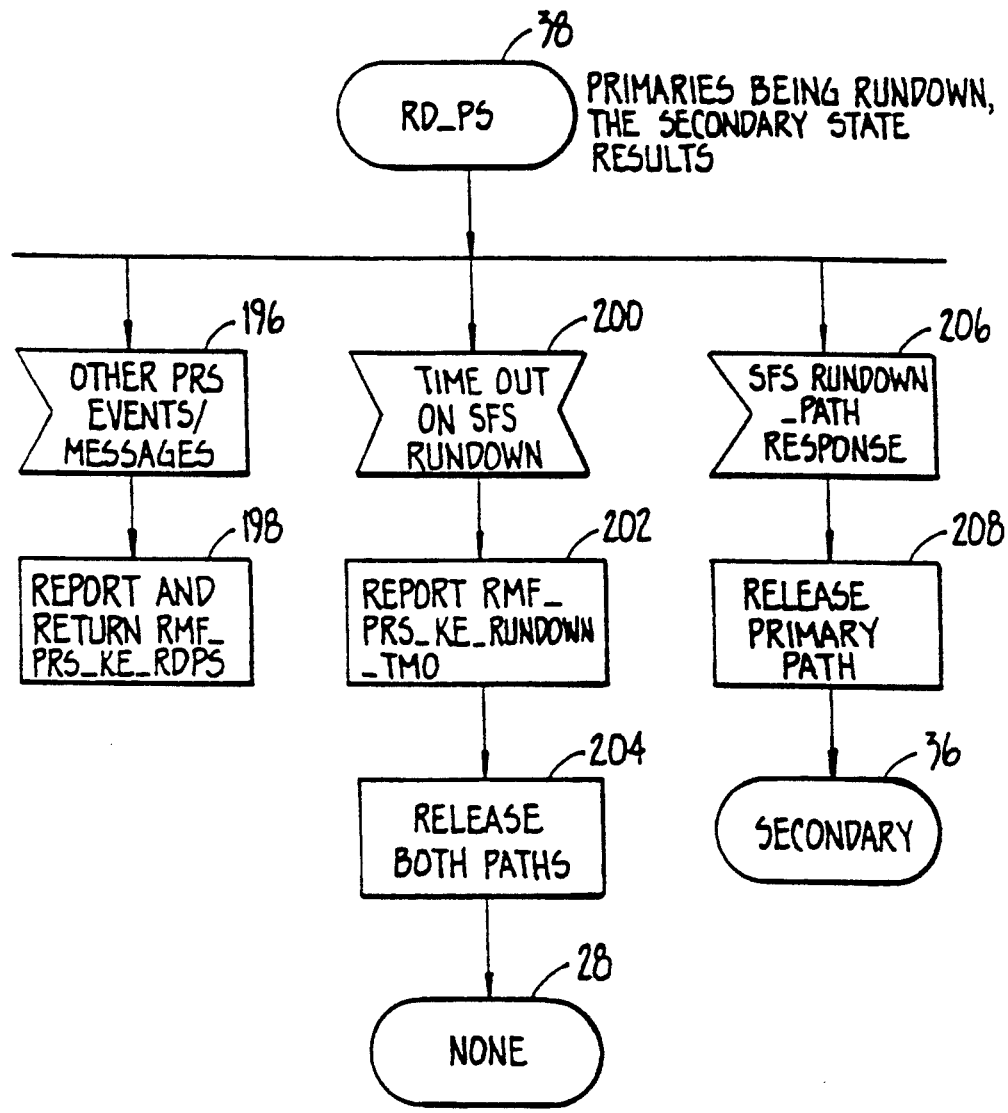
FIG._8G.

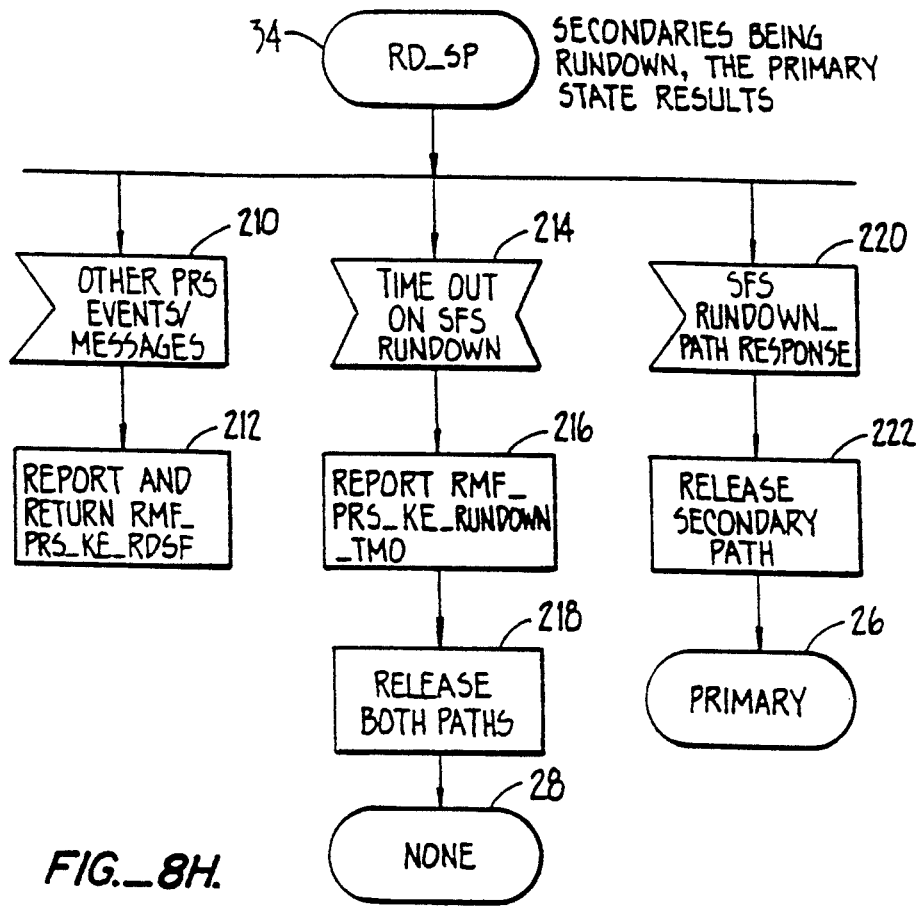
FIG._8H.
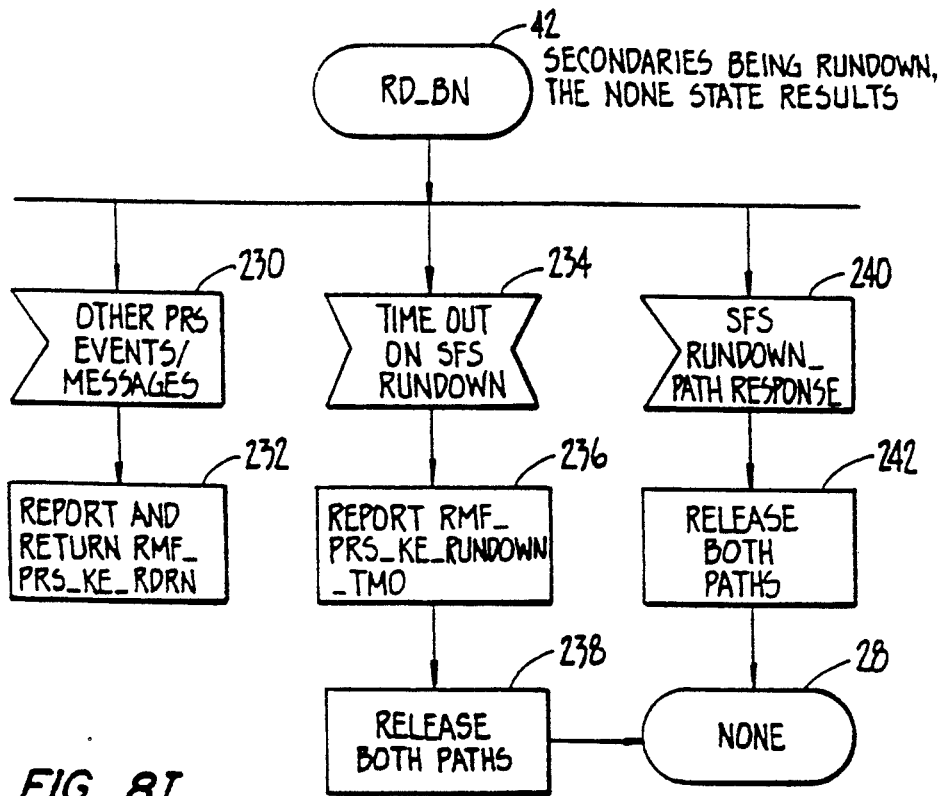
FIG._8I.

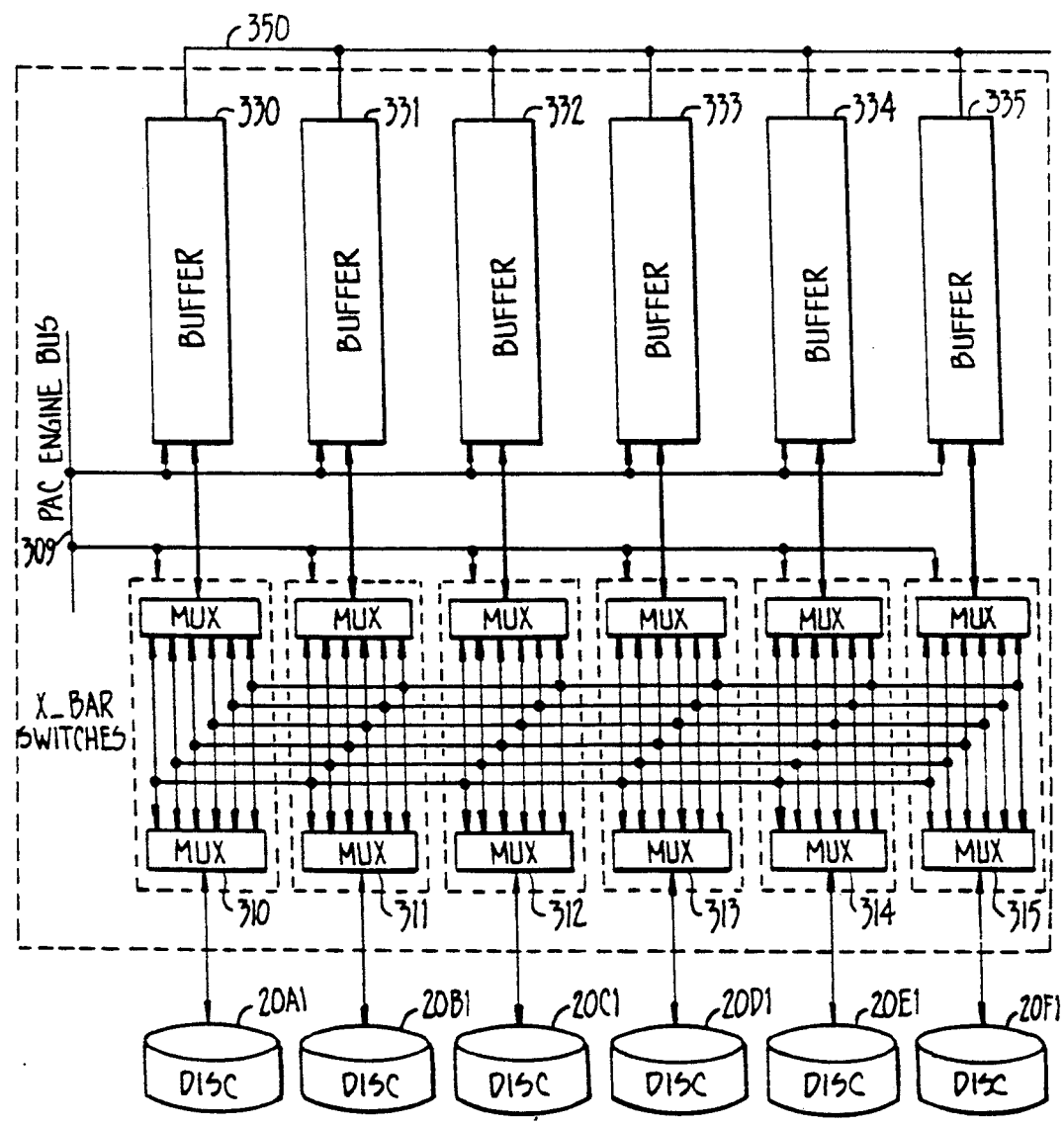
FIG._9.

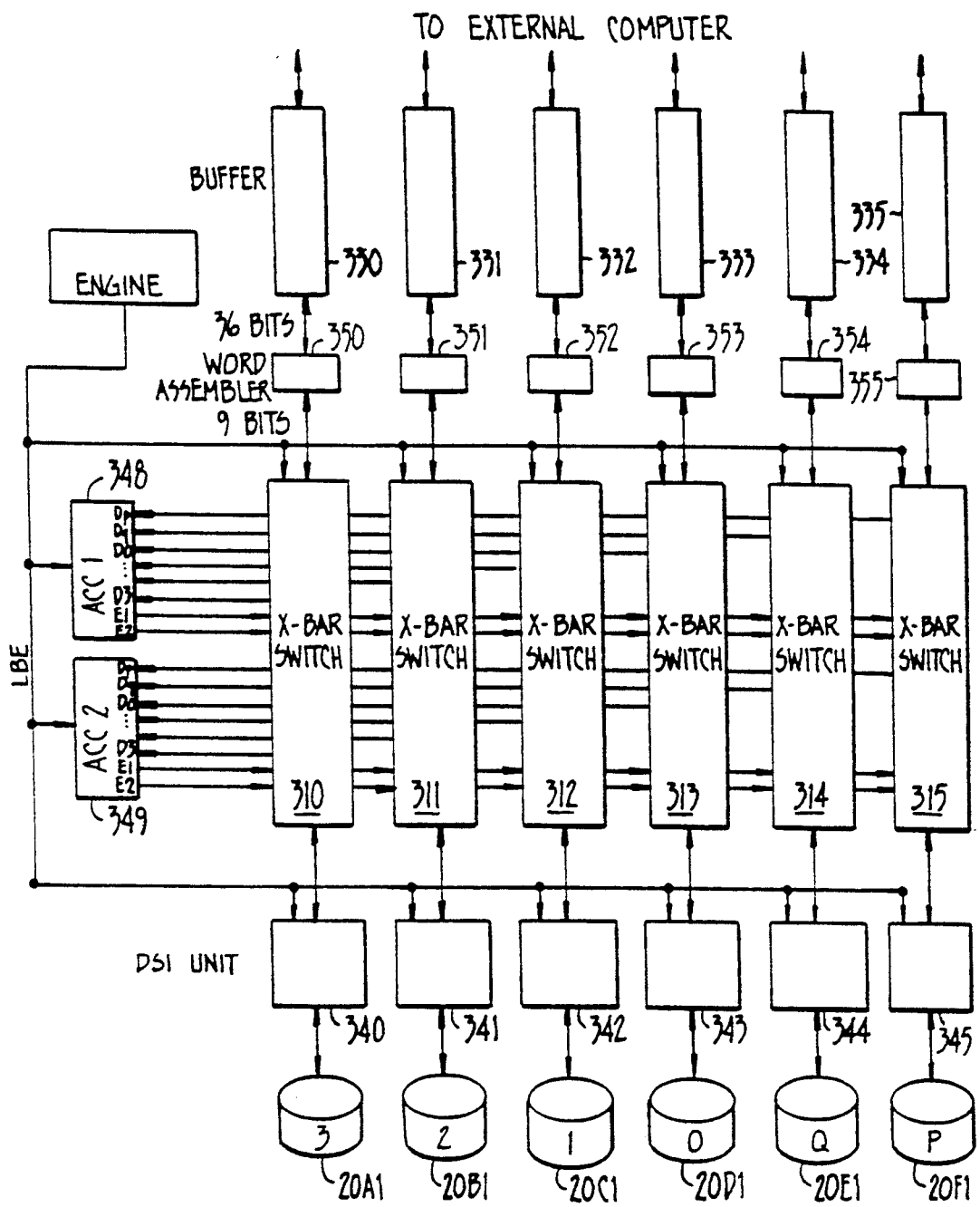
FIG._10.

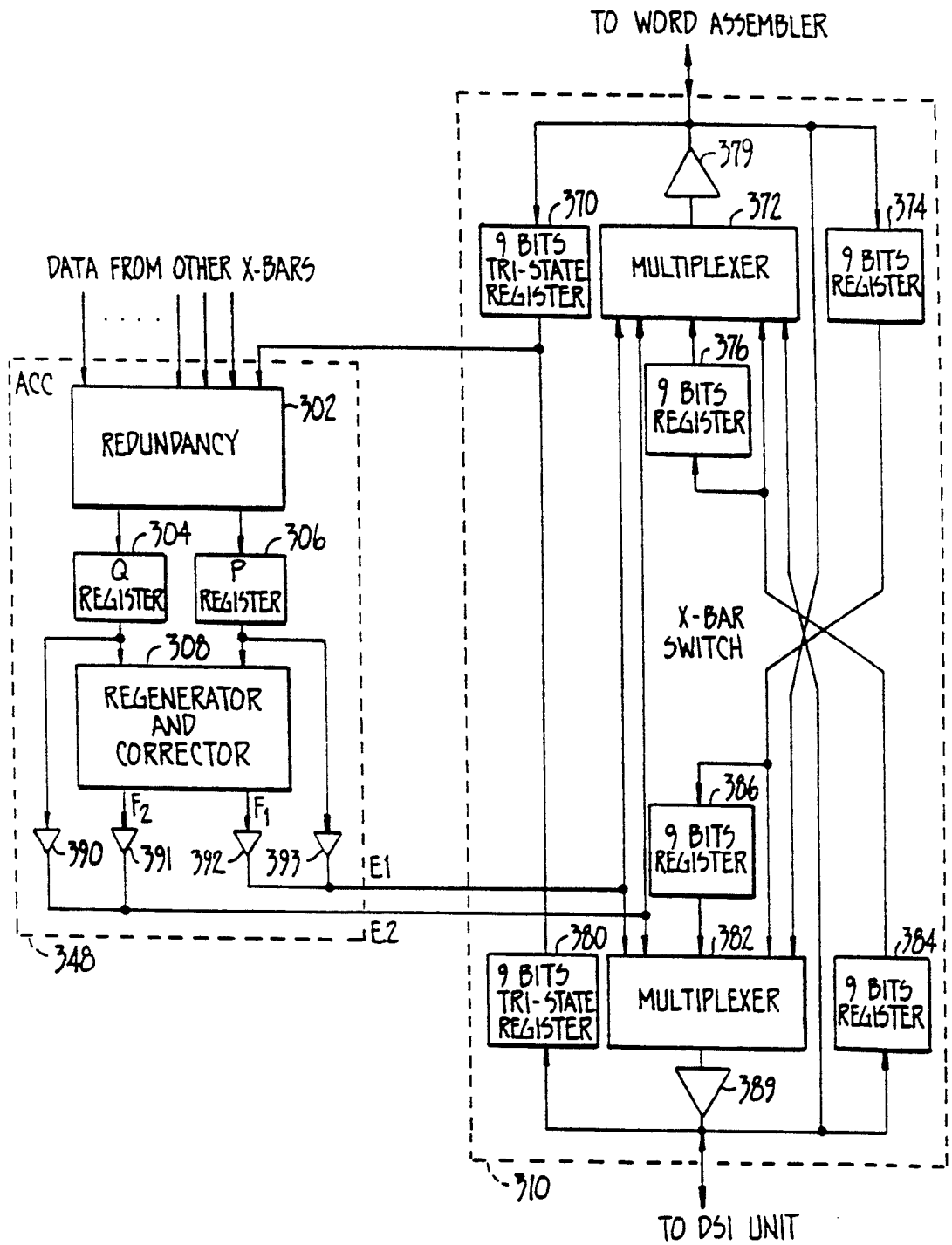
FIG._11.

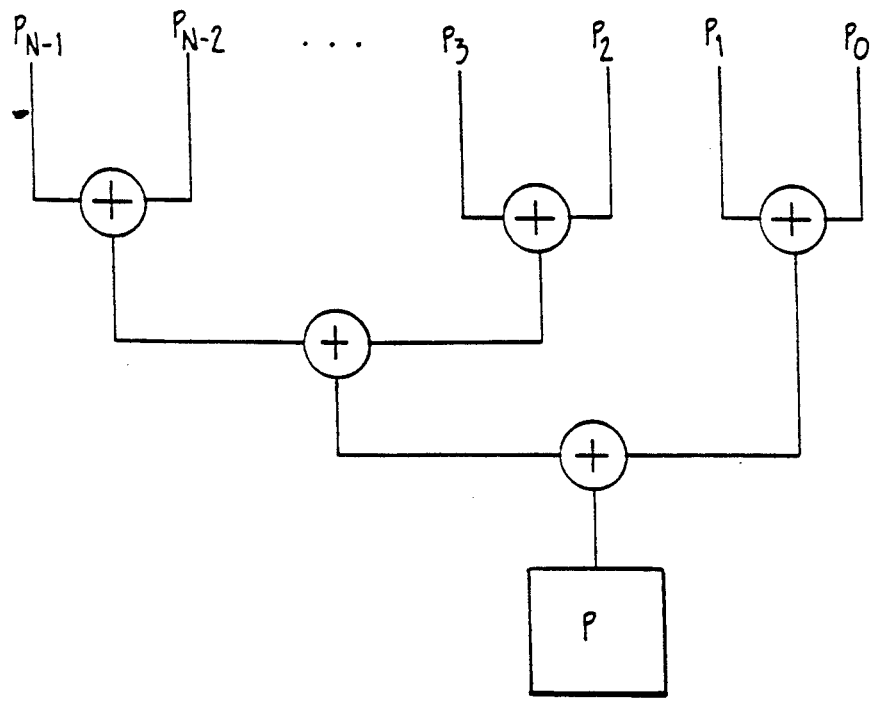
FIG._12A.
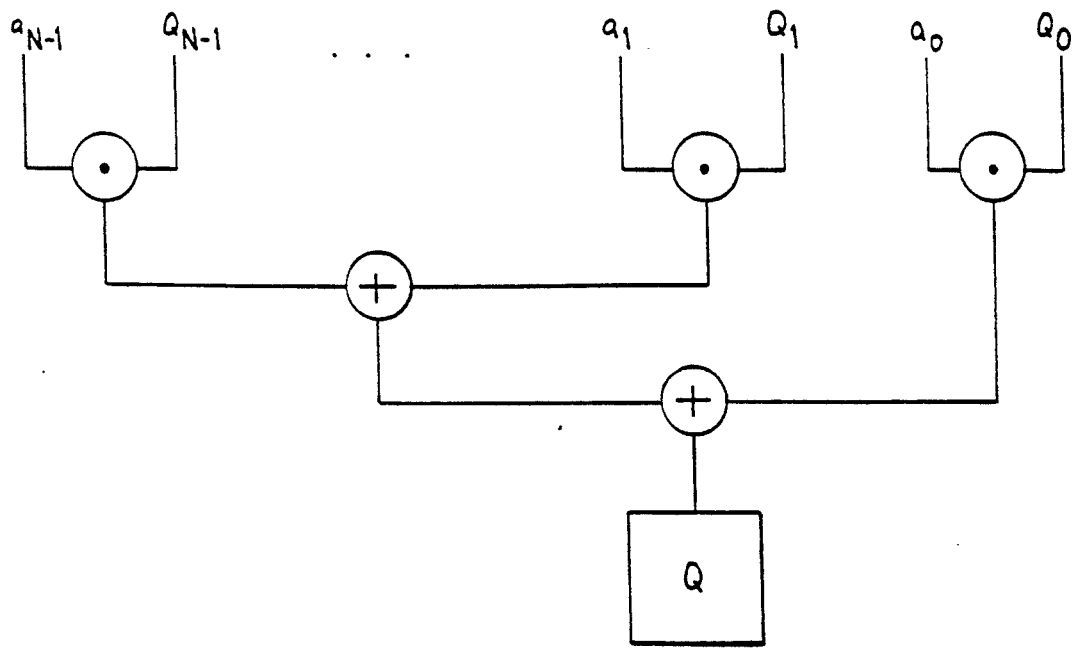
FIG._12B.

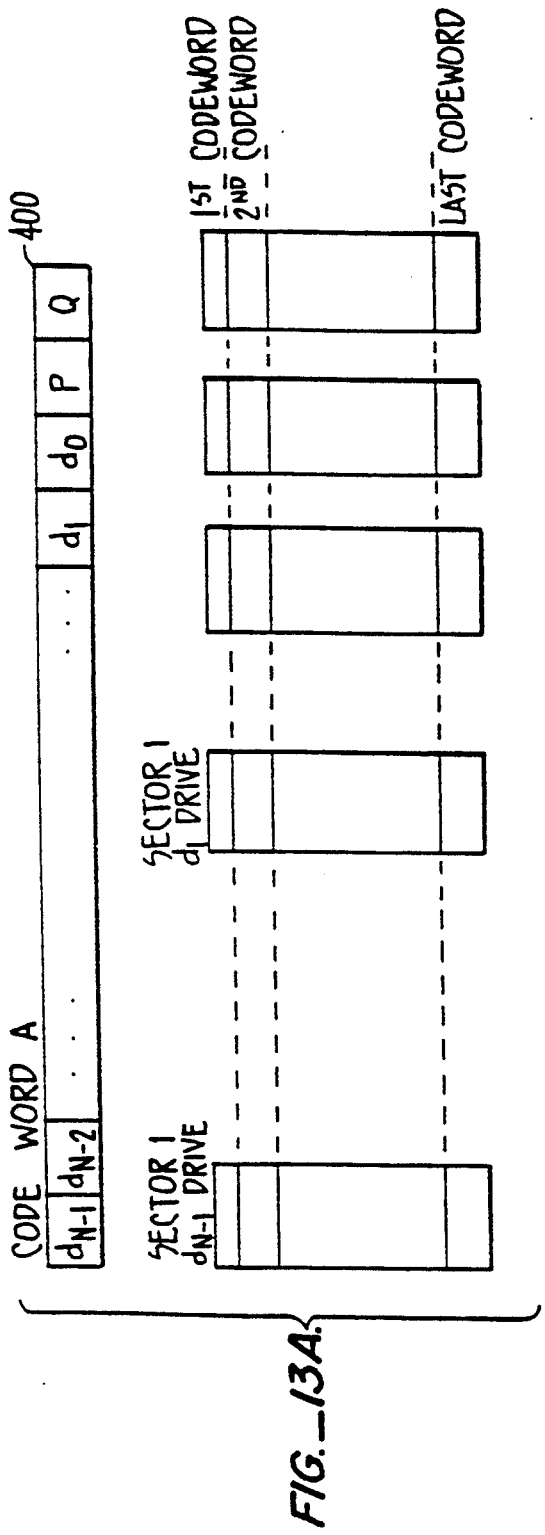
FIG._13A.
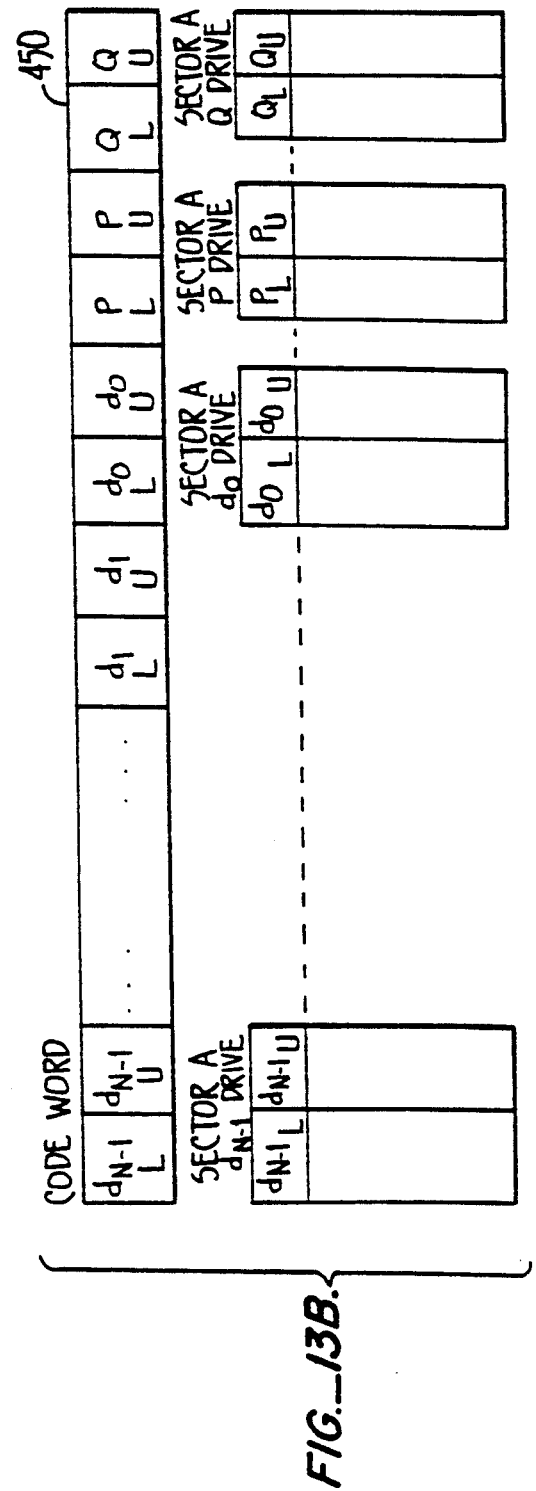
FIG._13B.

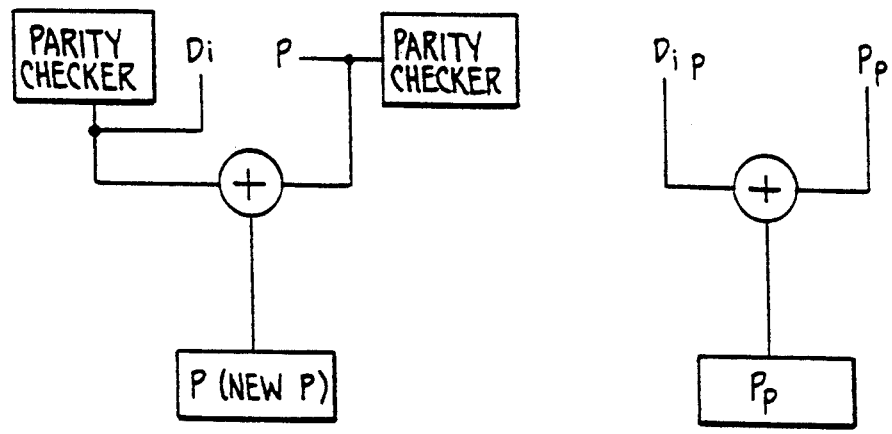
FIG._14A.
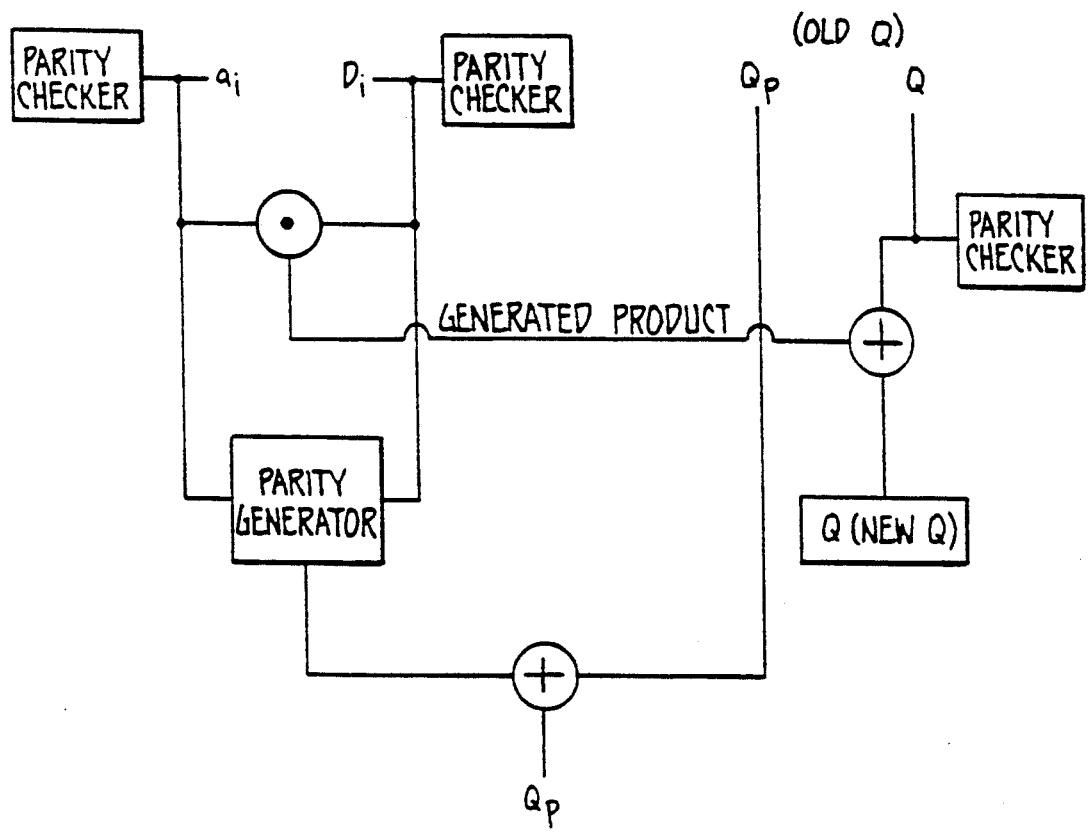
FIG._14B.

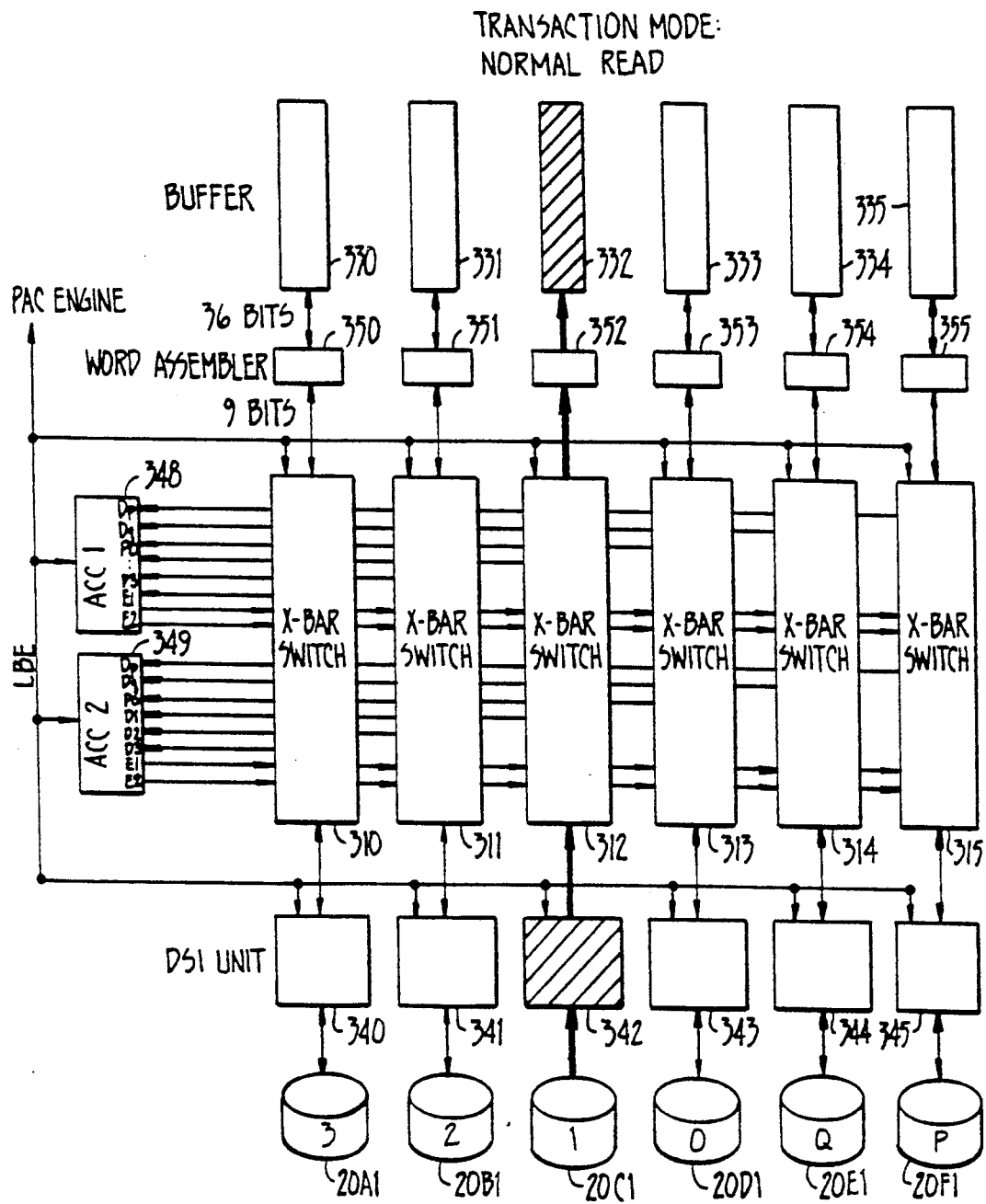
FIG._15.

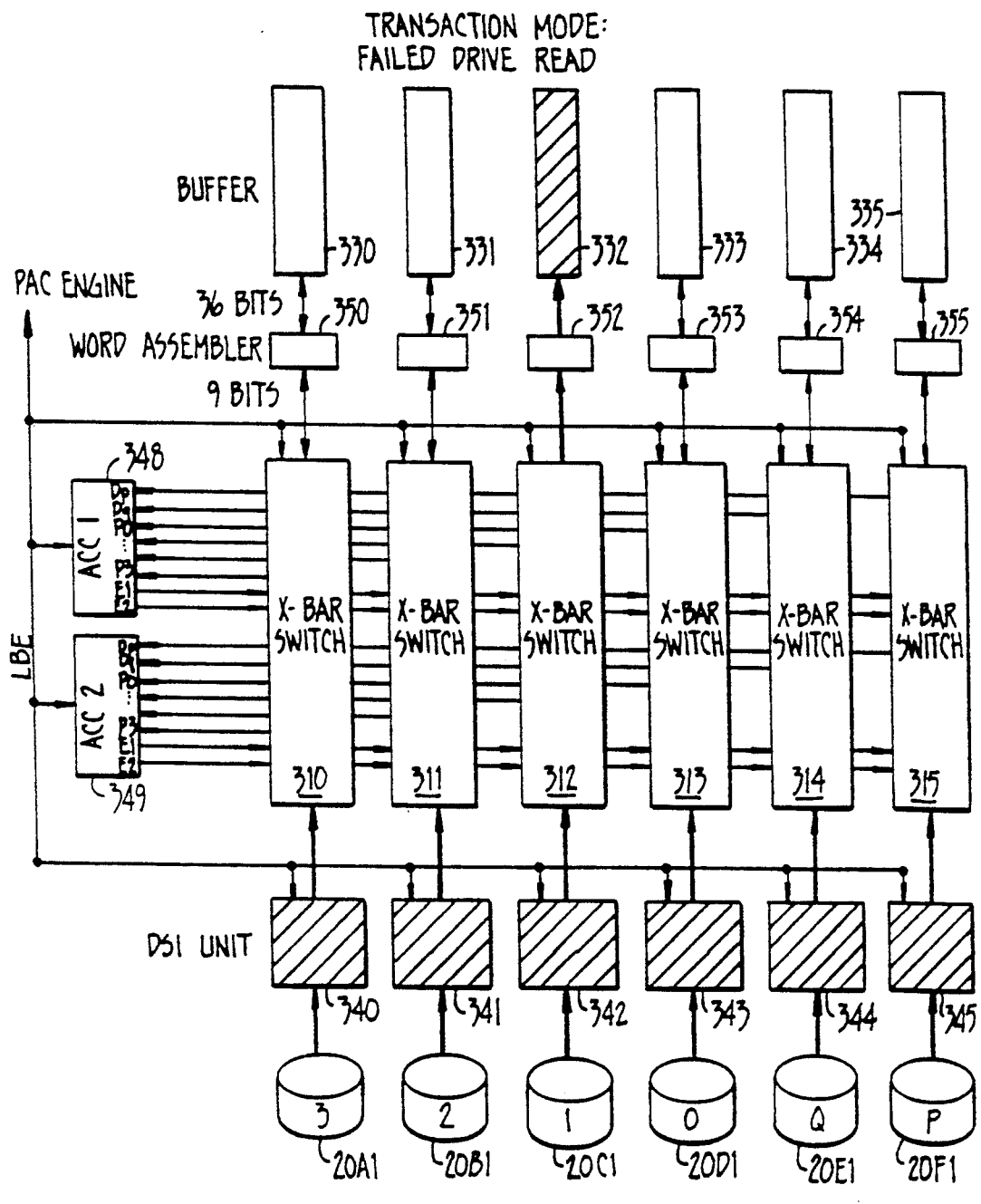
FIG._16.

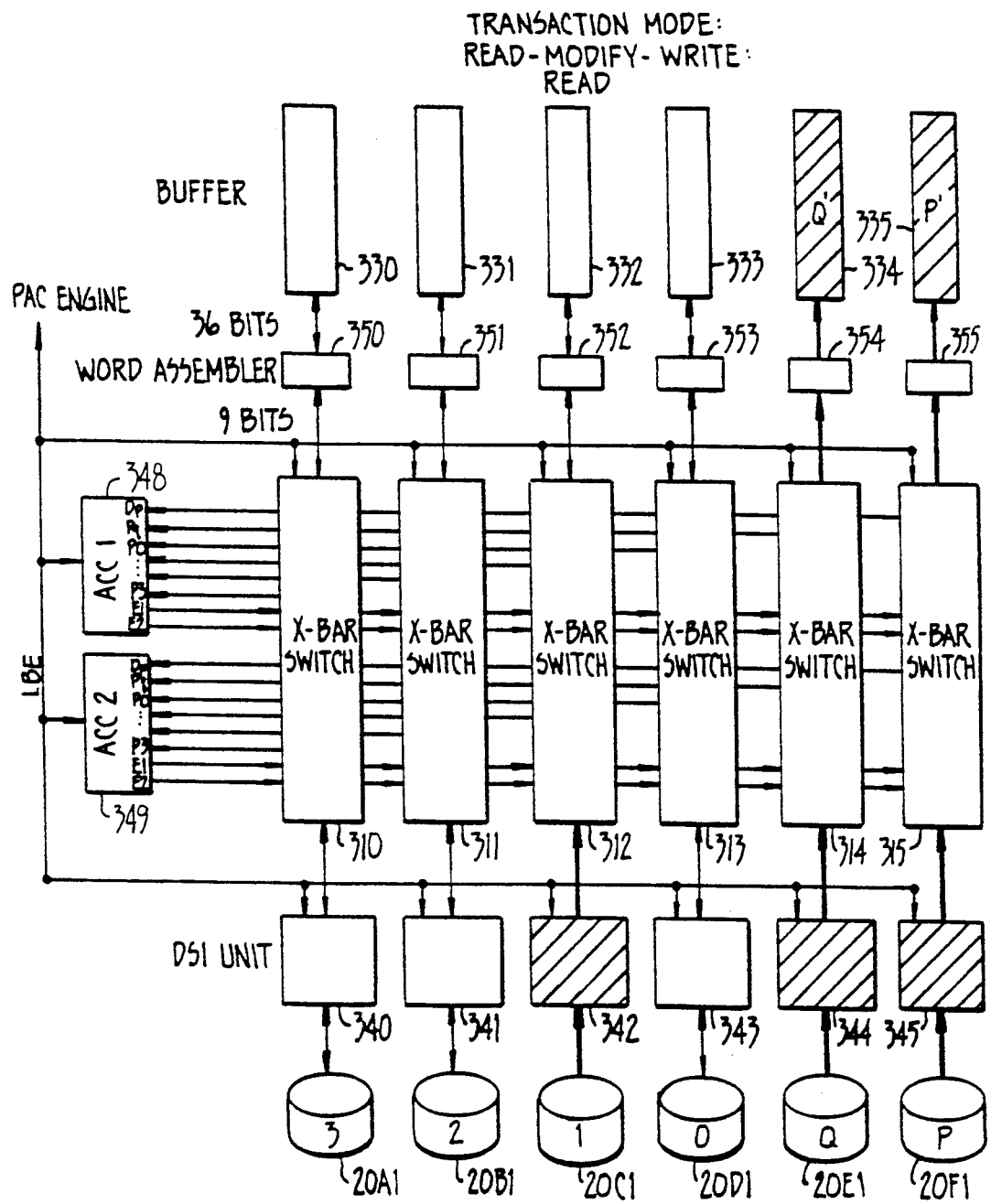
FIG._17.

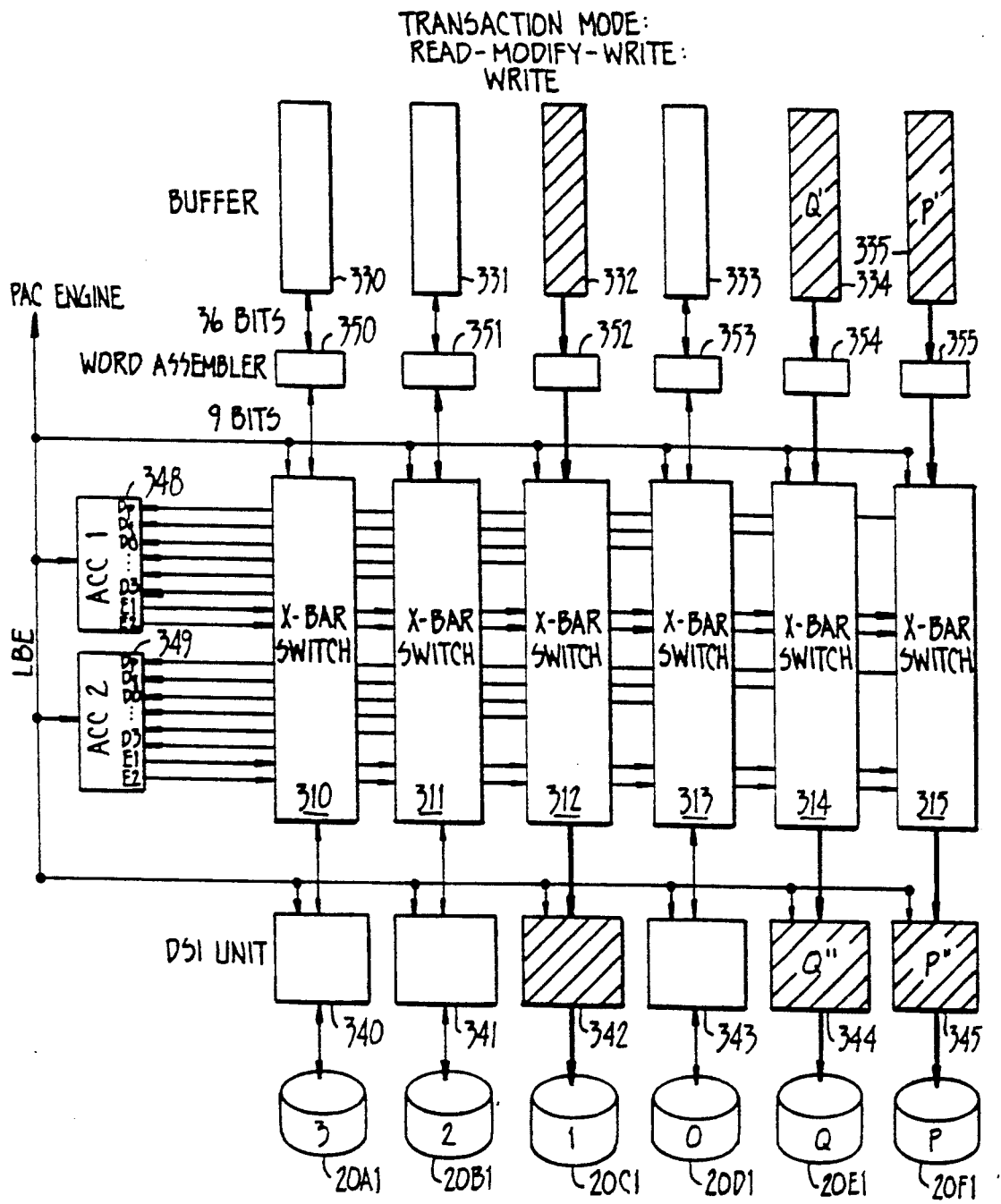
FIG._18.

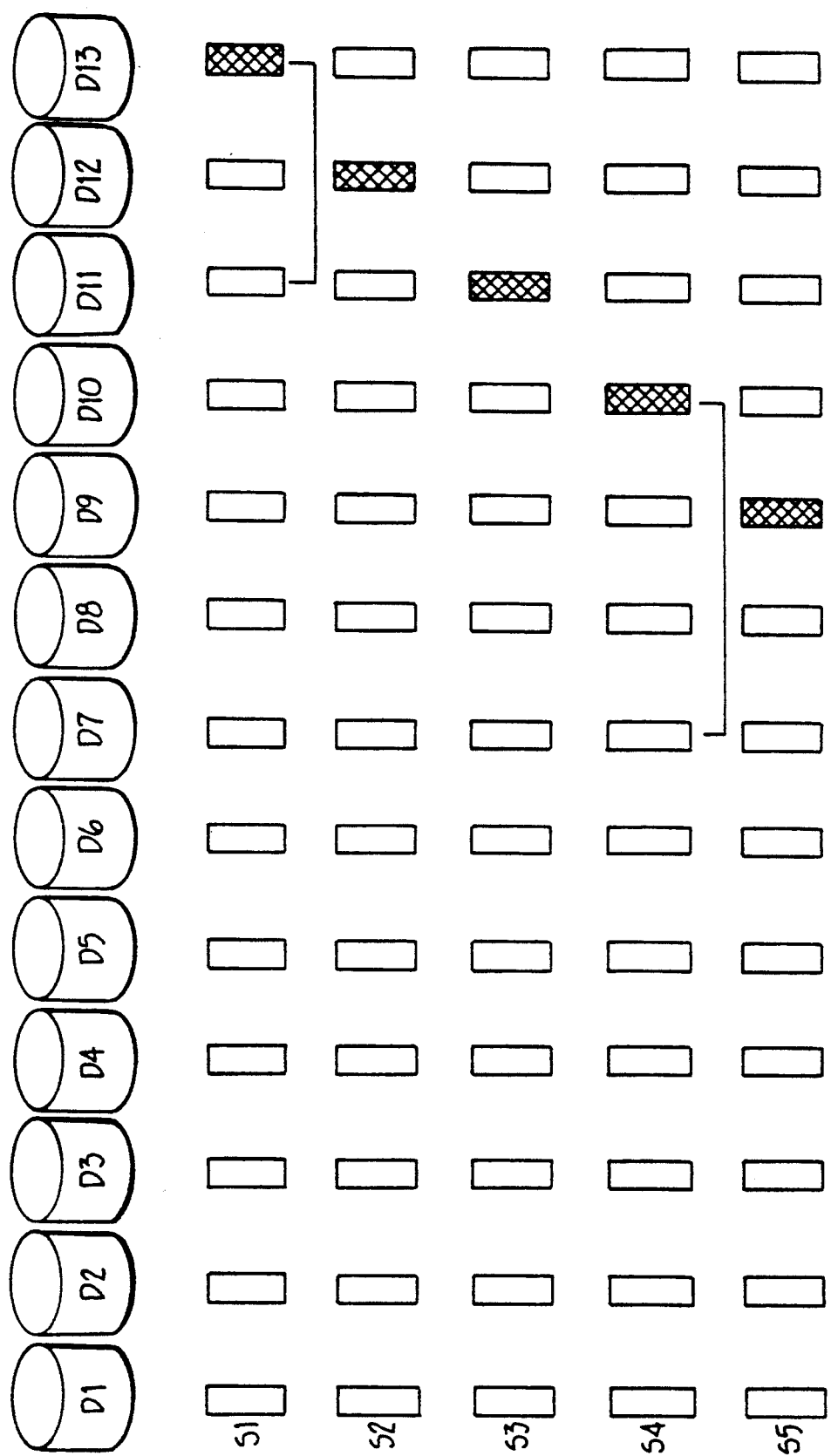
FIG._19.

FIG. 22.

DISK ARRAY SYSTEM

CROSS REFERENCE TO RELATED APPLICATIONS

This is a continuation of application Ser. No. 07/601,482 filed Oct. 22, 1990 which is a continuation-in-part of Ser. Nos. 07/505,622, 07/506,703, and 07/488,749, filed Apr. 6, 1990, Apr. 6, 1990, and Mar. 2, 1990, respectively.

BACKGROUND OF THE INVENTION

The present invention relates generally to memory storage devices. More particularly, the invention is a method and apparatus for interfacing an external computer to a set of storage devices which are typically disk drives.

Magnetic disk drive memories for use with digital computer systems are known. Although many types of disk drives are known, the present invention will be described as using hard disk drives. However, nothing herein should be taken to limit the invention to that particular embodiment.

Many computer systems use a plurality of disk drive memories to store data. A common known architecture for such systems is shown in FIG. 1. Therein, computer 10 is coupled by means of bus 15 to disk array 20. Disk array 20 is comprised of large buffer 22, bus 24, and a plurality of disk drives 30. The disk drives 30 can be operated in various logical configurations. When a group of drives is operated collectively as a logical device, data stored during a write operation can be spread across one or more members of an array. Disk controllers 35 are connected to buffer 22 by bus 24. Each controller 35 is assigned a particular disk drive 30.

Each disk drive within disk drive array 20 is accessed and the data thereon retrieved individually. The disk controller 35 associated with each disk drive 30 controls the input/output operations for the particular disk drive to which it is coupled. Data placed in buffer 22 is available for transmission to computer 10 over bus 15. When the computer transmits data to be written on the disks, controllers 35 receive the data for the individual disk drives from bus 24. In this type of system, disk operations are asynchronous in relationship to each other.

In the case where one of the controllers experiences a failure, the computer must take action to isolate the failed controller and to switch the memory devices formerly under the failed controller's control to a properly functioning other controller. The switching requires the computer to perform a number of operations. First, it must isolate the failed controller. This means that all data flow directed to the failed controller must be redirected to a working controller.

In the system described above, it is necessary for the computer to be involved with rerouting data away from a failed controller. The necessary operations performed by the computer in completing rerouting requires the computer's attention. This places added functions on the computer which may delay other functions which the computer is working on. As a result, the entire system is slowed down.

Another problem associated with disk operations, in particular writing and reading, is an associated probability of error. Procedures and apparatus have been developed which can detect and, in some cases, correct the errors which occur during the reading and writing of the disks. With relation to a generic disk drive, the disk is divided into a plurality of sectors, each sector having the same, predetermined size. Each sector has a particular header field, which gives the sector a unique address, a header field code which allows for the detection of errors in the header field, a data field of variable length and ECC ("Error Correction Code") codes, which allow for the detection and correction of errors in the data.

When a disk is written to, the disk controller reads the header field and the header field code. If the sector is the desired sector and no header field error is detected, the new data is written into the data field and the new data ECC is written into the ECC field.

Read operations are similar in that initially both the header field and header field error code are read. If no header field errors exist, the data and the data correction codes are read. If no error is detected the data is transmitted to the computer. If errors are detected, the error correction circuitry located within the disk controller tries to correct the error. If this is possible, the corrected data is transmitted. Otherwise, the disk drive's controller signals to the computer or master disk controller that an uncorrectable error has been detected.

In FIG. 2 a known disk drive system which has an associated error correction circuit, external to the individual disk controllers, is shown. This system uses a Reed-Solomon error detection code both to detect and correct errors. Reed-Solomon codes are known and the information required to generate them is described in many references. One such reference is *Practical Error Correction Design for Engineers,* published by Data Systems Technology Corp., Broomfield, Colo. For purposes of this application, it is necessary to know that the Reed-Solomon code generates redundancy terms, herein called P and Q redundancy terms, which terms are used to detect and correct data errors.

In the system shown in FIG. 2, ECC 42 unit is coupled to bus 45. The bus is individually coupled to a plurality of data disk drives, numbered here 47, 48, and 49, as well as to the P and Q term disk drives, numbered 51 and 53 through Small Computer Standard Interfaces ("SCSIs") 54 through 58. The American National Standard for Information Processing ("ANSI") has promulgated a standard for SCSI which is described in ANSI document number X3.130-1986.

Bus 45 is additionally coupled to large output buffer 22. Buffer 22 is in turn coupled to computer 10. In this system, as blocks of data are read from the individual data disk drives, they are individually and sequentially placed on the bus and simultaneously transmitted both to the large buffer and the ECC unit. The P and Q terms from disk drives 51 and 53 are transmitted to ECC 42 only. The transmission of data and the P and Q terms over bus 45 occurs sequentially. The exact bus width can be any arbitrary size with 8-, 16- and 32-bit wide buses being common.

After a large block of data is assembled in the buffer, the calculations necessary to detect and correct data errors, which use the terms received from the P and Q disk drives, are performed within the ECC unit 42. If errors are detected, the transfer of data to the computer is interrupted and the incorrect data is corrected, if possible.

During write operations, after a block of data is assembled in buffer 22, new P and Q terms are generated within ECC unit 42 and written to the P and Q disk drives at the same time that the data in buffer 22 is written to the data disk drives.

Those disk drive systems which utilize known error correction techniques have several shortcomings. In the systems illustrated in FIGS. 1 and 2, data transmission is sequential over a single bus with a relatively slow rate of data transfer. Additionally, as the error correction circuitry must wait until a block of data of predefined size is assembled in the buffer before it can detect and correct errors therein, there is an unavoidable delay while such detection and correction takes place.

As stated, the most common form of data transmission in these systems is serial data transmission. Given that the bus has a fixed width, it takes a fixed and relatively large amount of time to build up data in the buffer for transmission either to the disks or computer. If the large, single buffer fails, all the disk drives coupled thereto become unusable. Therefore, a system which has a plurality of disk drives which can increase the rate of data transfer between the computer and the disk drives and more effectively match the data transfer rate to the computer's maximum efficient operating speed is desirable. The system should also be able to conduct this high rate of data transfer while performing all necessary error detection and correction functions and at the same time provide an acceptable level of performance even when individual disk drives fail.

Another failing of prior art systems is that they do not exploit the full range of data organizations that are possible in a system using a group of disk drive arrays. In other words, a mass storage apparatus made up of a plurality of physical storage devices may be called upon to operate as a logical storage device for two concurrently-running applications having different data storage needs. For example, one application requiring large data transfers (i.e., high bandwidth), and the other requiring high frequency transfers (i.e., high operation rate). A third application may call upon the apparatus to provide both high bandwidth and high operating rate. Known operating techniques for physical device sets do not provide the capability of dynamically configuring a single set of physical storage devices to provide optimal service in response to such varied needs.

It would therefore be desirable to be able to provide a mass storage apparatus, made up of a plurality of physical storage devices, which could flexibly provide both high bandwidth and high operation rate, as necessary, along with high reliability.

SUMMARY OF THE INVENTION

The present invention provides a set of small, inexpensive disk drives that appears to an external computer as one or more logical disk drives. The disk drives are arranged in sets. Data is broken up and written across the disk drives in a set, with error detection and correction redundancy data being generated in the process and also being written to a redundancy area. Backup disk drives are provided which can be coupled into one or more of the sets. Multiple control systems for the sets are used, with any one set having a primary control system and another control system which acts as its backup, but primarily controls a separate set. The error correction or redundancy data and the error detection data is generated "on the fly" as data is transferred to the disk drives. When data is read from the disk drives, the error detection data is verified to confirm the integrity of the data. Lost data from a particular disk drive can be regenerated with the use of the redundancy data and a backup drive can be substituted for a failed disk drive.

The present invention provides an arrangement of disk drive controllers, data disk drives and error correction code disk drives, the drives being each individually coupled to a small buffer memory and a circuit for error detection and correction. A first aspect of the present invention is error detection and correction which occurs nearly simultaneously with the transfer of data to and from the disk drives. The multiple buffer memories can then be read from or written to in sequence for transfers on a data bus to the system computer. Additionally, the error correction circuitry can be connected to all of the buffer memory/disk drive data paths through a series of multiplexer circuits called cross-bar ("X-bar") switches. These X-bar switches can be used to decouple failed buffer memories or disk drives from the system.

A number of disk drives are operatively interconnected so as to function at a first logical level as one or more logical redundancy groups. A logical redundancy group is a set of disk drives which share redundancy data. The width, depth and redundancy type (e.g., mirrored data or check data) of each logical redundancy group, and the location of redundant information therein, are independently configurable to meet desired capacity and reliability requirements. At a second logical level, blocks of mass storage data are grouped into one or more logical data groups. A logical redundancy group may be divided into more than one such data group. The width, depth, addressing sequence and arrangement of data blocks in each logical data group are independently configurable to divide the mass data storage apparatus into multiple logical mass storage areas each having potentially different bandwidth and operation rate characteristics.

A third logical level, for interacting with application software of a host computer operating system, is also provided. The application level superimposes logical application units on the data groups to allow data groups, alone or in combination from one or more redundancy groups, to appear to application software as single logical storage units.

As data is written to the drives, the error correction circuit, herein called the Array Correction Circuit ("ACC"), calculates P and Q redundancy terms and stores them on two designated P and Q disk drives through the X-bar switches. In contrast to the discussed prior art, the present invention's ACC can detect and correct errors across an entire set of disk drives simultaneously, hence the use of the term "Array correction Circuit." In the following description, the term ACC will refer only to the circuit which performs the necessary error correction functions. The codes themselves will be referred to as Error Correction Code or "ECC". On subsequent read operations, the ACC may compare the data read with the stored P and Q values to determine if the data is error-free.

The X-bar switches have several internal registers. As data is transmitted to and from the data disk drives, it must go through a X-bar switch. Within the X-bar switch the data can be clocked from one register to the next before going to the buffer or the disk drive. The time it takes to clock the data through the X-bar internal registers is sufficient to allow the ACC to calculate and perform its error correction tasks. During a write operation, this arrangement allows the P and Q values to be generated and written to their designated disk drives at the same time as the data is written to its disk drives, the operations occurring in parallel. In effect the X-bar switches establish a data pipeline of several stages, the plurality of stages effectively providing a time delay circuit.

In one preferred embodiment, two ACC units are provided. Both ACCs can be used simultaneously on two operations that access different disk drives or one can be used if the other fails.

The X-bar switch arrangement also provides flexibility in the data paths. Under control of the system controller, a malfunctioning disk drive can be decoupled from the system by reconfiguring the appropriate X-bar switch or switches and the data that was to be stored on the failed disk can be rerouted to another data disk drive. As the system computer is not involved in the detection or correction of data errors, or in reconfiguring the system in the case of failed drives or buffers, these processes are said to be transparent to the system computer.

In a first embodiment of the present invention, a plurality of X-bar switches are coupled to a plurality of disk drives and buffers, each X-bar switch having at least one data path to each buffer and each disk drive. In operation a failure of any buffer or disk drive may be compensated for by rerouting the data flow through a X-bar switch to any operational drive or buffer. In this embodiment full performance can be maintained when disk drives fail.

In another embodiment of the present invention, two ACC circuits are provided. In certain operating modes, such as when all the disk drives are being written to or read from simultaneously, the two ACC circuits are redundant, each ACC acting as a back-up unit to the other. In other modes, such as when data is written to an individual disk drive, the two ACCs work in parallel, the first ACC performing a given action for a portion of the entire set of drives, while the second ACC performs a given action which is not necessarily the same for a remaining portion of the set.

In yet another embodiment, the ACC performs certain self-monitoring check operations using the P and Q redundancy terms to determine if the ACC itself is functioning properly. If these check operations fail, the ACC will indicate its failure to the control system, and it will not be used in any other operations.

In still another embodiment, the ACC unit is coupled to all the disk drives in the set and data being transmitted to or from the disk drives is simultaneously recovered by the ACC. The ACC performs either error detection or error correction upon the transmitted data in parallel with the data transmitted from the buffers and the disk drives.

The present invention provides a speed advantage over the prior art by maximizing the use of parallel paths to the disk drives. Redundancy and thus fault-tolerance is also provided by the described arrangement of the X-bar switches and ACC units.

Another aspect of the present invention is that it switches control of disk drive sets when a particular controller fails. Switching is performed in a manner transparent to the computer.

The controllers comprise a plurality of first level controllers each connected to the computer. Connected to the other side of the first level controllers is a set of second level controllers. Each first level controller can route data to any one of the second level controllers. Communication buses tie together the second level controllers and the first level controllers can also communicate between themselves. In a preferred embodiment, the system is configured such that the second level controllers are grouped in pairs. This configuration provides each second level controller with a single associated back-up controller. This configuration provides for efficient rerouting procedures for the flow of data to the disk drives. For ease of understanding, the specification will describe the system configured with pairs of second level controllers. Of course, it should be understood that the second level controllers could be configured in groups of three or other groupings.

A switching function is implemented to connect each of the second level controllers to a group of disk drives. In the case that a second level controller should fail, the computer need not get involved with the rerouting of data to the disk drives. Instead, the first level controllers and the properly working second level controller can handle the failure without the involvement of the computer. This allows the logical configuration of the disk drives to remain constant from the perspective of the computer despite a change in the physical configuration.

There are two levels of severity of failures which can arise in the second level controllers. The first type is a complete failure. In the case of a complete failure, the second level controller stops communicating with the first level controllers and the other second level controller. The first level controllers are informed of the failure by the properly working second level controller or may recognize this failure when trying to route data to the failed second level controller. In either case, the first level controller will switch data paths from the failed second level controller to the properly functioning second level controller. Once this rerouted path has been established, the properly functioning second level controller issues a command to the malfunctioning second level controller to release control of its disk drives. The properly functioning second level controller then assumes control of these disk drive sets.

The second type of failure is a controlled failure where the failed controller can continue to communicate with the rest of the system. The partner second level controller is informed of the malfunction. The properly functioning second level controller then informs the first level controllers to switch data paths to the functioning second level controller. Next, the malfunctioning second level controller releases its control of the disk drives and the functioning second level controller assumes control. Finally, the properly functioning second level controller checks and, if necessary, corrects data written to the drives by the malfunctioning second level controller.

A further aspect of the present invention is a SCSI bus switching function which permits the second level controllers to release and assume control of the disk drives.

For a more complete understanding of the nature and advantages of the invention, reference should be made to the ensuing detail description taken in conjunction with the accompanying drawings.

BRIEF DESCRIPTION OF THE DRAWINGS

FIG. 1 is a block diagram illustrating a prior art disk array system;

FIG. 2 is a block diagram illustrating a prior art disk array system with an error check and correction block;

FIG. 3 is a diagram illustrating a preferred embodiment of the overall system of the present invention;

FIG. 3.5 is a diagram showing a pair of disk drive sets 18A and 18B connected to a pair of second level controllers 14A and 14B.

FIG. 4 is a diagram showing a more detailed illustration of FIG. 3 including the interconnections of the switches and the disk drives within the disk drive sets;

FIG. 5 is a block diagram of the wiring between the controllers and the switches;

FIG. 6 is a block diagram showing the schematic circuitry of the switching function control circuitry shown in FIG. 5;

FIG. 7 is a recovery state transition diagram illustrating the various possible states of a particular second level controller;

FIGS. 8A-8I show the events which take place during the transition between each of the states shown in FIG. 7;

FIG. 9 is a block diagram of one preferred embodiment of the X-bar circuitry;

FIG. 10 is a block diagram of a preferred embodiment of the error check and correction circuitry;

FIG. 11 is a detailed block diagram of the X-bar switches and the ACC shown in FIG. 10;

FIGS. 12a and 12b show the logic operations necessary to calculate the P and Q error detection terms;

FIGS. 13a and 13b show how the Reed-Solomon codeword is formed and stored in one embodiment of the present invention;

FIGS. 14a and 14b show the parity detector and parity generator circuits in the ACC;

FIGS. 15, 16, 17, and 18 show, respectively, the data flow during a Transaction Mode Normal Read, a Transaction Mode Failed Drive Read, a Transaction Mode Read-Modify-Write Read and a Transaction Mode Read-Modify-Write Write;

FIG. 19 is a schematic diagram of a set of disk drives in which check data is distributed among drives of the set according to a known technique;

FIG. 22 is a schematic diagram of the distribution of data in a first preferred embodiment of a redundancy group according to the present invention;

DETAILED DESCRIPTION OF THE DRAWINGS

Figure 20:
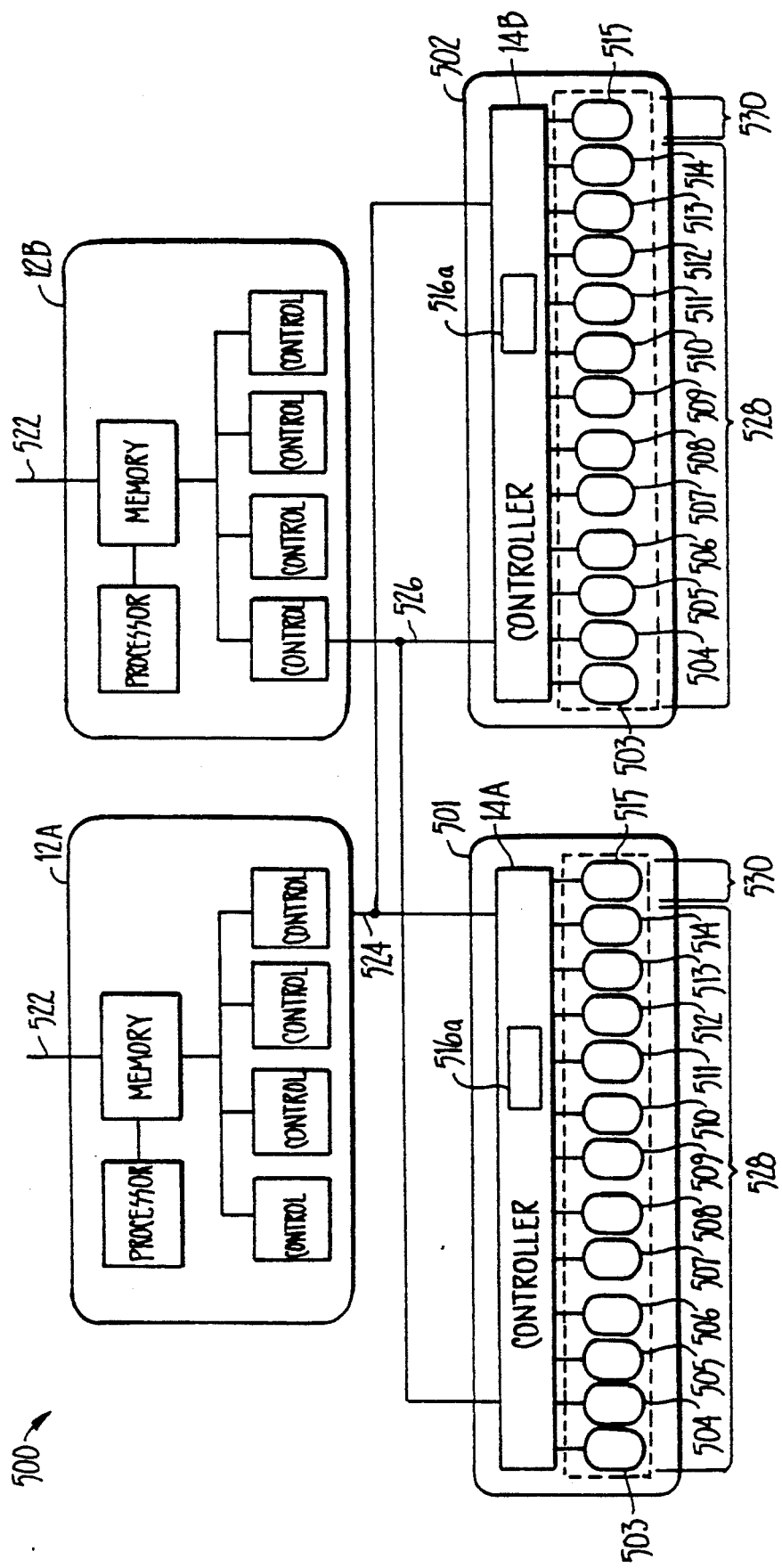
FIG. 20 is a schematic diagram of a mass storage system suitable for use with the present invention.

The preferred embodiments of the present invention comprise a system for mass data storage. In the preferred embodiments described herein, the preferred devices for storing data are hard disk drives, referenced herein as disk drives. Nothing herein should be understood to limit this invention to using disk drives only. Any other device for storing data may be used, including, but not limited to, floppy disks, magnetic tape drives, and optical disks.

Overall System Environment

One preferred embodiment of the present invention operates in the environment shown in FIG. 3. In FIG. 3, computer 10 communicates with a group of disk drive sets 18 through controller 11. In a preferred embodiment, controller 11 includes a number of components which permit computer 10 to access each of disk drive sets 18 even when there is a failure in one of the components of controller 11. As shown in FIG. 3, controller 11 includes a pair of two-level devices 13. Within each of the two-level devices 13 is a first level controller 12 and a second level controller 14. A switch 16 which comprises a group of switches permits computer 10 to access disk drive sets 18 through more than one path. In this way, if either of two-level devices 13 experience a failure in one of their components, the path may be re-routed without computer 10 being interrupted.

FIG. 3.5 is a diagram showing a pair of disk drive sets 18A and 18B connected to a pair of second level controllers 14A and 14B. Controllers 14A and 14B each include two interface modules 27 for interfacing second level controllers 14 with a pair of first level controllers 12 (shown in FIG. 3). Interface modules 27 are connected to buffers 330-335 which buffer data to be transmitted to and received from the disk drives. Second level controllers 14 are configured to be primarily responsible for one group of disk drives and secondarily responsible for a second group of disk drives. As shown, second level controller 14A is primarily responsible for disk drives 20A1, 20B1, 20C1, 20D1 and 20E1 and secondarily responsible for disk drives 20A2, 20B2, 20C2, 20D2 and 20E2. A spare drive 20X is shared by both second level controllers and is activated to take over for a disk drive which has failed.

The disk drives are connected to second level controllers 14 through a set of data interfaces 31. These interfaces are set by controllers 14 to configure the disk drives in a particular arrangement. For example, disk drives 20A1, 20B1, 20C1 and 20D1 and 20A2, 20B2, 20C2 and 20D2 may be set to store data for the system while disk drives 20E1 and 20E2 may be set to store error correction codes. If any of the drives fail, drive 20X is set to take its place. Of course, the disk drives of the system can be rearranged and may assume a wide variety of configurations.

FIG. 4 is more detailed diagram showing the interconnection of the components of the input/output system associated with computer 10 for accessing disk drive sets 18. Computer 10 has its input/output ports connected to the first level controllers 12A and 12B. Second level controllers 14A and 14B are shown connected to first level controllers 12A and 12B. The lines between second level controllers 14 and first level controllers 12 represent data buses through which data flows as well as control and status signals. The dashed line between second level controller 14A and second level controller 14B represents a communication line through which the second level controllers communicate with each other.

Second level controllers 14 are each connected to a group of disk drive sets 18A-18F through switches 16A-16F.

Disk drives 20 are arranged in a manner so that each second level controller 14 is primarily responsible for one group of disk drive sets. As shown in FIG. 4, second level controller 14A may be primarily responsible for three of the disk drive sets 18A-18F. Similarly, second level controller 14B may be primarily responsible for the remaining three disk drive sets 18A-18F. Second level controllers 14 are secondarily responsible for the disk drives primarily controlled by the partner second level controller. In the particular arrangement shown in FIG. 4, second level controller 14A may be primarily responsible for the left three disk drive sets 18A, 18B and 18C and secondarily responsible for the right three disk drives sets 18D, 18E and 18F. Second level controller 14B is primarily responsible for the right three disk drive sets 18D, 18E and 18F and secondarily responsible for the left three disk sets 18A, 18B and 18C.

Each second level controller 14 contains a second level controller recovery system (CRS) 22. CRS 22 is a portion of software code which manages the communication between second level controllers 14 and first level controllers 12. CRS 22 is typically implemented as a state machine which is in the form of microcode or sequencing logic for moving second level controller 14 from state to state (described below). State changes are triggered as different events occur and messages are sent between the various components of the system.

An ECC block 15 is also included in each second level controller 14. ECC block 15 contains circuitry for checking and correcting errors in data which occur as the data is passed between various components of the system. This circuitry is described in more detail below.

FIG. 5 is a block diagram showing a more detailed illustration of the interconnections between second level controllers 14A and 14B and the disk drives. For simplicity, only a single disk drive port is shown. More disk drive ports are included in the system as shown in FIGS. 3 and 4.

Second level controller 14A has a primary control/sense line 50A for controlling its primary set of disk drives. An alternate control/sense line 52A controls an alternate set of disk drives. Of course, second level controller 14B has a corresponding set of control/sense lines. Data buses 54A (second level controller 14A) and 54B (second level controller 14B) carry the data to and from disk drives 20. These data buses are typically in the form of a SCSI bus.

A set of switches 16A-16F are used to grant control of the disk drives to a particular second level controller. For example, in FIG. 4, second level controller 14A has primary responsibility for disk drives 20A-20C and alternate control of disk drives 20D-20F. Second level controller 14B has primary control of disk drives 20D-20F and alternate control of disk drives 20A-20C. By changing the signals on control/sense lines 50 and 52, primary and secondary control can be altered.

FIG. 6 is a more detailed illustration of one of the switches 16A-16F. A pair of pulse shapers 60A and 60B receive the signals from the corresponding control/sense lines 50A and 52B shown in FIG. 5. Pulse shapers 60 clean up the signals which may have lost clarity as they were transmitted over the lines. Pulse shapers of this type are well% known in the art. The clarified signals from pulse shapers 60 are then fed to the set and reset pins of R/S latch 62. The Q and Q̄ outputs of latch 62 are sent to the enable lines of a pair of driver/receivers 64A and 64B. Driver/receivers 64A and 64B are connected between the disk drives and second level controllers 14A and 14B. Depending upon whether primary control/sense line 52B or alternate control/sense line 50A is active, the appropriate second level controller will be in control at a particular time.

FIG. 7 is a state transition diagram showing the relationships between the various states of CRS 22 (FIG. 3) of a particular second level controller 14. Each second level controller 14 must be in only one state at any particular point in time. Initially, assuming that the system is functioning properly and each second level controller 14 is primarily responsible for half of the disk drive sets 18 and secondarily responsible for half of the disk drive sets 18, second level controller 14 is in a PRIMARY STATE 26. While in PRIMARY STATE 26, two major events may happen to move a second level controller 14 from PRIMARY STATE 26 to another state. The first event, is the failure of the particular second level controller 14. If there is a failure, second level controller 14 shifts from PRIMARY STATE 26 to a NONE STATE 28. In the process of doing so, it will pass through RUN-DOWN-PRIMARIES-TO-NONE STATE 30.

There are two types of failures which are possible in second level controller 14. The first type of failure is a controlled failure. Further, there are two types of controlled failures.

The first type of controlled failure is a directed controlled failure. This is not actually a failure but instead an instruction input from an outside source instructing a particular second level controller to shut down. This instruction may be received in second level controller 14 from one of the following sources: An operator, through computer 10; a console 19 through a port 24 (e.g. RS-232) on the first level controller; a diagnostic console 21 through a port 23 (e.g. RS-232) on the second level controller; or by software initiated during predictive maintenance. Typically, such an instruction is issued in the case where diagnostic testing of a second level controller is to be conducted. In a directed controlled failure, the second level controller finishes up any instructions it is currently involved with and refuses to accept any further instructions. The second level controller effects a "graceful" shut down by sending out messages to the partner second level controller that it will be shutting down.

The second type of controlled failure is referred to as a moderate failure. In this case, the second level controller recognizes that it has a problem and can no longer function properly to provide services to the system. For example, the memory or drives associated with that second level controller may have malfunctioned. Therefore, even if the second level controller is properly functioning, it cannot adequately provide services to the system. It aborts any current instructions, refuses to accept any new instructions and sends a message to the partner second level controller that it is shutting down. In both controlled failures, the malfunctioning second level controller releases the set of disk drives over which it has control. These drives are then taken over by the partner second level controller.

The second type of failure is a complete failure. In a complete failure, the second level controller becomes inoperable and cannot send messages or "clean-up" its currently pending instructions by aborting them. In other words, the second level controller has lost its ability to serve the system. It is up to one of the first level controllers or the partner second level controller to recognize the problem. The partner second level controller then takes control of the drives controlled by the malfunctioning second level controller. The routing through the malfunctioning second level controller is switched over to the partner second level controller.

In all of the above failures, the switching takes place without interruption to the operation of the computer. Second level controllers 14 and first level controllers 12 handle the rerouting independently by communicating the failure among themselves.

Assuming there was a failure in second level controller 14A, second level controller 14A moves from PRIMARY STATE 26 through a transition RUN-DOWN-PRIMARIES-TO-NONE STATE 30 to NONE STATE 28. At the same time, properly functioning second level controller 14B moves from PRIMARY STATE 26 to BOTH STATE 32. The basis for the change in state of each of second level controllers 14A and 14B is the failure of second level controller 14A. When a second level controller fails, it is important to switch disk drive control away from the failed second level controller. This permits computer 10 to continue to access disk drives which were formerly controlled by a particular second level controller which has failed. In the current example (FIG. 4), disk drive sets 18A–18C are switched by switching functions 16A–16C so that they are controlled by second level controller 14B. Therefore, second level controller 14B is in BOTH STATE 32 indicating that it has control of the disk drive sets 18 for both second level controllers. Second level controller 14A now controls none of the disk drives and is in NONE STATE 28. The transition state 30 determines which of several possible transition paths is used.

If second level controller 14A is in NONE STATE 28 and second level controller 14B is in BOTH STATE 32 there are a number of options for transferring control of disk drive sets 18A–18F once second level controller 14A has been repaired. First, second level controller 14A and second level controller 14B could each be shifted back to PRIMARY STATE 26. This is accomplished for drive sets 18A–18C by second level controller 14A moving from NONE STATE 28 directly to PRIMARY STATE 26 along the preempt p line. Preempt p simply stands for "preempt primary" which means that second level controller 14A preempts its primary drives or takes control of them from second level controller 14B. At the same time, second level controller 14B moves from BOTH STATE 32 through a transition RUN-DOWN-SECONDARIES-TO-PRIMARIES STATE 34 and then to PRIMARY STATE 26.

A second alternative is for second level controller 14A to move from NONE STATE 28 to SECONDARY STATE 36. Once in SECONDARY STATE 36, second level controller 14A is in control of its secondary disk drive sets 18D–18F. Second level controller 14B concurrently moves from BOTH STATE 32 through RUN-DOWN-PRIMARIES-TO-SECONDARIES STATE 38 and on to SECONDARY STATE 36. When both second level controllers are in SECONDARY STATE 36, they are in control of their secondary disk drive sets. Second level controller 14A controls disk drive sets 18D–18F and second level controller 14B controls disk drive sets 18A–18C.

From SECONDARY STATE 36, a failing second level controller 14 may move through RUN-DOWN-SECONDARIES-TO-NONE STATE 40 to NONE STATE 28. If this occurs, the properly functioning partner second level controller 14 moves from SECONDARY STATE 36 to BOTH STATE 32 so that computer 10 could access any one of disk drive sets 18. As in the previous example, if second level controller 14A were to fail it moves from SECONDARY STATE 36 through RUN-DOWN-SECONDARIES-TO-NONE STATE 40 and into NONE STATE 28. At the same time, properly functioning second level controller 14B moves from SECONDARY STATE 36 along the preempt b/p line into BOTH STATE 32. Preempt b/p stands for "preempt both/primaries." In other words, all of the disk drives are preempted by the properly functioning second level controller.

If, for all sets 18, second level controller 14A is in NONE STATE 28 and second level controller 14B is in BOTH STATE 32, it is possible for second level controller 14A to take control of all sets 18 of disk drives. This is desirable if second level controller 14A were repaired and second level controller 14B failed. Second level controller 14A moves from NONE STATE 28 along the preempt b line to BOTH STATE 32. At the same time, second level controller 14B moves from BOTH STATE 32 through RUN-DOWN-BOTH-TO-NONE STATE 42 and into NONE STATE 28. At this point, second level controller 14A controls all disk drives while second level controller 14B controls none of the disk drives.

Various failures may trigger the movement of second level controllers 14 between states. Between states a number of events take place. Each of these events is described in FIGS. 8A–8I. In FIG. 8A, second level controller 14 is in PRIMARY STATE 26. There are three different events which can take place while second level controller 14 is in PRIMARY STATE 26. The first event is for a preempt message 100 to be received from the partner second level controller. At this point, the second level controller receiving such a message will take the secondary path, represented by block 102, and end up at BOTH STATE 32. The second path which may be taken is triggered by receipt of a message 104 from CRS 22 of the other second level controller. This may be some sort of communication which results in the second level controller remaining in PRIMARY STATE 26. It will report and return messages 106 to the other second level controller. The final path which may be taken results in second level controller ending up in RUN-DOWN-PRIMARIES-TO-NONE STATE 30. This path is triggered upon receipt of a message 108 to release both sets of drives or the primary disk drives. A timer is then set in block 110 and upon time out a message 112 is sent to the other second level controller to take control of the primary set of disk drives. Once in RUN-DOWN-PRIMARIES-TO-NONE STATE 30, second level controller 14 will eventually end up in NONE STATE 28.

FIG. 8B illustrates various paths from RUN-DOWN-PRIMARIES-TO-NONE STATE 30 to NONE STATE 28. Three possible events may take place. First, a message 114 may be received from another second level controller providing communication information. In this case, second level controller 14 reports back messages 116 and remains in RUN-DOWN-PRIMARIES-TO-NONE STATE 30. The second event which may occur is for the timer, set during transition from PRIMARY STATE 26 to RUN-DOWN-PRIMARIES-TO-NONE STATE 30 to time out 118. If this happens, second level controller 14 realizes that message 112 (FIG. 8A) didn't get properly sent and that there has been a complete failure. It releases control of both its primaries and secondary disk drives 122. It then ends up in NONE STATE 28. The third event which may occur while in RUN-DOWN-PRIMARIES-TO-NONE STATE 30 is for a response to be received 124 from message 112 (FIG. 8A) sent out while second level controller moved from PRIMARY STATE 26 to RUN-DOWN-PRIMARIES-TO-NONE STATE 30. This response indicates that the message was properly received. Second level controller 14 then releases its primary drives 126 and ends up in NONE STATE 28.

FIG. 8C covers the state transition between NONE STATE 28 and one of either BOTH STATE 32, PRIMARY STATE 26, or SECONDARY STATE 36. When in NONE STATE 28, second level controller 14 can only receive messages. First, it may receive a message 128 instructing it to preempt both its primary and alternative sets of disk drives. It performs this function 130 and ends up in BOTH STATE 32. A second possibility is for it to receive a preempt message 132 instructing it to preempt its primary set of drives. It performs this instruction and ends up in PRIMARY STATE 26. A third alternative is the receipt of a preempt message 136 instructing second level controller 14 to preempt its secondary drives. Upon performance of this instruction 138 it ends up in SECONDARY STATE 36. Finally, while in NONE STATE 28 second level controller 14 may receive communication messages 140 from its partner second level controller. It reports back 142 to the other second level controller and remains in NONE STATE 28.

FIG. 8D illustrates the movement of second level controller 14 from SECONDARY STATE 36 to BOTH STATE 32 or RUN-DOWN-SECONDARIES-TO-NONE STATE 40. While in SECONDARY STATE 36, any one of three messages may be received by second level controller 14. A first possibility is for a preempt both or primary message 144 to be received. At this point, second level controller 14 takes control of its primary drives 146 and ends up in BOTH STATE 32. A second possibility is for communication messages 148 to be received from the partner controller. This results in second level controller 14 reporting back 150 and remaining in its present SECONDARY STATE 36. Finally, a release both or secondary message 152 may be received. Second level controller 14 sets a timer 154 upon receipt of this message. It then sends out a message 156 indicating it is now in RUN-DOWN-SECONDARIES-TO-NONE STATE 40.

FIG. 8E shows the transition of second level controller 14 from RUN-DOWN-SECONDARIES-TO-NONE STATE 40 to NONE STATE 28. Three different messages may be received during RUN-DOWN-SECONDARIES-TO-NONE STATE 40. First, messages 158 from the partner second level controller may be received. Second level controller 14 then reports back (160) to its partner and remains in RUN-DOWN-SECONDARIES-TO-NONE STATE 40. A second possibility is for the timer, set between SECONDARY STATE 36 and the present state, to time out (162). This indicates that message 156 (FIG. 8D) was not properly sent out and received by the partner second level controller and that there has been a complete failure to second level controller 14. Second level controller 14 then reports out (164) that it will release both of its sets of disk drives 166. This results in it moving to NONE STATE 28. Finally, second level controller 14 may receive a response 168 to its message 156 (FIG. 8D) sent after setting the timer between SECONDARY STATE 36 and RUN-DOWN-SECONDARIES-TO-NONE STATE 40. Upon receiving this response, it releases its secondary drives and ends up in NONE STATE 28.

FIG. 8F illustrates the various paths from BOTH STATE 32 to any one of RUN-DOWN-PRIMARIES-TO-SECONDARIES STATE 38, RUN-DOWN-SECONDARIES-TO-PRIMARIES STATE 34 or RUN-DOWN-BOTH-TO-NONE STATE 42. A first possible message which may be received during BOTH STATE 32 is a release primary message 172. This will cause second level controller 14 to set a timer 174, send a message 176 indicating it is running down primaries, and wait in RUN-DOWN-PRIMARIES-TO-SECONDARIES STATE 38. A second message which may be received is a release secondaries message 180. Upon receiving release secondaries message 180, second level controller 14 sets a timer 182 and sends a message 184 indicating it has moved into RUN-DOWN-SECONDARIES-TO-PRIMARIES STATE 34. A third possibility for second level controller 14 is to receive communication messages 186 from its partner second level controller. It will report back (188) and remain in BOTH STATE 32. Finally, second level controller 14 may receive an instruction 190 telling it to release both primary and secondary sets of drives. At this point it sets the timer 192 and sends out a message 194 that it has released both primary and secondary drive sets. It will then remain in the RUN-DOWN-BOTH-TO-NONE STATE 42 until it receives further instructions from the other second level controller.

FIG. 8G shows the various paths by which second level controller 14 moves from RUN-DOWN-PRIMARIES-TO-SECONDARIES STATE 38 to one of either NONE STATE 28 or SECONDARY STATE 36. The first possibility is that second level controller 14 receives messages 196 from the other second level controller. It then reports back (198) and remains in RUN-DOWN-PRIMARIES-TO-SECONDARIES STATE 38. A second possibility is that the timer (174), set between BOTH STATE 32 and RUN-DOWN-PRIMARIES-TO-SECONDARIES STATE 38 times out (200). At this point, second level controller 14 realizes that message 176 (FIG. 8F) was not properly sent. A complete failure has occurred. The second level controller reports (202) that it has released both sets of disk drives, and releases both sets (204). Second level controller 14 then enters NONE STATE 28. Finally, a run down path response message 206 is received acknowledging receipt of message 176 (FIG. 8F) sent between BOTH STATE 32 and RUN-DOWN-PRIMARIES-TO-SECONDARIES STATE 38. Second level controller 14 releases its primary drives 208 and enters SECONDARY STATE 36.

FIG. 8H shows the possible paths down which second level controller 14 moves between RUN-DOWN-SECONDARIES-TO-PRIMARIES STATE 34 and one of either NONE STATE 28 or PRIMARY STATE 26. A first possibility is that second level controller 14 receives a message 210 from the other second level controller. It then reports back (212) and remains in RUN-DOWN-SECONDARIES-TO-PRIMARIES STATE 34. A second possibility is that the timer (182), set between BOTH STATE 32 and RUN-DOWN-SECONDARIES-TO PRIMARY-STATE 34 times out (214). If this occurs, second level controller 14 realizes that message 184 (FIG. 8F) was not properly sent. A complete failure has occurred. Second level controller then sends a message 216 indicating that it has released its drives and then it releases both primary and secondary disk drive sets (218) which it controls. Second level controller then moves into NONE STATE 28. Finally, a third possibility is that second level controller 14 receives a response 220 to message 184 (FIG. 8F) sent between BOTH STATE 32 and RUN-DOWN-SECONDARIES-TO-PRIMARIES-STATE 34. It will then release (222) its secondary drives and enter PRIMARY STATE 26.

FIG. 8I shows the possible paths illustrating the transition of second level controller between RUN-DOWN-BOTH-TO-NONE STATE 42 and NONE STATE 28. Three possible events may take place. First, a message 230 may be received from the other second level controller providing communication information. In this case, second level controller 14 reports back messages 232 and remains in RUN-DOWN-BOTH-TO-NONE STATE 42. The second event which may occur is for the timer (192), set during transition from BOTH STATE 32 to RUN-DOWN-BOTH-TO-NONE STATE 42, to time out (234). If this happens, second level controller 14 realizes that message 194 (FIG. 8F) sent during BOTH STATE 32 didn't get properly sent and that there has been a complete failure. It releases control of both its primaries and secondary disk drives (238). It then ends up in NONE STATE 28. The third event which may occur while in RUN-DOWN-BOTH-TO-NONE STATE 42 is for a response to be received (240) from message 194 (FIG. 8F) sent out while second level controller moved from BOTH STATE 32 to RUN-DOWN-BOTH-TO-NONE STATE 42. This response indicates that the message was properly received. Second level controller 14 then releases both sets of drives (242) and ends up in NONE STATE 28.

Rerouting Data Paths Between Buffers and Disk Drives

FIG. 9 illustrates a first preferred embodiment of circuitry for rerouting data paths between buffers and disk drives 20. In FIG. 9, X-bar switches 310 through 315 are coupled to a bus 309 communicating with the second level controller engine (see FIGS. 3 and 4). In turn, each X-bar switch is coupled by a bus to disk drives 20A1 through 20A6 and to each buffer 330 through 336. Bus 350 couples each buffer to a first level controller which are coupled to a computer such as computer 10 (FIGS. 3 and 4). In this embodiment, although only six disk drives are illustrated, any arbitrary number could be used, as long as the illustrated architecture is preserved by increasing the number of X-bar switches and output buffers in a like manner and maintaining the interconnected bus structures illustrated in FIG. 9.

In operation, the second level controller will load various registers (not illustrated herein) which configure the X-bar switches to communicate with particular buffers and particular disk drives. The particular configuration can be changed at any time while the system is operating. Data flow is bi-directional over all the buses. By configuring the X-bar switches, data flowing from any given buffer may be sent to any given disk drive or vice versa. Failure of any particular system element does not result in any significant performance degradation, as data flow can be routed around the failed element by reconfiguring the registers for the X-bar switch. In a preferred mode of operation, data may be transferred from or to a particular disk drive in parallel with other data transfers occurring in parallel on every other disk drive. This mode of operation allows for a very high input/output rate of data as well as a high data throughput.

To illustrate this embodiment's mode of operation, the following example is offered. Referring to FIG. 9, assume that all data flow is initially direct, meaning, for example, that data in buffer 330 flows directly through X-bar switch 110 to disk drive 20A1. Were buffer 330 to fail, the registers of X-bar switch 310 could be reconfigured, enabling X-bar switch 310 to read data from buffer 335 and direct that data to disk drive 20A1. Similar failures in other buffers and in the disk drives could be compensated for in the same manner.

Generation of Redundancy Terms and Error Detection on Parallel Data

FIG. 10 illustrates a second preferred embodiment of the present invention. This second embodiment incorporates Array Correction Circuits ("ACCs") to provide error detection and correction capabilities within the same general architecture as illustrated for the first preferred embodiment shown in FIG. 9. To ease the understanding of this embodiment, the full details of the internal structure of both the X-bar switches (310 through 315) and the ACC circuits 360 and 370 are not shown in FIG. 10. FIGS. 11 and 12 illustrate the internal structure of these devices and will be referenced and discussed in turn. Additionally, bus LBE as illustrated in FIG. 10 does not actually couple the second level controller (FIGS. 3 and 4) directly to the X-bar switches, the ACCs, and the DSI units. Instead, the second level controller communicates with various sets of registers assigned to the X-bar switches, the ACCs and the DSI units. These registers are loaded by the second level controller with the configuration data which establishes the operating modes of the aforementioned components. As such registers are known, and their operation incidental to the present invention, they are not illustrated or discussed further herein.

The embodiment shown in FIG. 10 shows data disk drives 20A1 through 20A4 and P and Q redundancy term drives 20A5 and 20A6. A preferred embodiment of the present invention utilizes 13 disk drives: ten for data, two for P and Q redundancy terms, and one spare or backup drive. It will be understood that the exact number of drives, and their exact utilization may vary without in any way changing the present invention. Each disk drive is coupled by a bi-directional bus (Small Computer Standard Interface) to units 340 through 345, herein labelled DSI. The DSI units perform some error detecting functions as well as buffering data flow into and out of the disk drives.

Each DSI unit is in turn coupled by a bi-directional bus means to an X-bar switch, the X-bar switches herein numbered 310 through 315. The X-bar switches are coupled in turn to word assemblers 350 through 355 by means of a bi-directional bus. The bus width in this embodiment is 9 bits, 8 for data, 1 for a parity bit. The word assemblers assemble 36-bit (32 data and 4 parity) words for transmission to buffers 330 through 335 over bi-directional buses having a 36-bit width. When data flows from the output buffers to the X-bar switches, the word assemblers decompose the 36-bit words into the 9-bits of data and parity.

The X-bar switches are also coupled to ACC units 348 and 349. The interconnection between the X-bar switches and the ACCs is shown in more detail in FIG. 11. Each X-bar switch can send to both or either ACC the 8 bits of data and 1 parity bit that the X-bar switch receives from either the DSI units or the word assemblers. In turn, the X-bar switches can receive 9 bits of the P and redundancy terms calculated by the ACCs over lines $E_1$ and $E_2$. As shown, the ACCs can direct the P and Q redundancy terms to any X-bar switch, not being limited to the disk drives labelled P and Q. Depending on the configuration commanded by the second level controller, ACCs 348 and 349 can be mutually redundant, in which case the failure of one or the other ACC does not affect the system's ability to detect or correct errors, or each ACC can detect and correct errors on a portion of the total set of disk drives. When operating in this second manner, certain specific types of operations which write data to individual disk drives are expedited, as each ACC can write to a separate individual disk drive. The specific disk drives that the individual ACCs monitor can be reconfigured at any time by the second level controller.

The illustrated connections of the ACCs and the X-bar switches also allows data to be switched from any X-bar switch to any ACC once the second level controller configures the related registers. This flexibility allows data to be routed away from any failed disk drive or buffer.

FIG. 11 shows important internal details of the ACCs and the X-bar switches. X-bar switch 310 is composed of two mirror-image sections. These sections comprise, respectively, 9-bit tristate registers 370/380, lo multiplexers 372/382, first 9-bit registers 374/384, second 9-bit registers 376/386, and input/output interfaces 379/389. In operation, data can flow either from the word assembler to the DSI unit or vice versa.

Although many pathways through the X-bar switch are possible, as shown by FIG. 11, two aspects of these pathways are of particular importance. First, in order to allow the ACC sufficient time to calculate P and Q redundancy terms or to detect and correct errors, a data pathway of several registers can be used, the data requiring one clock cycle to move from one register to the next. By clocking the data through several registers, a delay of sufficient length can be achieved. For example, assuming a data flow from the word assembler unit to a disk drive, 9 bits are clocked into 9-bit register 374 and tri-state register 370 on the first clock pulse. On the next clock pulse, the data moves to 9-bit register 386 and through redundancy circuit 302 in the ACC 348 to P/Q registers 304 and 306. The next clock pulses move the data to the DSI unit.

The second important aspect of the internal pathways relates to the two tristate registers. The tri-state registers are not allowed to be active simultaneously. In other words, if either tristate register 370 or 380 is enabled, its counterpart is disabled. This controls data transmission from the X-switch to the ACC. The data may flow only from the DSI unit to the ACC or from the word assembler to the ACC, but not from both to the ACC simultaneously. In the opposite direction, data may flow from the ACC to the word assembler and the DSI simultaneously.

ACC unit 348 comprises a redundancy circuit 302, wherein P and Q redundancy terms are generated, P and Q registers 304 and 306, wherein the P and Q redundancy terms are stored temporarily, regenerator and corrector circuit 308, wherein the data from or to a failed disk drive or buffer can be regenerated or corrected, and output to interfaces 390, 391, 392 and 393.

Redundancy Generation and Error Checking Equations

The main functional components of the second preferred embodiment and their physical connections to one another have now been described. The various preferred modes of operation will now be described. In order to understand these functional modes, some understanding of the error detection and correction method used by the present invention will be necessary.

Various error detection and correction codes are known and used in the computer industry. Error-Control Coding and Applications, D. Wiggert, The MITRE Corp., describes various such codes and their calculation. The present invention in this second preferred embodiment is implemented using a Reed-Solomon error detection and correction code. Nothing herein should be taken to limit the present invention to using only a Reed-Solomon code. If other codes were used, various modifications to the ACCs would be necessary, but these modifications would in no way change the essential features of this invention.

Reed-Solomon codes are generated by means of a field generator polynomial, the one used in this embodiment being $X^4+X+1$. The code generator polynomial needed for this Reed-Solomon code is $(X+a^0) \cdot (X+a^1) = X^2 + a^4 X + a^1$. The generation and use of these codes to detect and correct errors is known.

The actual implementation of the Reed-Solomon code in the present invention requires the generation of various terms and syndromes. For purposes of clarity, these terms are generally referred to herein as the P and Q redundancy terms. The equations which generate the P and Q redundancy terms are:

$$P = d_{n-1} + d_{n-2} + \ldots + d_1 + d_0$$

and $$Q = d_{n-1} \cdot a_{n-1} + d_{n-2} \cdot a_{n-2} + \ldots + d_1 \cdot a_1 + d_0 \cdot a_0.$$

The P redundancy term is essentially the simple parity of all the data bytes enabled in the given calculation. The Q logic calculates the Q redundancy for all data bytes that are enabled. For Q redundancy, input data must first be multiplied by a constant "a" before it is summed. The logic operations necessary to produce the P and Q redundancy terms are shown in FIGS. 12a and 12b. All operations denoted by $\oplus$ are exclusive-OR ("XOR") operations. Essentially, the final P term is the sum of all $P_i$ terms. The Q term is derived by multiplying all $Q_i$ terms by a constant and then XORing the results. These calculations occur in redundancy circuit 302 in ACC 260 (FIG. 11). The second preferred embodiment, using its implementation of the Reed-Solomon code, is able to correct the data on up to two failed disk drives.

The correction of data requires the generation, of additional terms $S_0$ and $S_1$ within the ACC. Assuming that the P and Q redundancy terms have already been calculated for a group of data bytes, the syndrome equations $$S_0 = d_{n-1} + d_{n-2} + \ldots + d_1 + d_0 + P$$

$$S_1 = (d_{n-1} \cdot a_{n-1}) + (d_{n-2} \cdot a_{n-2}) + \ldots + (d_1 \cdot a_1) + (d_0 \cdot a_0) + Q$$

are used to calculate $S_0$ and $S_1$. For $S_0$ an ACC register enables the necessary data bytes and the P redundancy to be used in the calculation. For $S_1$, the necessary input data must first be multiplied by $a_i$ before being summed with the Q redundancy information.

As stated, an ACC can correct the data on up to two failed disk drives in this embodiment. The failed disk drive register (not illustrated) in the relevant ACC will be loaded with the address of the failed disk or disks by the second level controller. A constant circuit within the ACC will use the drive location information to calculate two constants $k_0$ and $k_1$ as indicated in Table 1 below, where i represents the address of the first failed disk drive, j is the address of the second failed disk drive, and a is a constant. The columns labelled Failed Drives indicate which drives have failed. Column $k_0$ and $k_1$ indicate how those constants are calculated given the failure of the drives noted in the Failed Drives columns.

TABLE 1

| Failed Drives | | $k_0$ | $k_1$ |
|---|---|---|---|
| P | — | 0 | 1 |
| Q | — | 1 | 0 |
| i | — | 0 | 1/ai |
| i | P | 0 | 1/ai |
| Q | i | 0 | 0 |
| i | j | aj/ai+aj | 1/ai+aj |
| P | Q | 0 | 0 |

The error correction circuits use the syndrome information $S_0$ and $S_1$, as well as the two constants $k_0$ and $k_1$ to generate the data contained on the failed disk drives. The error correction equations are as follows:

$F_1 = S_0 \cdot k_0 + S_1 \cdot k_1$ $F_2 = S_0 + E_1$ $F_1$ is the replacement data for the first failed disk drive. $F_2$ is the replacement data for the second failed disk drive. The equations which generate the P and Q redundancy terms are realized in combinatorial logic, as is partially shown in FIGS. 12a and 12b. This has the advantage of allowing the redundancy terms to be generated and written to the disk drives at the same time that the data is written to the drives. This mode of operation will be discussed later.

Operational Modes

Having described the aspects of the Reed-Solomon code implementation necessary to understand the present invention, the operational modes of the present invention will now be discussed.

The second preferred embodiment of the present invention operates primarily in one of two classes of operations. These are parallel data storage operations and transaction processing operation. These two classes of operations will now be discussed with reference to the figures, particularly FIGS. 10, 13 and 14 and Tables 2 through 7.

Although FIG. 10 only shows four data drives and the P and Q redundancy term drives, a preferred embodiment uses a set of 13 disk drives, 10 for data, 2 for the P and Q terms, and a spare. Although nothing herein should be construed to limit this discussion to that specific embodiment, parallel processing operations will be described with relation to that environment.

Parallel Processing Operations

In parallel processing operations, all the drives are considered to comprise a single large set. Each of the disk drives will either receive or transmit 9 bits of data simultaneously. The result of this is that the 9-bits of data appearing in the DSI units of all the drives simultaneously are treated as one large codeword. This result is shown in FIG. 13a. Codeword 400 comprises 9 bits of data from or for disk drive $d_{n-1}$, 9 bits of data from or for disk drive $d_{n-2}$, and so on, with the P and Q disk drives receiving or transmitting the P and Q redundancy term. In a parallel write operation, all the disk drives in the set, except for the spare disk drive, will receive a byte of data (or a redundancy term whose length is equal to the data byte) simultaneously. As shown, the same sector in all the disk drives will receive a part of codeword 400. For example, in the illustration, sector 1 of disk drive $n-1$ will receive a byte of data designated $d_{n-1}$ from codeword 400, sector 1 of disk drive $n-2$ will receive a byte of data designated $d_{n-2}$ from codeword 400 and so on.

In the actual implementation of this preferred embodiment, the codewords are "striped" across the various disk drives. This means that for each successive codeword, different disk drives receive the P and Q redundancy terms. In other words, drive $d_{n-1}$ is treated as drive $d_{n-2}$ for the second codeword and so on, until what was originally drive $d_{n-1}$ receives a Q redundancy term. Thus, the redundancy terms "stripe" through the disk drives.

Pairs of P and Q Terms for Nibbles

Calculating the P and Q redundancy terms using 8-bit symbols would require a great deal of hardware. To reduce this hardware overhead, the calculations are performed using 4-bit bytes or nibbles. This hardware implementation does not change the invention conceptually, but does result in the disk drives receiving two 4-bit data nibbles combined to make one 8-bit byte. In FIG. 13b, codeword 450, as well as the illustrated sectors A of the disk drives, illustrate how the codeword is broken up and how the disk drives receive upper and lower 4-bit nibbles. Table 2 shows how, for codewords one through N, a different portion of the codeword is placed on the different drives. Each disk drive, for a given codeword, receives an upper and lower 4-bit nibble, designated with L's and U's, of the codeword. Additionally, the same section is used to store the nibbles on each of the disk drives used to store the codeword. In other words, for codeword$_1$, the first sector of disk drives $n-1$ through 0 receives the nibbles.

TABLE 2

| | CODEWORD -- DATA AND P AND Q | | | | |
|---|---|---|---|---|---|
| | Sector of Drive $d_{n-1}$ | Sector of Drive $d_{n-2}$ | Sector of Drive $d_0$ | Sector of Drive P | Sector of Drive Q |
| Codeword$_1$ | Codeword$_1$ $(d_{n-1L})(d_{n-1U})$ | Codeword$_1$ $(d_{n-2L})(d_{n-2U})$ | Codeword$_1$ $(d_{0L})(d_{0U})$ | Codeword$_1$ $(P_{1L})(P_{1U})$ | Codeword$_1$ $(Q_{1L})(Q_{1U})$ |
| Codeword$_2$ | Codeword$_2$ $(d_{n-1L})(d_{n-1U})$ | Codeword$_2$ $(d_{n-2L})(d_{n-2U})$ | Codeword$_2$ $(d_{0L})(d_{0U})$ | Codeword$_2$ $(P_{2L})(P_{2U})$ | Codeword$_2$ $(Q_{2L})(Q_{2U})$ |

TABLE 2-continued

| CODEWORD -- DATA AND P AND Q | | | | |
|---|---|---|---|---|
| Sector of Drive $d_{n-1}$ | Sector of Drive $d_{n-2}$ | Sector of Drive $d_0$ | Sector of Drive P | Sector of Drive Q |
| . | | | | |
| . | | | | |
| . | | | | |
| Codeword$_n$ $(d_{n-1L})(d_{n-1U})$ | Codeword$_n$ $(d_{n-2L})(d_{n-2U})$ | Codeword$_n$ $(d_{0L})(d_{0U})$ | Codeword$_n$ $(P_{nL})(P_{nU})$ | Codeword$_n$ $(Q_{nL})(Q_{nU})$ |

Referring back to FIG. 10, for a parallel data write to the disks, the data is provided in parallel from buffers 330, 331, 332 and 333 along those data buses coupling the buffers to X-bar switches 310, 311, 312, and 313 after the 36-bits of data are disassembled in word assemblers 350 through 353 into 9-bit words. These X-bar switches are also coupled to inputs D3, D2, D1 an D0, respectively, of ACC 348 and ACC 349. In parallel processing modes, the two ACCs act as mutual "backups" to one another. Should all fail, the other will still perform the necessary error correcting functions. In addition to operating in a purely "backup" condition, the second level controller engine configures the ACCs so that each ACC is performing the error detection and correction functions for a portion of the set, the other ACC performing these functions for the remaining disk drives in the set. As the ACC units are still coupled to all the disk drives, failure of one or the other unit does not impact the system as the operating ACC can be reconfigured to act as the dedicated ACC unit for the entire set. For purposes of discussion, it is assumed here that ACC 348 is operating. ACC 348 will calculate the P and Q redundancy term for the data in the X-bar switches and provide the terms to its $E_1$ and $E_2$ outputs, which outputs are coupled to all the X-bar switches. For discussion only, it is assumed that only the $E_2$ connection of X-bar switch 314 and the $E_1$ connection of X-bar switch 315 are enabled. Thus, although the data is provided along the buses coupling ACC 348's $E_1$ and $E_2$ output to all the X-bar switches, the Q term is received only by X-bar switch 314 and the P term is received by X-bar switch 315. Then, the Q and P terms are provided first to DSI units 344 and 345 and then disk drives 20A5 and 20A6. It should be recalled that the various internal registers in the X-bar switches will act as a multi-stage pipeline, effectively slowing the transit of data through the switches sufficiently to allow ACC 348's redundancy circuit 302 to calculate the P and Q redundancy terms.

As ACC 349 is coupled to the X-bar switches in a substantially identical manner to ACC 348, the operation of the system when ACC 349 is operational is essentially identical to that described for ACC 348.

Subsequent parallel reads from the disks occur in the following manner. Data is provided on bi-directional buses to DSI units 340, 341, 342 and 343. P and Q redundancy terms are provided by DSI units 345 and 344, respectively. As the data and P and Q terms are being transferred through X-bar switches 310 through 315, ACC 348 uses the P and Q terms to determine if the data being received from the disk drives is correct. Word assemblers 350 through 353 assemble successive 9-bit words until the next 36-bits are available. This 36-bits are forwarded to buffers 330 through 333. Note that the 9-bit words are transmitted to the buffers in parallel. If that data is incorrect, the second level controller will be informed.

During a parallel read operation, in the event that there is a failure of a disk drive, the failed disk drive will, in certain instances, communicate to the second level controller that it has failed. The disk drive will communicate with the second level controller if the disk drive cannot correct the error using its own corrector. The second level controller will then communicate with ACCs 348 and 349 by loading the failed drive registers in the ACC (not shown in the figures) with the address of the failed drive. The failed drive can be removed from the set by deleting its address from the configuration registers. One of the set's spare drives can then be used in place of the failed drive by inserting the address of the spare drive into the configuration registers.

The ACC will then calculate the replacement data necessary to rewrite all the information that was on the failed disk onto the newly activated spare. In this invention, the term spare or backup drive indicates a disk drive which ordinarily does not receive or transmit data until another disk drive in the system has failed.

When the data, P, and Q bytes are received, the ACC circuits use the failed drive location in the failed drive registers to direct the calculation of the replacement data for the failed drive. After the calculation is complete, the data bytes, including the recovered data, are sent to data buffers in parallel. Up to two failed drives can be tolerated with the Reed-Solomon code implemented herein. All operations to replace failed disk drives and the data thereon occur when the system is operating in a parallel mode.

Regeneration of data occurs under second level controller control. When a failed disk drive is to be replaced, the ACC regenerates all the data for the replacement disk. Read/write operations are required until all the data has been replaced. The regeneration of the disk takes a substantial amount of time, as the process occurs in the background of the system's operations so as to reduce the impact to normal data transfer functions. Table 3 below shows the actions taken for regeneration reads. In Table 3, i represents a first failed drive and j represents a second failed drive. In Table 3, the column labelled Failed Drives indicates the particular drives that have failed. The last column describes the task of the ACC given the particular indicated failure.

TABLE 3

| Failed Drives | | Regeneration Read |
|---|---|---|
| P | — | ACC calculates P redundancy |
| Q | — | ACC calculates Q redundancy |
| i | — | ACC calculates replacement data for i drive |
| i | P | ACC calculates replacement data for i drive and P redundancy |
| Q | i | ACC calculates replacement data for i drive and Q redundancy |
| j | i | ACC calculates replacement data for i and j drives |

TABLE 3-continued

| Regeneration Read | | |
|---|---|---|
| Failed Drives | | |
| P | Q | ACC calculates P and Q redundancy |

It should be noted that if both a data disk drive and a redundancy disk drive fail, the data on the data disk drive must be regenerated before the redundancy terms on the redundancy drive. During a regeneration write, regeneration data or redundancy terms are written to a disk and no action is required from the ACC logic.

During a parallel read operation, it should also be noted that additional error detection may be provided by the ACC circuitry.

Table 4 indicates what actions may be taken by the ACC logic unit when the indicated drive(s) has or have failed during a failed drive read operation. In this operation, the drives indicated in the Failed Drives columns are known to have failed prior to the read operation. The last column indicates the ACC response to the given failure.

TABLE 4

| Failed Drives | | |
|---|---|---|
| P | | No action by ACC |
| Q | | No action by ACC |
| i | | ACC calculates replacement data |
| i | P | ACC calculates the replacement data |
| Q | i | ACC calculates the replacement data |
| i | j | ACC calculates replacement data |
| P | Q | No action by ACC |

Transaction Processing Mode: Read

Transaction processing applications require the ability to access each disk drive independently. Although each disk drive is independent, the ACC codeword with P and Q redundancy is maintained across the set in the previously described manner. For a normal read operation, the ACC circuitry is not generally needed. If only a single drive is read, the ACC cannot do its calculations since it needs the data from the other drives to assemble the entire codeword to recalculate P and Q and compare it to the stored P and Q. Thus, the data is assumed to be valid and is read without using the ACC circuitry (see FIG. 15). Where drive 20C1 is the one selected, the data is simply passed through DSI unit 342 X-bar switch 312, word assembler 352 and buffer 332 to the external computer. If the disk drive has failed, the read operation is the same as a failed drive read in parallel mode with the exception that only the replacement data generated by the ACC is sent to the data buffer. In this case, the disk drive must notify the second level controller that it has failed, or the second level controller must otherwise detect the failure. Otherwise, the second level controller will not know that it should read all the drives, unless it assumes that there might be an error in the data read from the desired drive. The failed drive read is illustrated in FIG. 16, with drive 20C1 having the desired data, as in the example of FIG. 15. In FIG. 16, the second level controller knows that drive 20C1 has failed, so the second level controller calls for a read of all drives except the failed drive, with the drive 20C1 data being reconstructed from the data on the other drives and the P and Q terms. Only the reconstructed data is provided to its buffer, buffer 332, since this is the only data the external computer needs.

Transaction Processing Mode: Write

When any individual drive is written to, the P and Q redundancy terms must also be changed to reflect the new data (see FIG. 18). This is because the data being written over was part of a code word extending over multiple disk drives and having P and Q terms on two disk drives. The previously stored P and Q terms will no longer be valid when part of the codeword is changed, so new P and Q terms, P" and Q", must be calculated and written over the old P and Q terms on their respective disk drives. P" and Q" will then be proper redundancy terms for the modified code word.

One possible way to calculate P" and Q" is to read out the whole codeword and store it in the buffers. The new portion of the codeword for drive 20C1 can then be supplied to the ACC circuit along with the rest of the codeword, and the new P" and Q" can be calculated and stored on their disk drives as for a normal parallel write. However, if this method is used, it is not possible to simultaneously do another transaction mode access of a separate disk drive (i.e., drive 20A1) having part of the codeword, since that drive (20A1) and its buffer are needed for the transaction mode write for the first drive (20C1).

According to a method of the present invention, two simultaneous transaction mode accesses are made possible by using only the old data to be written over and the old P and Q to calculate the new P" and Q" for the new data. This is done by calculating an intermediate P' and Q' from the old data and old P and Q, and then using P' and Q' with the new data to calculate the new P" and Q". This requires a read-modify-write operation on the P and Q drives. The equations for the new P and Q redundancy are:

New P redundancy (P")=(old P−old data)+new data

New Q redundancy (Q")=(old Q−old data·$a_j$)+new data·$a_j$

P'=old P−old data

Q'=old Q−old data·$a_j$

Where $a_i$ is the coefficient from the syndrome equation $S_1$; and i is the index of the drive.

During the read portion of the read-modify-write, the data from the drive to be written to and the P and Q drives are summed by the ACC logic, as illustrated in FIG. 17. This summing operation produces the P' and Q' data. The prime data is sent to a data buffer. When the new data is in a data buffer, the write portion of the cycle begins as illustrated in FIG. 18. During this portion of the cycle, the new data and the P' and Q' data are summed by the ACC logic to generate the new P" and Q" redundancy. When the summing operation is complete, the new data is sent to the disk drive and the redundancy information is sent to the P and Q drives.

Parity Check of P and Q for Transaction Mode Write

During these read-modify-write operations, it is also possible that the ACC unit itself may fail. In this case, if the data in a single element were to be changed by a read-modify-write operation, a hardware failure in the ACC might result in the redundancy bytes for the new data being calculated erroneously. To prevent this occurrence, the parity detector and parity generator are made part of the ACC circuitry. This additional redundant circuit is shown in FIGS. 14a and 14b and resides within redundancy circuit 302 as shown in FIG. 11. When data is received by the ACC circuitry, parity is checked to insure that no errors have occurred using the P and Q redundancy terms. In calculating Q", new parity is generated for the product of the multiply operation and is summed with the parity of the old Q" term. This creates the parity for the new Q term. For the P byte, the parity bits from the data are summed with the parity bit of the old P term to create the new parity bit for the new P" term. Before writing the new data back to the disk drive, the parity of Q' (calculated as indicated previously) is checked. Should Q' be incorrect, the second level controller engine will be informed of an ACC failure. In this manner, a failure in the ACC can be detected.

The same operations are performed for a failed disk drive write in transaction processing operations as for parallel data writes, except that data is not written to a failed drive or drives.

With respect to transaction processing functions during normal read operations, no action is required from the ACC logic. The actions taken by the ACC logic during a failed drive read in transaction processing ode are listed in Table 5 below, where i and j represent the first and second failed drives. The columns labelled Failed Drives indicate which drives have failed. The last column indicates what action the ACC may or may not take in response to the indicated failure.

TABLE 5

| Failed Drives | | |
|---|---|---|
| P | — | Redundancy drives are not read; no ACC action |
| Q | — | Redundancy drives are not read; no ACC action |
| i | — | ACC logic calculates replacement data and performs a parallel read |
| i | P | ACC logic calculates replacement data and performs a parallel read |
| Q | i | ACC logic calculates replacement data and performs a parallel read |
| j | i | ACC logic calculates replacement data and performs a parallel read |
| P | Q | No ACC action as only data disk drives are read |

If two data disk drives fail, the ACC logic must calculate the needed replacement data for both disk drives. If only one failed drive is to be read, both failed drives must still be noted by the ACC logic.

In the read-before-write operation (part of the read-modify-write process), the ACC logic generates P' and Q' redundancy terms. Table 6 shows the action taken by the ACC logic when a failed disk drive read precedes a write in this process. Again, i and j represent the first and second failed drives. The columns headed by Failed Drives indicate which drives have failed, and the last column denotes the response of the ACC to the indicated failures.

TABLE 6

| Failed Drives | | |
|---|---|---|
| P | — | ACC calculates Q' only |
| Q | — | ACC calculates P' only |
| i | — | ACC logic takes no action and all good data disk drives are read into data buffers |
| i | P | All good data disk drives are read into data buffers |

TABLE 6-continued

| Failed Drives | | |
|---|---|---|
| Q | i | All good data disk drives are read into data buffers |
| i | j | All good data disk drives are read into data buffers |
| i | failed drive | Perform a parallel read, the ACC logic calculates the replacement data for the jth failed drive. Next, the remaining good data disk drives are read into the data buffers. |
| P | Q | No read before write operation is necessary |

When a failed data disk drive is to be written, all good data disk drives must be read so that a new P and Q redundancy can be generated. All of the data from the good data disk drive and the write data is summed to generate the new redundancy. When two data disk drives fail, the ACC logic must calculate replacement data for both failed drives. If only one drive is to be read, both must be reported to the ACC logic.

During write operations, the ACC continues to calculate P and Q redundancy. Table 7 shows the ACC's tasks during failed drive writes. Here P and Q represent the P and Q redundancy term disk drives, and i and j represent the first and second failed data disk drives. The columns Failed Drives denote the particular failed drives, and the last column indicates the ACC response to the failed drives.

TABLE 7

| Failed Drives | | |
|---|---|---|
| P | — | ACC calculates Q redundancy only |
| Q | — | ACC calculates P redundancy only |
| i | — | ACC calculates P and Q redundancy |
| i | P | ACC calculates Q redundancy only |
| Q | i | ACC calculates P redundancy only |
| i | j | ACC calculates P and Q redundancy |
| P | Q | ACC logic takes no action |

Summary of ECC

The interconnected arrangements herein described relative to both preferred embodiments of the present invention allow for the simultaneous transmission of data from all disks to the word assemblers or vice versa. Data from or to any given disk drive may be routed to any other word assembler through the X-bar switches under second level controller engine control. Additionally, data in any word assembler may be routed to any disk drive through the X-bar switches. The ACC units receive all data from all X-bar switches simultaneously. Any given disk drive, if it fails, can be removed from the network at any time. The X-bar switches provide alternative pathways to route data or P and Q terms around the failed component.

The parallel arrangement of disk drives and X-bar switches creates an extremely fault-tolerant system. In the prior art, a single bus feeds the data from several disk drives into a single large buffer. In the present invention, the buffers are small and one buffer is assigned to each disk drive. The X-bar switches, under control of the ACC units, can route data from any given disk drive to any given buffer and vice versa. Each second level controller has several spare disks and one spare buffer coupled to it. The failure of any two disks can be easily accommodated by switching the failed disk from the configuration by means of its X-bar switch and switching one of the spare disks onto the network. The present invention thus uses the error detection and correction capabilities of a Reed-Solomon error correction code in an operational environment where the system's full operational capabilities can be maintained by reconfiguring the system to cope with any detected disk or buffer failure. The ACC can correct and regenerate the data for the failed disk drive and, by reconfiguring the registers of the failed and spare disk drives, effectively remove the failed drive from the system and regenerate or reconstruct the data from the failed disk onto the spare disk.

Disk Drive Configuration and Format

The present invention allows a set of physical mass data storage devices to be dynamically configured as one or more logical mass storage devices. In accordance with the present invention, such a set of physical devices is configurable as one or more redundancy groups and each redundancy group is configurable as one or more data groups.

A redundancy group, as previously used in known device sets, is a group of physical devices all of which share the same redundant device set. A redundant device is a device that stores duplicated data or check data for purposes of recovering stored data if one or more of the physical devices of the group fails.

Where check data is involved, the designation of a particular physical device as a redundant device for an entire redundancy group requires that the redundant device be accessed for all write operations involving any of the other physical devices in the group. Therefore, all write operations for the group interfere with one another, even for small data accesses that involve less than all of the data storage devices.

It is known to avoid this contention problem on write operations by distributing check data throughout the redundancy group, thus forming a logical redundant device comprising portions of several or all devices of the redundancy group. For example, FIG. 19 shows a group of 13 disk storage devices. The columns represent the various disks D1-D13 and the rows represent different sectors S1-S5 on the disks. Sectors containing check data are shown as hatched. Sector S1 of disk D13 contains check data for sectors of disks D1-D12. Likewise, the remaining hatched sectors contain check data for their respective sector rows. Thus, if data is written to sector S4 of disk D7, then updated check data is written into sector S4 of disk D10. This is accomplished by reading the old check data, re-coding it using the new data, and writing the new check data to the disk. This operation is referred to as a read-modify-write. Similarly, if data is written to sector S1 of disk D11, then check data is written into sector S1 of disk D13. Since there is no overlap in this selection of four disks for writes, both read-modify-write operations can be performed in parallel.

A distribution of check data in a redundancy group in the manner shown in FIG. 19 is known as a striped check data configuration. The term "striped redundancy group" will be used herein to refer generally to a redundancy group in which check data is arranged in a striped configuration as shown in FIG. 19, and the term "redundancy group stripe depth" will be used herein to refer to the depth of each check data stripe in such a striped redundancy group.

In previously known device sets, it was known to provide the whole set as a single redundancy group. It has been found that a redundancy group can be divided into various "extents", each defined as a portion of the depth of the redundancy group and each capable of having a configuration of check data different from that of other extents in the same redundancy group. Moreover, it has been found that more than one redundancy group can be provided in a single device set, under the control of a single "array controller", and connected to a main processing unit via one or more device controllers.

Similarly, in previously known device sets, the single redundancy group included only one data group for application data—i.e., the device set operated as a single logical device. It has been found, however, that a redundancy group can be broken up into multiple data groups, each of which can operate as a separate logical storage device or as part of a larger logical storage device. A data group can include all available mass storage memory on a single physical device (i.e., all memory on the device available for storing application data), or it can include all available mass storage memory on a plurality of physical devices in the redundancy group. Alternatively, as explained more fully below, a data group can include several physical devices, but instead of including all available mass storage memory of each device might only include a portion of the available mass storage memory of each device. In addition, it has been found that it is possible to allow data groups from different redundancy groups to form a single logical device. This is accomplished, as will be more fully described, by superimposing an additional logical layer on the redundancy and data groups.

Moreover, in previously known device sets in which application data is interleaved across the devices of the set, the data organization or geometry is of a very simple form. Such sets generally do not permit different logical organizations of application data in the same logical unit nor do they permit dynamic mapping of the logical organization of application data in a logical unit. It has been found that the organization of data within a data group can be dynamically configured in a variety of ways. Of particular importance, it has been found that the data stripe depth of a data group can be made independent of redundancy group stripe depth, and can be varied from one data group to another within a logical unit to provide optimal performance characteristics for applications having different data storage needs.

An embodiment of a mass storage system 500 including two second level controllers 14A and 14B is shown in the block diagram of FIG. 20. As seen in FIG. 20, each of parallel sets 501 and 502 includes thirteen physical drives 503-515 and a second level controller 14. Second level controller 14 includes a microprocessor 516a which controls how data is written and validated across the drives of the parallel set. Microprocessor 516a also controls the update or regeneration of data when one of the physical drives malfunctions or loses synchronization with the other physical drives of the parallel set. In accordance with the present invention, microprocessor 516a in each second level controller 14 also controls the division of parallel sets 501 and 502 into redundancy groups, data groups and application units. The redundancy groups, data groups and application units can be configured initially by the system operator when the parallel set is installed, or they can be configured at any time before use during run-time of the parallel set. Configuration can be accomplished, as described in greater detail below, by defining certain configuration parameters that are used in creating various address maps in the program memory of microprocessor 516a and, preferably, on each physical drive of the parallel set.

Each of second level controllers 14A and 14B is connected to a pair of first level controllers 12A and 12B. Each first level controller is in turn connected by a bus or channel 522 to a CPU main memory. In general, each parallel set is attached to at least two sets of controllers so that there are at least two parallel paths from one or more CPU main memories to that parallel set. Thus, for example, each of the second level controllers 14A and 14B is connected to first level controllers 12A and 12B by buses 524 and 526. Such parallel data paths from a CPU to the parallel set are useful for routing data around a busy or failed first or second level controllers as described above.

Within each parallel set are an active set 528 comprising disk drive units 503-514, and a backup set 530 comprising disk drive unit 515. Second level controller 14 routes data between first level controllers 12 and the appropriate one or ones of disk drive units 503-515. First level controllers 12 interface parallel sets 501 and 502 to the main memories of one or more CPUS; and are responsible for processing I/O requests from applications being run by those CPUs. A further description of various components of the apparatus of parallel sets 501 and 502 and first level controllers 12 can be found in the following co-pending, commonly assigned U.S. patent applications incorporated herein in their entirety by reference: Ser. No. 07/487,648 entitled "NON-VOLATILE MEMORY STORAGE OF WRITE OPERATION IDENTIFIER IN DATA STORAGE DEVICE," filed in the names of David T. Powers, Randy Katz, David H. Jaffe, Joseph S. Glider and Thomas E. Idleman; and Ser. No. 07/488,750 entitled "DATA CORRECTIONS APPLICABLE TO REDUNDANT ARRAYS OF INDEPENDENT DISKS," filed in the names of David T. Powers, Joseph S. Glider and Thomas E. Idleman.

Figure 21:
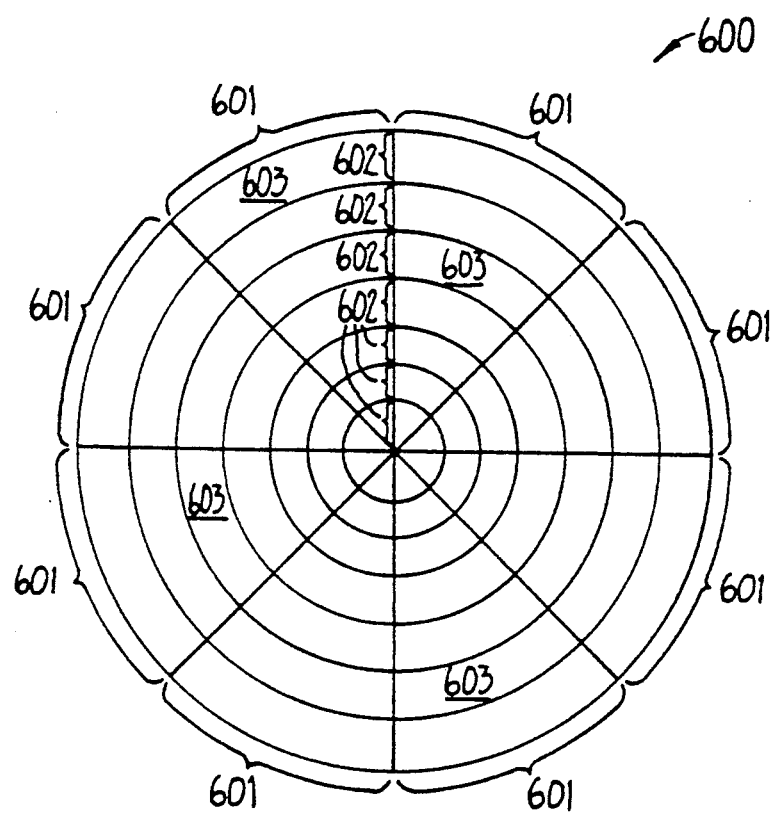
FIG. 21 is a schematic diagram of the distribution of data on the surface of a magnetic disk.

To understand how data is spread among the various physical drives of an active set 528 of a parallel set 501 or 502, it is necessary to understand the geometry of a single drive. FIG. 21 shows one side of the simplest type of disk drive—a single platter drive. Some disk drives have a single disk-shaped "platter" on both sides of which data can be stored. In more complex drives, there may be several platters on one "spindle," which is the central post about which the platters spin.

As shown in FIG. 21, each side 600 of a disk platter is divided into geometric angles 601, of which eight are shown in FIG. 21, but of which there could be some other number. Side 600 is also divided into ring-shaped "tracks" of substantially equal width, of which seven are shown in FIG. 21. The intersection of a track and a geometric angle is known as a sector and typically is the most basic unit of storage in a disk drive system. There are fifty-six sectors 603 shown in FIG. 21.

A collection of tracks 602 of equal radius on several sides 600 of disk platters on a single spindle make up a "cylinder." Thus, in a single-platter two-sided drive, there are cylinders of height=2, the number of cylinders equalling the number of tracks 602 on a side 600. In a two-platter drive, then, the cylinder height would be 4. In a one-sided single-platter drive, the cylinder height is 1.

Figure 22:
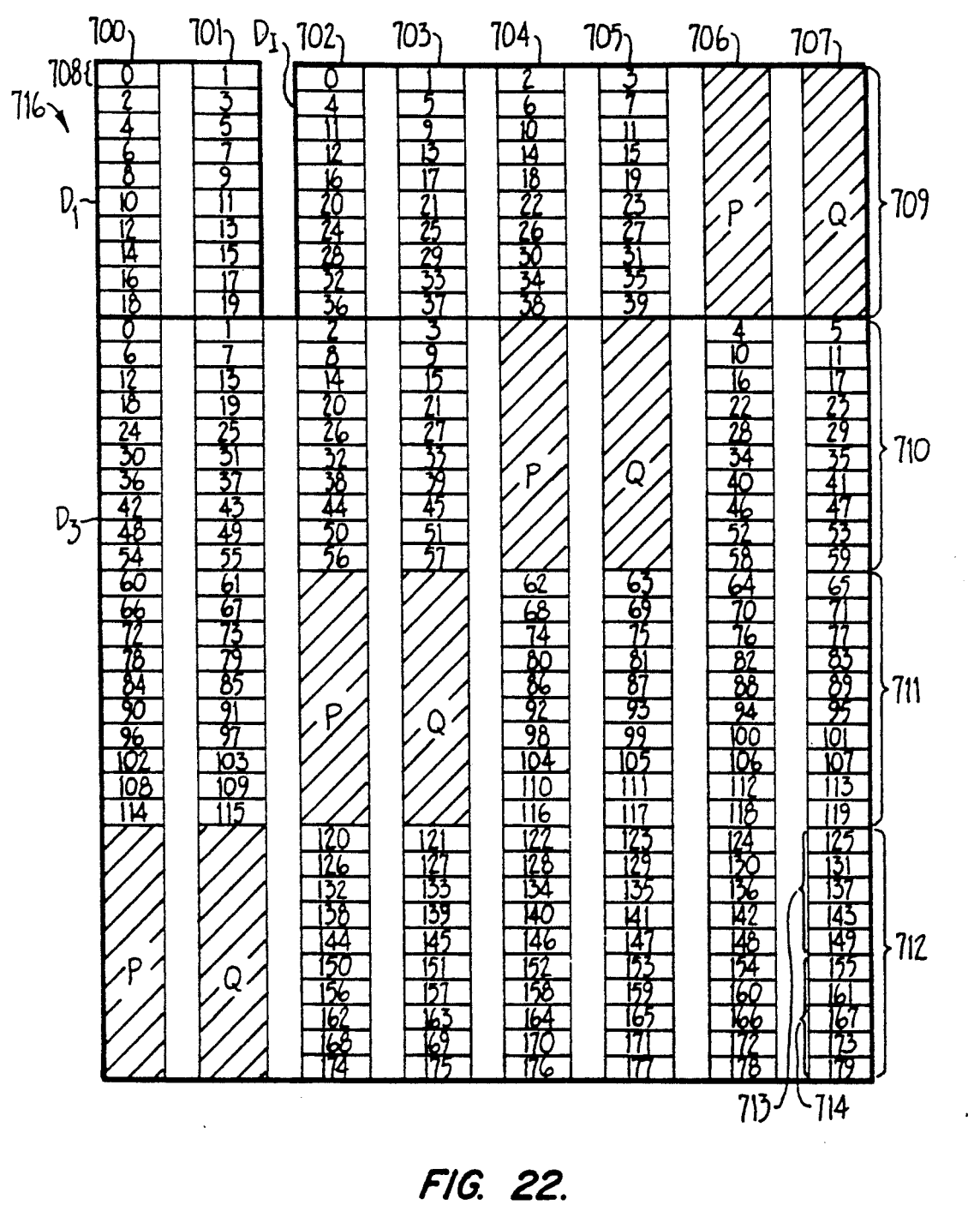

A disk drive is read and written by "read/write heads" that move over the surfaces of sides 600. FIG. 22 shows the distribution of data sub-units—sectors, tracks and cylinders—in a group 716 of eight single-platter two-sided drives 700-707 in a manner well-suited to illustrate the present invention. Drives 700-707 may, for example, correspond to drive units 503-510 of parallel set 501 or 502. Each of the small horizontal divisions represents a sector 708. For each drive, four cylinders 709-712 are shown, each cylinder including two tracks 713 and 714, each track including five sectors.

In the preferred embodiment shown in FIG. 22, group 716 comprises a single redundancy group in which two types of redundancy data, referred to as "P" check data and "Q" check data, are used to provide data redundancy. The P and Q check data are the results of a Reed-Solomon coding algorithm applied to the mass storage data stored within the redundancy group. The particular method of redundancy used is implementation specific. As shown, the redundancy data is distributed across all spindles, or physical drives, of group 716, thus forming two logical check drives for the redundancy group comprising group 716. For example, the P and Q check data for the data in sectors 708 of cylinders 709 of drives 700-705 are contained respectively in cylinders 709 of drives 706 and 707. Each time data is written to any sector 708 in any one of cylinders 709 of drives 700-705, a read-modify-write operation is performed on the P and Q check data contained in corresponding sectors of drives 706 and 707 to update the redundancy data.

Likewise, cylinders 710 of drives 700-707 share P and Q check data contained in cylinders 710 of drives 704 and 705; cylinders 711 of drives 700-707 share P and Q check data contained in cylinders 711 of drives 702 and 703; and cylinders 712 of drives 700-707 share P and Q check data contained in cylinders 712 of drives 700 and 701.

Three data groups D1-D3 are shown in FIG. 22. Data group D1 includes cylinders 709 of each of spindles 700, 701. Data group D2 includes cylinders 709 of each of spindles 702, 703. Data group D3 includes all remaining cylinders of spindles 700-707, with the exception of those cylinders containing P and Q check data. Data group D1 has a two-spindle bandwidth, data group D2 has a four-spindle bandwidth and data group D3 has a six-spindle bandwidth. Thus it is shown in FIG. 22 that, in accordance with the principles of the present invention, a redundancy group can comprise several data groups of different bandwidths. In addition, each of data groups D1-D3 may alone, or in combination with any other data group, or groups, comprise a separate logical storage device. This can be accomplished by defining each data group or combination as an individual application unit. Application units are discussed in greater detail below.

In FIG. 22, sectors 708 are numbered within each data group as a sequence of logical data blocks. This sequence is defined when the data groups are configured, and can be arranged in a variety of ways. FIG. 22 presents a relatively simple arrangement in which the sectors within each of data groups D1-D3 are numbered from left to right in stripes crossing the width of the respective data group, each data stripe having a depth of one sector. This arrangement permits for the given bandwidth of each data group a maximum parallel transfer rate of consecutively numbered sectors.

The term "data group stripe depth" is used herein to describe, for a given data group, the number of logically contiguous data sectors stored on a drive within the boundaries of a single stripe of data in that data group.

In accordance with the principles of the present invention, the depth of a data group stripe may be lesser than, greater than or equal to the depth of redundancy group stripe. As one example of this, FIG. 22 shows that data groups D1-D3 each has a data group stripe depth of one sector, and are all included in a redundancy group having a redundancy group stripe depth of one cylinder.

Redundancy group 716 can handle up to six data read requests simultaneously—one from each of spindles 700-705—because the read/write heads of the spindles can move independently of one another. Redundancy group 716 as configured in FIG. 22 also can handle certain combinations of write requests simultaneously. For example, in many instances any data sector of data group D1 can be written simultaneously with any data sectors of data group D3 contained on spindles 702-705 that are not backed up by P or Q check data on spindles 700, 701, 706 or 707.

Redundancy group 716 as configure#in FIG. 22 usually cannot handle simultaneous write operations to sectors in data groups D1 and D2, however, because to perform a write operation in either of these data groups, it is necessary to write to drives 706 and 707 as well. Only one write operation can be performed on the check data of drives 706, 707 at any one time, because the read/write heads can only be in one place at one time. Likewise, regardless of the distribution of data groups, write operations to any two data sectors backed up by check data on the same drive cannot be done simultaneously. The need for the read/write heads of the check drives to be in more than one place at one time can be referred to as "collision."

It is to be understood that the above-described restriction concerning simultaneous writes to different data drives sharing common check drives is peculiar to check drive systems, and is not a limitation of the invention. For example, the restriction can be avoided by implementing the invention using a mirrored redundancy group, which does not have the property that different data drives share redundancy data on the same drive.

Figure 23:
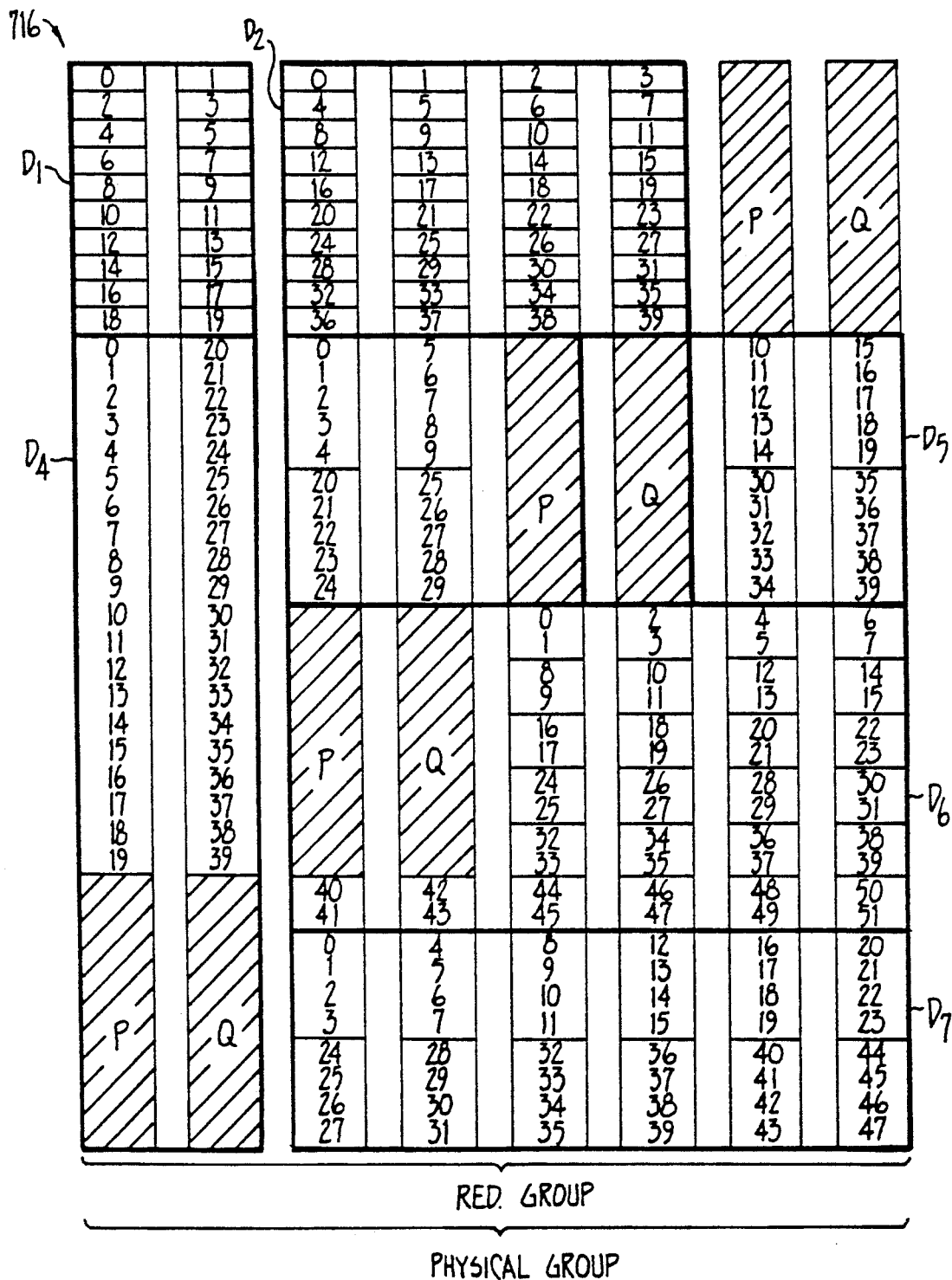
FIG. 23 is a schematic diagram of the distribution of data in a second, more particularly preferred embodiment of a redundancy group according to the present invention.

FIG. 23 shows a more particularly preferred embodiment of redundancy group 716 configured according to the present invention. In FIG. 23, as in FIG. 22, the logical check "drives" are spread among all of spindles 700-707 on a per-cylinder basis, although they could also be on a per-track basis or even a per-sector basis.

Data groups D1 and D2 are configured as in FIG. 22. The sectors of data group D3 of FIG. 22, however, have been divided among four data groups D4-D7. As can be seen in FIG. 23, the sequencing of sectors in data groups D4-D7 is no longer the same as the single-sector-deep striping of data groups D1 and D2. Data group D4 has a data group stripe depth of 20 sectors—equal to the depth of the data group itself. Thus, in data group D4 logically numbered sectors 0-19 can be read consecutively by accessing only a single spindle 700, thereby allowing the read/write heads of spindles 701-707 to handle other transactions. Data groups D5, D6 and D7 each show examples of different intermediate data group stripe depths of 5 sectors, 2 sectors and 4 sectors, respectively.

The distribution of the check data over the various spindles can be chosen in such a way as to minimize collisions. Further, given a particular distribution, then to the extent that second level controller 14 has a choice in the order of operations, the order can be chosen to minimize collisions.

The distribution of redundancy groups and data groups over the active set 528 of a parallel set 501 or 502 can be parameterized. For example, the redundancy group can be characterized by a redundancy group width (in spindles), representing the number of spindles spanned by a particular set of check data, a redundancy group depth (in any subunit—sector, track or cylinder) and a redundancy group stripe depth (also in any subunit—sector, track or cylinder). Data groups can be characterized by width (in spindles), depth (in any subunit—sector, track or cylinder), and data group stripe depth (also in any subunit sector, track or cylinder). Because data groups do not start only at the beginning of active set 528, they are also characterized by a "base", which is a two-parameter indication of the spindle and the offset from the beginning of the spindle at which the data group starts. A redundancy group may, like a data group, include less than all of an entire spindle. In addition, as previously stated herein, a redundancy group may be divided into a plurality of extents. The extents of a redundancy group have equal widths and different bases and depths. For each extent, the distribution of check data therein can be independently parameterized. In the preferred embodiment, each redundancy group extent has additional internal parameters, such as the depth of each redundancy group stripe within the redundancy group extent and the drive position of the P and Q check data for each such redundancy group stripe.

Redundancy group width reflects the trade-off between reliability and capacity. If the redundancy group width is high, then greater capacity is available, because only two drives out of a large number are used for check data, leaving the remaining drives for data. At the other extreme, if the redundancy group width=4, then a situation close to mirroring or shadowing, in which 50% of the drives are used for check data, exists (although with mirroring if the correct two drives out of four fail, all data on them could be lost, while with check data any two drives could be regenerated in that situation). Thus low redundancy group widths represent greater reliability, but lower capacity per unit cost, while high redundancy group widths represent greater capacity per unit cost with lower, but still relatively high, reliability.

Data group width reflects the trade-off discussed above between bandwidth and request rate, with high data group width reflecting high bandwidth and low data group width reflecting high request rates.

Data group stripe depth also reflects a trade-off between bandwidth and request rate. This trade-off varies depending on the relationship of the average size of I/O requests to the data group and the depth of data stripes in the data group. The relationship of average I/O request size to the data group stripe depth governs how often an I/O request to the data group will span more than one read/write head within the data group; it thus also governs bandwidth and request rate. If high bandwidth is favored, the data group stripe depth is preferably chosen such that the ratio of average I/O request size to stripe depth is large. A large ratio results in I/O requests being more likely to span a plurality of data drives, such that the requested data can be accessed at a higher bandwidth than if the data were located all on one drive. If, on the other hand, a high request rate is favored, the data group stripe depth is preferably chosen such that the ratio of I/O request size to data group stripe depth is small. A small ratio results in a lesser likelihood that an I/O request will span more than one data drive, thus increasing the likelihood that multiple I/O requests to the data group can be handled simultaneously.

The variance of the average size of I/O requests might also be taken into account in choosing data group stripe depth. For example, for a given average I/O request size, the data group stripe depth needed to achieve a desired request rate might increase with an increase in I/O request size variance.

In accordance with the present invention, the flexibility of a mass storage apparatus comprising a plurality of physical mass storage devices can be further enhanced by grouping data groups from one or from different redundancy groups into a common logical unit, referred to herein as an application unit. Such application units can thus appear to the application software of an operating system as a single logical mass storage unit combining the different operating characteristics of various data groups. Moreover, the use of such application units permits data groups and redundant groups to be configured as desired by a system operator independent of any particular storage architecture expected by application software. This additional level of logical grouping, like the redundancy group and data group logical levels, is controlled by second level controller 14.

Figure 24:
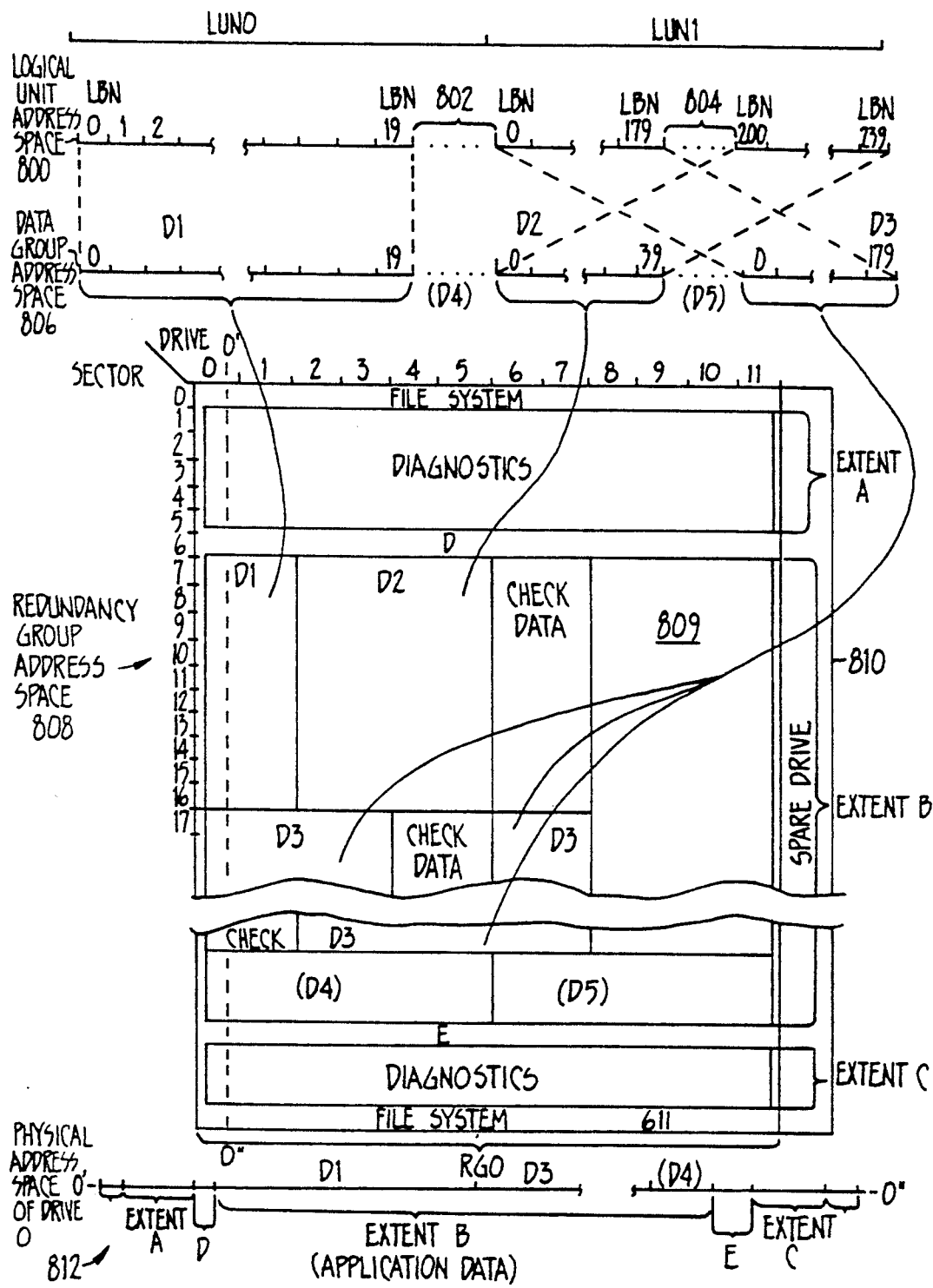
FIG. 24 is a diagram showing how the memory space of a device set might be configured in accordance with the principles of the present invention.

FIG. 24 illustrates an example of how application units, data groups and redundancy groups might be mapped to a device set such as parallel set 501 or 502, at initialization of the parallel set.

Referring first to the linear graph 800 of logical unit address space, this graph represents the mass data storage memory of the parallel set as it would appear to the application software of a CPU operating system. In the particular example of FIG. 24, the parallel set has been configured to provide a logical unit address space comprising two application (logical) units (LUN0 and LUN1). Logical unit LUN0 is configured to include 20 addressable logical blocks having logical block numbers LBN0-LBN19. As shown by FIG. 24, logical unit LUN0 also includes an unmapped logical address space 802 that is reserved for dynamic configuration. Dynamic configuration means that during run-time of the parallel set the CPU application software can request to change the configuration of the parallel set from its initial configuration. In the example of FIG. 24, unmapped spaces 802 and 804 are reserved respectively in each of logical units LUN0 and LUN1 to allow a data group to be added to each logical unit without requiring that either logical unit be taken off line. Such dynamic configuration capability can be implemented by providing a messaging service for a CPU application to request the change in configuration. On behalf of mass storage system 500, the messaging service can be handled, for example, by the first level controllers 12. Logical unit LUN1 includes a plurality of addressable logical blocks LBN0-LBN179 and LBN200-LBN239. The logical blocks LBN180-LBN199 are reserved for dynamic configuration, and in the initial configuration of the parallel set, as shown in FIG. 24, are not available to the application software.

The mass storage address space of logical unit LUN0 comprises a single data group D1, as shown by data group address space chart 806. Data group D1 includes 20 logically contiguous data blocks 0-19, configured as shown in FIG. 22 and corresponding one to one with logical block numbers LBN0-LBN19. Logical unit LUN1 includes two data groups D2 and D3, comprising respectively 40 data blocks numbered 0-39 corresponding to logical blocks LBN200-239 of logical unit LUN1, and 180 data blocks numbered 0-179 corresponding to logical blocks LBN0-LBN179 of logical unit LUN1. As shown by the example of FIG. 24, the logical blocks of a logical unit can be mapped as desired to the data blocks of one or more data groups in a variety of ways. Data group address space 806 also includes additional data groups (D4) and (D5) reserved for dynamic configuration. These data groups can be formatted on the disk drives of the parallel set at initialization or at any time during the run-time of the parallel set, but are not available to the application software in the initial configuration of the parallel set.

The redundancy group configuration of the parallel set is illustrated by a two dimensional address space 808, comprising the entire memory space of the parallel set. The horizontal axis of address space 808 represents the thirteen physical drives of the parallel set, including the twelve drives of active set 528 and the one spare drive of backup set 530. In FIG. 24, the drives of the active set are numbered 0-11 respectively to reflect their logical positions in the parallel set. The vertical axis of address space 808 represents the sectors of each physical drive. As shown by redundancy group address space 808, the parallel set has been configured as one redundancy group RG0 having three extents A, B and C. As can be seen, the width of each extent is equal to that of the redundancy group RG0: 12 logical drive positions or, from another perspective, the entire width of active set 528.

Extent A of redundancy group RG0 includes sectors 1-5 of drives 0-11. Thus, extent A of redundancy group RG0 has a width of 12 spindles, and an extent depth of 5 sectors. In the example of FIG. 24, extent A is provided as memory space for diagnostic programs associated with mass storage system 500. Such diagnostic programs may configure the memory space of extent A in numerous ways, depending on the particular diagnostic operation being performed. A diagnostic program may, for example, cause a portion of another extent to be reconstructed within the boundaries of extent A, including application data and check data.

Extent B of redundancy group RG0 includes all application data stored on the parallel set. More particularly, in the example of FIG. 24, extent B includes data groups D1, D2 and D3 configured as shown in FIG. 22, as well as additional memory space reserved for data groups (D4) and (D5), and a region 809 of memory space not mapped to either logical unit LUN0 or LUN1. This region 809 may, for example, be mapped to another logical unit (e.g., LUN2) being used by another application.

Address space 808 also includes a third extent C in which a second diagnostic field may be located. Although the parallel set is shown as including only a single redundancy group RG0, the parallel set may alternatively be divided into more than one redundancy group. For example, redundancy group RG0 might be limited to a width of 8 spindles including logical drive positions 0-7, such as is shown in FIGS. 22 and 23, and a second redundancy group might be provided for logical drive positions 8-11.

It is also not necessary that the entire depth of the parallel set be included in redundancy group RG0. As an example, FIG. 24 shows that above and below redundancy group RG0 are portions 810 and 811 of memory space 808 that are not included in the redundancy group. In the example of FIG. 24, portions 810 and 811 contain data structures reflecting the configuration of the parallel set. These data structures are described in greater detail below in connection with FIG. 25. In addition, any portion of memory space between set extents A, B and C, such as the portions indicated by regions D and E in FIG. 24, may be excluded from redundancy group RG0.

FIG. 24 further provides a graph 812 showing a linear representation of the physical address space of the drive in logical position 0. Graph 812 represents a sectional view of address space chart 810 along line 0'-0'', and further illustrates the relationship of the various logical levels of the present invention as embodied in the exemplary parallel set configuration of FIG. 24.

As stated previously, the parallel set can be configured by the operator initially at installation time and/or during run-time of the parallel set. The operator formats and configures the application units he desires to use by first determining the capacity, performance and redundancy requirements for each unit. These considerations have been previously discussed herein. Once the capacity, performance and redundancy requirements have been defined, the logical structure of the units can be specified by defining parameters for each of the logical layers (redundancy group layer, data group layer and application unit layer). These parameters are provided to a configuration utility program executed by processor 516a of second level controller 14. The configuration utility manages a memory resident database of configuration information for the parallel set. Preferably, a copy of this database information is kept in non-volatile memory to prevent the information from being lost in the event of a power failure affecting the parallel set. A format utility program executed by processor 516a utilizes the information in this database as input parameters when formatting the physical drives of the parallel set as directed by the operator.

The basic parameters defined by the configuration database preferably include the following:

| 1) For each redundancy group: | |
|---|---|
| Type: | Mirrored; Two check drives; One check drive; No check drive. |
| Width: | The number of logical drive positions as spindles in the redundancy group. |
| Extent Size: | For each extent of the redundancy group, the size (depth) of the extent in sectors |
| Extent Base: | For each extent of the redundancy group the physical layer address of the first sector in the extent. |
| Stripe in Depth: | For interleaved check drive groups, the depth, sectors of a stripe of check data. |
| Drives: | An identification of the physical drives included in the redundancy group. |
| Name: | Each redundancy group has a name that is unique across the mass storage system 500. |
| 2) For each data group: | |
| Base: | The index (logical drive number) of the drive position within the redundancy group that is the first drive position in the data group within the redundancy group. |
| Width: | The number of drive positions (logical drives) in the data group. This is the number of sectors across in the data group address space. |
| Start: | The offset, in sectors, within the redundancy group extent where the data group rectangle begins on the logical drive position identified by the base parameter. |
| Depth: | The number of sectors in a vertical column of the data group, within the redundancy group extent. Depth and width together are the dimensions respectively of the side and the top of the rectangle formed by each data group as shown in FIGS. 22-24. |
| Redundancy Group: | The name of the redundancy group to which the data group belongs. |
| Extent Number: | A name or number identifying the extent in which the data group is located. |
| Index: | The configuration utility will assign a number to each data group, unique within its redundancy group. This number will be used to identify the data group later, for the format utility and at run-time. |
| Data Group Stripe Depth: | The depth, in sectors, of logically contiguous blocks of data within each stripe of data in the data group. |
| 3) For each application unit: | |
| Size: | Size in sectors |
| Data Group List: | A list of the data groups, and their size and order, within the unit address space, and the base unit logical address of each data group. Each group is identified by the name of the redundancy group it is in and its index. |

Figure 25:
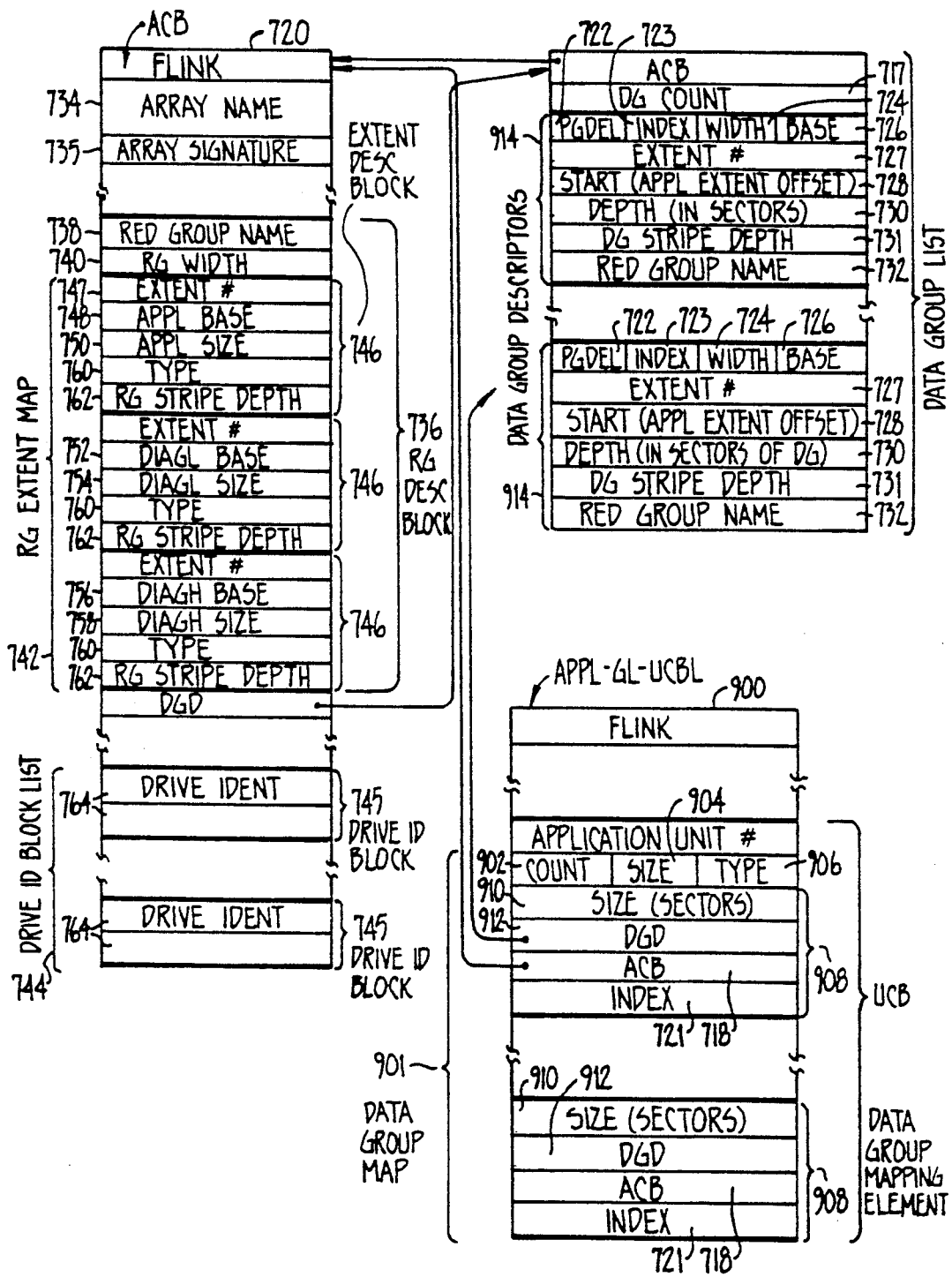
FIG. 25 is a diagram of an exemplary embodiment of data structures for napping between the logical levels of the present invention.

FIG. 25 illustrates exemplary data structures containing the above-described parameters that can be used in implementing the configuration database of a device set such as parallel set 501 or 502. These data structures may be varied as desired to suit the particular device set embodiment to which they are applied. For example, the data structures described hereafter allow for many options that may be unused in a particular device set, in which case the data structures may be simplified.

The configuration database includes an individual unit control block (UCB) for each application unit that references the parallel set (a unit may map into more than one parallel set). These UCB's are joined together in a linked list 900. Each UCB includes a field labeled APPLICATION UNIT # identifying the number of the application unit described by that UCB. Alternatively, the UCB's within link list 900 might be identified by a table of address pointers contained in link list 900 or in some other data structure in the program memory of microprocessor 516a. Each UCB further includes a map 901 of the data groups that are included in that particular application unit. Data group map 901 includes a count field 902 defining the number of data groups within the application unit, a size field 904 defining the size of the application unit in sectors, and a type field 906 that defines whether the linear address space of the application unit is continuous (relative addressing) or non-continuous (absolute addressing). A non-continuous address space is used to allow portions of the application unit to be reserved for dynamic configuration as previously described in connection with data groups (D4) and (D5) of FIG. 22.

Data group map 901 further includes a data group mapping element 908 for each data group within the application unit. Each data group mapping element 908 includes a size field 910 defining the size in sectors of the corresponding data group, a pointer 912 to a descriptor block 914 within a data group list 916, a pointer 718 to an array control block 720, and an index field 721. The data group mapping elements 908 are listed in the order in which the data blocks of each data group map to the LBN's of the application unit. For example, referring to LUN1 of FIG. 24, the mapping element for data group D3 would be listed before the data group mapping element for data group D2. Where the address space of the application unit is non-continuous, as in the case of LUN1 of FIG. 24, data group map 901 may include mapping elements corresponding to, and identifying the size of, the gaps between available ranges of LBN's.

Data group list 916 includes a descriptor block 914 for each data group within the parallel set, and provides parameters for mapping each data group to the redundancy group and redundancy group extent in which it is located. Data group list 916 includes a count field 717 identifying the number of descriptor blocks in the list. In the case of a redundancy group having a striped check data configuration, each data group descriptor block 914 may include a "pqdel" field 722 that defines the offset of the first data block of the data group from the beginning of the check data for the redundancy group stripe that includes that first data block. The value of pqdel field 722 may be positive or negative, depending on the relative positions of the drive on which the first data block of the data group is configured and the corresponding check data drives for the redundancy group stripe including that first data block. This value can be useful for assisting the second level controller in determining the position of the check data during I/O operations.

Each data group descriptor block 914 also includes an index field 723 (same value as index field 721), a width field 724, a base field 726, an extent number field 727, a start field 728, a depth field 730, a data group stripe depth field 731 and a redundancy group name field 732 that respectively define values for the corresponding parameters previously discussed herein.

Array control block 720 provides a map of redundancy groups of the parallel set to the physical address space of the drives comprising the parallel set. Array control block 720 includes an array name field 734 and one or more fields 735 that uniquely identify the present configuration of the parallel set. Array control block 720 also includes a list of redundancy group descriptor blocks 736. Each redundancy group descriptor block 736 includes a redundancy group name field 738 identifying the redundancy group corresponding to the descriptor block, a redundancy group width field 740 and a redundancy group extent map 742. Array control block 720 further includes a list 744 of physical drive identifier blocks 745.

For each extent within the redundancy group, redundancy group extent map 742 includes an extent descriptor block 746 containing parameters that map the extent to corresponding physical address in the memory space of the parallel set, and define the configuration of redundant information in the extent. As an example, extent descriptor blocks are shown for the three extents of redundancy group RG0 of FIG. 24, each extent descriptor block including an extent number field 747 and base and size fields defining the physical addresses of the corresponding extent. Application data base and size fields 748 and 750 correspond respectively to the base and size of extent B of redundancy group RG0; diagnostic (low) base and size fields 752 and 754 correspond respectively to the base and size of extent A of redundancy group RG0; and diagnostic (high) base and size fields 756 and 758 correspond respectively to the base and size of extent C of redundancy group RG0.

Each extent descriptor block 746 also includes a type field 760 that defines the type of redundancy implemented in the extent. For example, a redundancy group extent may be implemented by mirroring or shadowing the mass storage data stored in the data group(s) within the extent (in which case, the extent will have an equal number of data drives and redundant drives). Alternatively, a Reed-Solomon coding algorithm may be used to generate check data on one drive for each redundancy group stripe within the extent, or a more sophisticated Reed-Solomon coding algorithm may be used to generate two drives of check data for each redundancy group stripe. Type field 760 may specify also whether the check data is to be striped throughout the extent, and how it is to be staggered (e.g., the type field might index a series of standardized check data patterns, such as a pattern in which check data for the first redundancy group stripe in the extent is located on the two numerically highest logical drive positions of the redundancy group, check data for the second redundancy group stripe in the extent is located on the next two numerically highest logical drive positions, and so on). Yet another alternative is that type field 760 indicates that no check drives are included in the initial configuration of the redundancy group extent. This may be desired, for example, if the redundancy group extent is created for use by diagnostic programs. A redundancy group extent of this type was previously discussed in connection with extent A of redundancy group RG0 shown in FIG. 24.

Each extent descriptor block 746 may further include a redundancy group stripe depth field 762 to specify, if appropriate, the depth of redundancy group stripes within the extent.

List 744 of physical drive identifier blocks 745 includes an identifier block 745 for each physical drive in the parallel set. Each identifier block 745 provides information concerning the physical drive and its present operating state, and includes in particular one or more fields 764 for defining the logical position in the parallel set of the corresponding physical drive.

To summarize briefly the intended functions of the various data structures of FIG. 25, the unit control blocks of link list 900 define the mapping of application units to data groups within the parallel set. Mapping of data groups to redundancy groups is defined by data group list 916, and mapping of redundancy groups to the physical address space of the memory of the parallel set is defined by array control block 720.

When each physical disk of the parallel set is formatted by the formatting utility, a copy of the array control block 720, link list 900 and data group list 916 are stored on the drive. This information may be useful for various operations such as reconstruction of a failed drive. A copy of the configuration database also may be written to the controller of another parallel set, such that if one parallel set should fail, another would be prepared to take its place.

During each I/O request to a parallel set, the mapping from unit address to physical address spaces must be made. Mapping is a matter of examining the configuration database to translate: (1) from a unit logical address span specified in the I/O request to a sequence of data group address spans; (2) from the sequence of data group address spans to a set of address spans on logical drive positions within a redundancy group; and then (3) from the set of address spans on logical drive positions to actual physical drive address spans. This mapping process can be done by having an I/O request server step through the data structures of the configuration database in response to each I/O request. Alternatively, during initialization of the parallel set the configuration utility may, in addition to generating the configuration database as previously described, generate subroutines for the I/O request server for performing a fast mapping function unique to each data group. The particular manner in which the I/O request server carries out the mapping operations is implementation specific, and it is believed to be within the skill of one in the art to implement an I/O request server in accordance with the present invention as the invention is described herein.

The following is an example of how the I/O request server might use the data structures of FIG. 25 to map from a logical unit address span of an application I/O request to a span or spans within the physical address space of a parallel set. The logical unit address span is assumed to be defined in the I/O request by a logical application unit number and one or more LBN's within that application unit.

The I/O request server determines from the I/O request the application unit being addressed and whether that application unit references the parallel set. This latter determination can be made by examining link list 900 for a UCB having an APPLICATION UNIT # corresponding to that of the I/O request. If an appropriate UCB is located, the I/O request server next determines from the LBN(S) specified in the I/O request the data group or data groups in which data block(s) corresponding to those LBN(S) are located. This can be accomplished by comparing the LBN(S) to the size fields 910 of the mapping elements in data group map 901, taking into account the offset of that size field from the beginning of the application unit address space (including any gaps in the application unit address space). For example, if the size value of the first data group mapping element in map 901 is greater than the LBN(s) of the I/O request, then it is known that the LBN(s) correspond to data blocks in that data group. If not, then the size value of that first mapping element is added to the size value of the next mapping element in map 901 and the LBN(s) are checked against the resulting sum. This process is repeated until a data group is identified for each LBN in the I/O request.

Having identified the appropriate data group(s), the I/O request server translates the span of LBN's in the I/O request into one or more spans of corresponding data block numbers within the identified data group(s). The configuration utility can then use the value of index field 921 and pointer 912 within each mapping element 908 corresponding to an identified data group to locate the data group descriptor block 914 in data group list 916 for that data group. The I/O request server uses the parameters of the data group descriptor block to translate each span of data block numbers into a span of logical drive addresses.

First, the I/O request server determines the logical drive position of the beginning of the data group from the base field 726 of the data group descriptor block 914. The I/O request server also determines from fields 732 and 727 the redundancy group name and extent number in which the data group is located, and further determines from start field 728 the number of sectors on the drive identified in base field 726 between the beginning of that redundancy group extent and the beginning of the data group. Thus, for example, if the I/O request server is reading the descriptor block for data group D3 configured as shown in FIG. 24, base field 726 will indicate that the data group begins on logical drive position 0, redundancy name field 732 will indicate that the data group is in redundancy group RG0, extent field 727 will indicate that the data group is in extent B, and start field 728 will indicate that there is an offset of 10 sectors on logical drive 0 between the beginning of extent B and the first data block of data group D3.

Knowing the logical drive position and extent offset of the first data block of the data group, the I/O request server then determines the logical drive position and extent offset for each sequence of data blocks in the data group corresponding to the LBN's of the I/O request. To do this, the I/O request server may use the values of width field 724, depth field 730 and data group stripe depth field 731. If any check data is included within the rectangular boundaries of the data group, the position of the check data is taken into account if necessary in determining the logical drive position and extent offset address spans of the data blocks. This can be accomplished using information from array control block 720. More particularly, the I/O request server can determine the logical drive position and extent offset of any check data within the boundaries of the data group by examining the type field 760 and the redundancy group stripe depth field 762 of the appropriate redundancy group extent descriptor block 746 (the I/O request server can determine which extent descriptor block 746 is appropriate by finding the extent descriptor block 746 having an extent number field 747 that matches the corresponding extent number field 727 in the data group's descriptor block 914). The I/O request server is directed to array control block 720 by the pointer 718 in the data group mapping element 908.

To translate each logical drive position and extent offset address span to a physical address span on a particular physical drive of the parallel set, the I/O request server reads the physical drive identifier blocks 745 to determine the physical drive corresponding to the identified logical drive position. The I/O request server also reads the base field of the appropriate extent descriptor block 746 of array control block 720 (e.g., application base field 752), which provides the physical address on the drive of the beginning of the extent. Using the extent offset address span previously determined, the I/O request server can then determine for each physical drive the span of physical addresses that corresponds to the identified extent offset address span.

It may occur that during operation of a parallel set one or more of the physical drives is removed or fails, such that the data on the missing or failed drive must be reconstructed on a spare drive. In this circumstance, the configuration of the set must be changed to account for the new drive, as well as to account for temporary set changes that must be implemented for the reconstruction period during which data is regenerated from the missing or failed drive and reconstructed on the spare. It is noted that the configuration utility can be used to remap the set configuration by redefining the parameters of the configuration database.

In general, to those skilled in the art to which this invention relates, many changes in construction and widely differing embodiments and applications of the present invention will suggest themselves without departing from its spirit and scope. For instance, a greater number of second level controllers and first level controllers may be implemented in the system. Further, the structure of the switching circuitry connecting the second level controllers to the disk drives may be altered so that different drives are the primary responsibility of different second level controllers. Thus, the disclosures and descriptions herein are purely illustrative and not intended to be in any sense limiting. The scope of the invention is set forth in the appended claims.

What is claimed is:

1. A system for storing data received from an external source, comprising:
    at least two control means for providing control of data flow to and from the external source;
    a plurality of storage means coupled to said at least two control means wherein said storage means are divided into groups and each group is controlled by said at least two of said control means such that in the case that a first control means coupled to a particular group of storage means fails, control of said particular group is assumed by a second control means;
    a plurality of data handling means coupled to said at least two control means for disassembling data into data blocks to be written across a group of said storage means; and
    error detection means coupled to said control means and said storage means for calculating at least one error detection term for each group of storage means based on the data received from the external source using a selected error code and providing said error detection term to be compared with data to detect errors, said error detection means being coupled to each of said control means to receive the data from said control means and transmit said error detection term to an error code storage means in said group of storage means.

2. The system of claim 1 wherein said data handling means further include assembly means for assembling said data blocks received from said control means.

3. The system of claim 1 further comprising a first bus for coupling to said external source and a plurality of buffer means coupled to said first bus and to said control means for buffering data received by and transmitted from the system.

4. The system of claim 3 further comprising error correction means coupled to said error detection means for correcting error in data as said data is transmitted from either said buffer means to said storage means through said data handling means or from said storage means to said buffer means through said data handling means.

5. The system of claim 3 wherein the error detection means uses a Reed-Solomon error code to detect errors in said data received from said buffer means and said storage means.

6. The system of claim 3 wherein said data handling means includes detachment means coupled to said error detection means for detaching from the system storage means and buffer means which transmit erroneous data responsive to receiving said error detection term from said error detection means.

7. The system of claim 1 wherein said plurality of storage means comprises:
    a first group of data storage means for storing data from the external source; and
    a second group of error check and correction (ECC) storage means for storing ECC data generated by said error detection means.

8. The system of claim 1 wherein each of said plurality of storage means stores data and error check and correction (ECC) data in a predefined pattern.

9. In a system including at least two control means for communicating with an external source and a plurality of storage means wherein at least two of the control means are connected to each of the storage means, a method for storing data received from the external source comprising the steps of:
    receiving data from the external source;
    configuring the plurality of storage means into groups wherein each group is initially controlled by at least two of the control means such that in the case that one of the control means fails, the storage means of each group is accessible through another one of the control means;
    disassembling data into groups of data blocks to be written to said plurality of storage means;
    calculating at least one error detection term from said data using a selected error code;
    storing said data blocks in a first of said groups of storage means; and
    storing said at least one error detection term in said first of said groups of storage means.

10. The method of claim 9 further comprising the steps of:
    retrieving said data blocks from said first of said groups of storage means;
    calculating a check error detection term from said data blocks using a selected error code;
    retrieving said at least one error detection term from said first of said groups of storage means; and
    comparing said check error detection term to said at least one error detection term to determine that said data has not been corrupted.

11. The method of claim 10 further comprising the step of correcting said data if it is determined that said data has been corrupted.

12. The method of claim 10 further comprising the step of assembling said data blocks into a form in which it was received from the external source.

13. The method of claim 9 wherein the step of configuring further comprises the step of setting a plurality of switching means to allow said data blocks to be passed between the control means and the storage means in a predefined pattern.

14. The method of claim 9 further comprising the step of detaching a particular storage means upon which said data was stored if it is determined that said data has been corrupted.

15. A system for storing data received from an external source, comprising:
    control means for providing control of data flow to and from the external source;
    a plurality of storage means coupled to said control means wherein said storage means are divided into groups;
    a plurality of data handling means coupled to said control means for disassembling data with data blocks to be written to said storage means; and
    error detection means coupled to said control means for receiving said data blocks in parallel form and detecting errors in each data block substantially simultaneously as said data blocks are written, to said storage means.

16. The system of claim 15 further comprising data correction means coupled to said error detection means for correcting corrupted data in response to an error detection signal provided by said error detection means.

17. The system of claim 16 wherein said plurality of storage means comprises:
    a first group of data storage means for storing data from the external source; and a second group of error check and correction (ECC) storage means for storing ECC data generated by said error correction means.

18. The system of claim 16 wherein the error detection means uses a Reed-Solomon error code to detect errors in said data received from said buffer means and said storage means.

19. The system of claim 16 wherein the error correction means uses a Reed-Solomon error code to correct errors in said data received from said buffer means and said storage means.

20. The system of claim 15 further comprising detachment means coupled to said error detection means for detaching a particular storage means from the system which has provided corrupted data as determined by said error detection means.

21. The system of claim 15 wherein said data handling means further includes assembly means for assembling said data blocks received from said control means.

22. The system of claim 15 further comprising a first bus for coupling to said external source and a plurality of buffer means coupled to said first bus and to said control means for buffering data received by and transmitted from the system.

23. The system of claim 15 wherein each of said plurality of storage means stores data and error check and correction (ECC) data in a predefined pattern.

24. In a system including control means for communicating with an external source and a plurality of storage means, a method for storing data received from the external source comprising the steps of:
receiving data from the external house;
disassembling the data into groups of data blocks to be written to said plurality of storage means;
calculating at least one error detection term for each data block substantially simultaneously; and
storing said data blocks and said at least one error detection term in a first of said groups of storage means substantially simultaneously.

25. The method of claim 24 further comprising the steps of:
retrieving said data blocks from said first of said groups of storage means;
calculating a check error detection term from said data blocks using a selected error code;
retrieving said at least one error detection term from said first of said groups of storage means; and
comparing said check error detection term to said at least one error detection term to determine that said data has been not corrupted.

26. The method of claim 25 further comprising the step of correcting said data if it is determined that said data has been corrupted.

27. The method of claim 25 further comprising the step of assembling said data blocks into a form in which it was received from the external source.

28. The method of claim 24 wherein the step of configuring further comprises the step of setting a plurality of switching means to allow said data blocks to be passed between the control means and the storage means in a predefined pattern.

29. The method of claim 24 further comprising the step of detaching a particular storage means upon which said data was stored if it is determined that said data has been corrupted.

* * * * *